(12) United States Patent
Jagielinski et al.

(10) Patent No.: US 11,410,481 B2
(45) Date of Patent: Aug. 9, 2022

(54) SYSTEMS, METHODS AND DEVICES FOR PROCESSING BATCHES OF COINS UTILIZING COIN IMAGING SENSOR ASSEMBLIES

(71) Applicant: Cummins-Allison Corp., Mt. Prospect, IL (US)

(72) Inventors: Tomasz M. Jagielinski, Carlsbad, CA (US); Danny D. Yang, San Diego, CA (US); Frank M. Csulits, Gurnee, IL (US); Howard Choi, San Diego, CA (US)

(73) Assignee: Cummins-Allison Corp., Mt. Prospect, IL (US)

(*) Notice: Subject to any disclaimer, the term of this patent is extended or adjusted under 35 U.S.C. 154(b) by 0 days.

(21) Appl. No.: 16/902,094

(22) Filed: Jun. 15, 2020

(65) Prior Publication Data

US 2020/0312074 A1  Oct. 1, 2020

Related U.S. Application Data

(63) Continuation-in-part of application No. 16/120,252, filed on Sep. 1, 2018, which is a continuation of
(Continued)

(51) Int. Cl.
*G07D 5/08* (2006.01)
*G07D 3/14* (2006.01)
(Continued)

(52) U.S. Cl.
CPC ............ *G07D 5/08* (2013.01); *G06V 10/10* (2022.01); *G06V 10/147* (2022.01); *G07D 3/00* (2013.01);
(Continued)

(58) Field of Classification Search
CPC .. G07D 5/08; G07D 3/14; G07D 3/00; G07D 11/22; G07D 3/06; G07D 9/008;
(Continued)

(56) References Cited

U.S. PATENT DOCUMENTS

| 4,249,648 A | 2/1981 | Meyer |
| 4,509,633 A | 4/1985 | Chow |

(Continued)

FOREIGN PATENT DOCUMENTS

| EP | 0818758 A2 | 1/1998 |
| EP | 0936578 A1 | 8/1999 |

(Continued)

OTHER PUBLICATIONS

USPTO, "Final Office Action" dated Aug. 5, 2021, in connection with U.S. Appl. No. 16/120,252, 17 pages.
(Continued)

*Primary Examiner* — Jeffrey A Shapiro

(57) ABSTRACT

Currency processing systems, coin processing machines, coin imaging sensor assemblies and methods of making and methods of using the same are presented herein. A currency processing system is disclosed which includes a housing with a coin input area for receiving coins and coin receptacles for stowing processed coins. A disk-type coin processing unit, which is coupled to the coin input area and coin receptacles, includes a rotatable disk for imparting motion to coins, and a sorting head for separating and discharging coins to the coin receptacles. A sensor assembly is mounted to, adjacent or within the sorting head adjacent the rotatable disk. The sensor assembly includes a linear array of sensors, wherein the linear array of sensors is configured to sense coins processed by the coin processing unit, and to output a signal indicative of coin image information for processing the coins.

19 Claims, 36 Drawing Sheets

Related U.S. Application Data application No. 15/835,989, filed on Dec. 8, 2017, now Pat. No. 10,068,406, application No. 16/902,094, which is a continuation-in-part of application No. 15/461,046, filed on Mar. 16, 2017, now Pat. No. 10,685,523, said application No. 15/835,989 is a continuation of application No. 15/360,004, filed on Nov. 23, 2016, now Pat. No. 9,870,668, said application No. 15/461,046 is a continuation-in-part of application No. 15/356,295, filed on Nov. 18, 2016, now Pat. No. 9,916,713, and a continuation-in-part of application No. 14/936,846, filed on Nov. 10, 2015, now abandoned, said application No. 15/360,004 is a continuation of application No. 14/804,670, filed on Jul. 21, 2015, now Pat. No. 9,508,208, said application No. 15/356,295 is a continuation-in-part of application No. 14/794,262, filed on Jul. 8, 2015, now Pat. No. 9,501,885.

(60) Provisional application No. 62/077,992, filed on Nov. 11, 2014, provisional application No. 62/029,195, filed on Jul. 25, 2014, provisional application No. 62/022,373, filed on Jul. 9, 2014.

(51) Int. Cl.
  *G07D 3/00* (2006.01)
  *G07D 11/22* (2019.01)
  *G06V 10/10* (2022.01)
  *G06V 10/147* (2022.01)
  *G06K 7/08* (2006.01)
  *G06K 7/10* (2006.01)

(52) U.S. Cl.
  CPC .............. *G07D 3/14* (2013.01); *G07D 11/22* (2019.01); *G06K 7/08* (2013.01); *G06K 7/10* (2013.01)

(58) Field of Classification Search
  CPC ........... G06K 9/209; G06K 9/20; G06K 7/08; G06K 7/10; G06K 9/62
  See application file for complete search history.

(56) References Cited

U.S. PATENT DOCUMENTS

| | | | |
|---|---|---|---|
| 4,543,969 A | 10/1985 | Rasmussen | |
| 4,805,754 A | 2/1989 | Howells | |
| 4,893,071 A | 1/1990 | Miller | |
| 5,009,627 A | 4/1991 | Rasmussen | |
| 5,067,604 A | 11/1991 | Metcalf | |
| 5,209,696 A | 5/1993 | Rasmussen et al. | |
| 5,295,196 A | 3/1994 | Raterman et al. | |
| 5,299,977 A | 4/1994 | Mazur et al. | |
| 5,382,191 A | 1/1995 | Rasmussen | |
| 5,429,550 A | 7/1995 | Mazur et al. | |
| 5,453,047 A | 9/1995 | Mazur et al. | |
| 5,474,495 A | 12/1995 | Geib et al. | |
| 5,489,237 A | 2/1996 | Geib et al. | |
| 5,507,379 A | 4/1996 | Mazur et al. | |
| 5,538,468 A | 7/1996 | Ristvedt et al. | |
| 5,542,880 A | 8/1996 | Geib et al. | |
| 5,564,974 A | 10/1996 | Mazur et al. | |
| 5,630,494 A | 5/1997 | Strauts | |
| 5,743,373 A | 4/1998 | Strauts | |
| 5,782,686 A | 7/1998 | Geib et al. | |
| 5,788,046 A | 8/1998 | Lamah | |
| 5,865,673 A | 2/1999 | Geib et al. | |
| 5,875,259 A | 2/1999 | Mennie et al. | |
| 5,905,810 A | 5/1999 | Jones et al. | |
| 5,943,655 A | 8/1999 | Jacobson | |
| 5,970,497 A | 10/1999 | Burrows | |
| 5,982,918 A | 11/1999 | Mennie et al. | |
| 5,997,395 A | 12/1999 | Geib et al. | |
| 6,021,883 A | 2/2000 | Casanova et al. | |
| 6,039,644 A | 3/2000 | Geib et al. | |
| 6,039,645 A | 3/2000 | Mazur | |
| 6,042,470 A | 3/2000 | Geib et al. | |
| 6,068,194 A | 5/2000 | Mazur | |
| 6,171,182 B1 | 1/2001 | Geib et al. | |
| 6,305,523 B1 * | 10/2001 | House | G07D 5/005 194/317 |
| 6,318,537 B1 | 11/2001 | Jones et al. | |
| 6,579,165 B2 | 6/2003 | Kuhlin et al. | |
| 6,603,872 B2 | 8/2003 | Jones et al. | |
| 6,609,604 B1 | 8/2003 | Jones et al. | |
| 6,612,921 B2 | 9/2003 | Geib et al. | |
| 6,637,576 B1 | 10/2003 | Jones et al. | |
| 6,678,401 B2 | 1/2004 | Jones et al. | |
| 6,688,449 B1 | 2/2004 | Yamagishi | |
| 6,724,926 B2 | 4/2004 | Jones et al. | |
| 6,731,786 B2 | 5/2004 | Jones et al. | |
| 6,748,101 B1 | 6/2004 | Jones et al. | |
| 6,755,730 B2 | 6/2004 | Geib et al. | |
| 6,810,137 B2 | 10/2004 | Jones et al. | |
| 6,892,871 B2 | 5/2005 | Strauts et al. | |
| 6,896,118 B2 | 5/2005 | Jones et al. | |
| 6,907,977 B1 | 6/2005 | Barchuk | |
| 6,996,263 B2 | 2/2006 | Jones et al. | |
| 7,188,720 B2 | 3/2007 | Geib et al. | |
| 7,743,902 B2 | 6/2010 | Wendell et al. | |
| 2003/0168309 A1 | 9/2003 | Geib et al. | |
| 2004/0084278 A1 | 5/2004 | Harris et al. | |
| 2004/0129527 A1 | 7/2004 | Jonsson | |
| 2004/0256197 A1 | 12/2004 | Blake et al. | |
| 2007/0119681 A1 | 5/2007 | Blake et al. | |
| 2009/0048803 A1 | 2/2009 | Zwieg et al. | |
| 2009/0062739 A1 | 3/2009 | Anderson | |
| 2009/0322019 A1 * | 12/2009 | Gudenburr | G07D 11/40 271/302 |
| 2010/0261421 A1 * | 10/2010 | Wendell | G07D 3/14 453/4 |
| 2011/0124405 A1 * | 5/2011 | Okada | G07D 7/0034 463/25 |
| 2012/0138420 A1 | 6/2012 | Leibu et al. | |
| 2013/0068586 A1 | 3/2013 | Jonsson et al. | |
| 2013/0240322 A1 * | 9/2013 | Lavanchy | G07D 5/08 194/317 |
| 2015/0062059 A1 | 3/2015 | Ho et al. | |
| 2015/0177875 A1 | 6/2015 | Li et al. | |

FOREIGN PATENT DOCUMENTS

| | | |
|---|---|---|
| GB | 1405936 A | 9/1975 |
| GB | 2062327 A | 5/1981 |
| WO | 9906965 A1 | 2/1999 |
| WO | 2014161893 A1 | 10/2014 |
| WO | 2018035381 A1 | 2/2018 |

OTHER PUBLICATIONS

Advisory Action dated Feb. 5, 2021 in connection with U.S. Appl. No. 16/120,252, 5 pages.

Non-Final Office Action dated Mar. 17, 2021 in connection with U.S. Appl. No. 16/120,252, 40 pages.

USPTO, "Advisory Action" dated Oct. 28, 2021, in connection with U.S. Appl. No. 16/120,252, 7 pages.

Non-final Office Action dated Mar. 31, 2022, in connection with U.S. Appl. No. 16/120,252, 19 pages.

* cited by examiner

SYSTEMS, METHODS AND DEVICES FOR PROCESSING BATCHES OF COINS UTILIZING COIN IMAGING SENSOR ASSEMBLIES

CROSS-REFERENCE TO RELATED APPLICATIONS

This application is a continuation-in-part of U.S. patent application Ser. No. 15/461,046, filed on Mar. 16, 2017, and entitled Systems, Methods and Devices for Processing Batches of Coins Utilizing Coin Imaging Sensor Assemblies, which is a continuation-in-part of U.S. patent application Ser. No. 15/356,295, filed on Nov. 18, 2016, and entitled Systems, Methods and Devices for Processing Coins Utilizing Normal or Near-Normal and/or High-Angle of Incidence Lighting, now U.S. Pat. No. 9,916,713, which issued Mar. 13, 2018, which is a continuation-in-part of U.S. patent application Ser. No. 14/794,262, filed on Jul. 8, 2015, and entitled Systems, Methods and Devices for Processing Coins Utilizing Near-Normal and High-Angle of Incidence Lighting, now U.S. Pat. No. 9,501,885, which issued Nov. 22, 2016, which claims the benefit of priority to U.S. Provisional Patent Application No. 62/022,373, filed on Jul. 9, 2014, each of which is incorporated herein by reference in its entirety. U.S. patent application Ser. No. 15/461,046 is also a continuation-in-part of U.S. patent application Ser. No. 14/936,846, filed on Nov. 10, 2015, and entitled Systems, Methods and Devices for Processing Batches of Coins Utilizing Coin Imaging Sensor Assemblies, which claims the benefit of priority to U.S. Provisional Patent Application No. 62/077,992, which was filed on Nov. 11, 2014, each of which is incorporated herein by reference in its entirety. This application is also a continuation-in-part of U.S. patent application Ser. No. 16/120,252, filed on Sep. 1, 2018, and entitled Systems, Methods and Devices for Processing Coins with Linear Array of Coin Imaging Sensors, which is a continuation of U.S. patent application Ser. No. 15/835,989, filed on Dec. 8, 2017, now U.S. Pat. No. 10,068,406, which issued on Sep. 4, 2018, which is a continuation of U.S. patent application Ser. No. 15/360,004, filed on Nov. 23, 2016, now U.S. Pat. No. 9,870,668, issued on Jan. 16, 2018, which is a continuation of U.S. patent application Ser. No. 14/804,670, filed on Jul. 21, 2015, now U.S. Pat. No. 9,508,208, issued on Nov. 29, 2016, which claims the benefit of priority to U.S. Provisional Patent Application No. 62/029,195, which was filed on Jul. 25, 2014, each of which is incorporated herein by reference in its entirety.

TECHNICAL FIELD

The present disclosure relates generally to systems, methods, and devices for processing currency. More particularly, aspects of this disclosure relate to coin processing units for imaging and evaluating batches of coins.

BACKGROUND

Some businesses, particularly banks and casinos, are regularly faced with large amounts of currency which must be organized, counted, authenticated and recorded. To hand count and record large amounts of currency of mixed denominations requires diligent care and effort, and demands significant manpower and time that might otherwise be available for more profitable and less tedious activity. To make counting of bills and coins less laborious, machines have been developed which automatically sort, by denomination, mixed assortments of currency, and transfer the processed currency into receptacles specific to the corresponding denominations. For example, coin processing machines for processing large quantities of coins from either the public at large or private institutions, such as banks, casinos, supermarkets, and cash-in-transit (CIT) companies, have the ability to receive bulk coins from customers and other users of the machine, count and sort the coins, and store the received coins in one or more coin receptacles, such as coin bins or coin bags. One type of currency processing machine is a redemption-type processing machine wherein, after the deposited coins and/or bank notes are counted, funds are returned to the user in a pre-selected manner, such as cash, a payment ticket or voucher, a smartcard, a cash card, a gift card, and the like. Another variation is the deposit-type processing machine where funds which have been deposited by the user are credited to a personal account. Hybrid variations of these machines are also known and available.

A well-known device for processing coins is the disk-type coin sorter. In one exemplary configuration, the coin sorter, which is designed to process a batch of mixed coins by denomination, includes a rotatable disk that is driven by an electric motor. The lower surface of a stationary, annular sorting head (or "sort disk") is parallel to and spaced slightly from the upper surface of the rotatable disk. The mixed batch of coins is progressively deposited onto the top surface of the rotatable disk. As the disk is rotated, the coins deposited on the top surface thereof tend to slide outwardly due to centrifugal force. As the coins move outwardly, those coins which are lying flat on the top surface of the rotatable disk enter a gap between the disk and the sorting head. The lower surface of the sorting head is formed with an array of exit channels which guide coins of different denominations to different exit locations around the periphery of the disk. The exiting coins, having been sorted by denomination for separate storage, are counted by sensors located along the exit channel. A representative disk-type coin sorting mechanism is disclosed in U.S. Pat. No. 5,009,627, to James M. Rasmussen, which is incorporated herein by reference in its entirety and for all purposes.

It is oftentimes desirable in the sorting of coins to discriminate between valid coins and invalid coins. Use of the term "valid coin" can refer to genuine coins of the type to be sorted. Conversely, use of the term "invalid coin" can refer to items in the coin processing unit that are not one of the coins to be sorted. For example, it is common that foreign (or "stranger") coins and counterfeit coins enter a coin processing system for sorting domestic coin currency. So that such items are not sorted and counted as valid coins, it is helpful to detect and discard these "invalid coins" from the coin processing system. In another application wherein it is desired to process only U.S. quarters, nickels and dimes, all other U.S. coins, including dollar coins, half-dollar coins, pennies, etc., can be considered "invalid." Additionally, coins from all other coins sets including Canadian coins and European coins, for example, would be considered "invalid" when processing U.S. coins. In another application it may be desirable to separate coins of one country (e.g., Canadian coins) from coins of another country (e.g., U.S. coins). Finally, any truly counterfeit coins (also referred to in the art as "slugs") are always considered "invalid" regardless of application.

Historically, coins have been sorted and validated or otherwise processed based on physical assessment of their structural characteristics, such as coin diameter, coin thickness, metal content, shape, serrations and engravings on obverse and reverse sides or faces of the coin. To improve discriminating accuracy, coin processing units have been designed for sorting and authenticating coins by optically detecting coin surface patterns. For example, one known coin discriminating apparatus is provided with an assortment of light emitting elements, such as light emitting diodes (LEDs), for projecting light onto a passing coin, and a photodetector, a charge-coupled device (CCD) detector, CMOS detector, or other optical sensor for optically detecting light emitted from the light emitting elements and reflected by the surface of the coin. From the reflected light pattern, the apparatus is able to authenticate and denominate coins based on coin image pattern data that was optically detected and digitized.

SUMMARY

One drawback with many prior art optical coin discriminating devices is an undesirably large proportion of discrimination errors caused by variations in coin surface reflectance due to aging and wear. Another drawback with prior art discrimination and authentication methods is the use of single point sensors, each of which is employed to detect a single coin parameter. With this approach, it is particularly difficult to detect, for example, all of the defects in a coin unless every defect passes directly under the sole sensor. Use of a single, wider sensor to detect information from the entire coin typically lacks spatial resolution. In addition, the processing and remediation time for identifying and removing invalid or unfit coins using many conventional optical coin discriminating devices is undesirably long for bulk coin processing systems that must process thousands of coins within a few minutes. In addition to being slow and unreliable, many conventional optical coin discriminating devices are costly and require a great deal of packaging space with a large window for imaging. Moreover, most optical coin processing systems that are available today utilize single/broad wavelength lighting schemes (e.g., white light) that can only capture limited spectral characteristics of the coins being processed.

Currency processing systems, coin processing machines, coin processing units, coin imaging sensor assemblies, and methods of making and methods of using the same are presented herein. Some aspects of the present disclosure are directed to currency processing systems, such as coin processing machines with disk-type coin processing units, which utilize one or more coin-imaging sensor assemblies for processing batches of coins. In an example, an imaging-capable coin processing machine may include a coin transport system, a coin imaging sensor system, an electronics and image processing system, and a processing system to decide if each processed coin is fit for circulation, is of a particular denomination, belongs to a specific coin set, is authentic, and/or meets other criteria as required by the system. For some embodiments, the coin transport system can transport coins at a linear speed of at least approximately 50 inches per second (ips) and, for some embodiments, at a linear speed of at least approximately 300 ips. The sensor assembly may include means to excite a certain property or properties of a coin using, for example, electric energy, magnetic energy, optical energy, acoustic energy, or electromagnetic energy, and means to capture the response from the coin by capturing imaging information by means of using the plurality of sensing elements. The resolution of the image may range from at least approximately 2 dots per inch (dpi) to upwards of at least approximately 50 dpi, 100 dpi, 200 dpi or more, for some embodiments.

Aspects of the present disclosure are directed to a currency processing system with a housing, one or more coin receptacles, and a disk-type coin processing unit. The housing has a coin input area for receiving a batch of coins. The one or more coin receptacles are stowed inside or adjacent the housing or are otherwise operatively coupled to the housing. The disk-type coin processing unit is operatively coupled to the coin input area and the coin receptacle(s) to transfer coins therebetween. The coin processing unit includes a rotatable disk for imparting motion to a plurality of coins, and a sorting head with a lower surface that is generally parallel to and at least partially spaced from the rotatable disk. The lower surface forms numerous shaped regions, such as exit channels, for guiding the coins, under the motion imparted by the rotatable disk, to exit station(s) through which the coins are discharged from the coin processing unit to the coin receptacle(s). A sensor assembly is mounted to, adjacent or within the sorting head adjacent the rotatable disk. The sensor assembly is configured to analyze coins on the rotatable disk and generate signals indicative of coin image information for processing the coins. The sensor assembly includes one or more light emitting devices, such as rows of light emitting diodes, for illuminating passing coins, and a sensor circuit board with one or more photodetector elements for sensing light reflected off said coins. An illumination control device, which may be in the nature of a microcontroller or other integrated circuit, is communicatively coupled to and operable for controlling the one or more light emitting devices. Additionally, a photodetector control device, which may also be in the nature of a microcontroller or other integrated circuit, is communicatively coupled to and operable for controlling the sensor circuit board.

In accord with other aspects of the present disclosure, a coin-imaging sensor assembly for a coin processing apparatus is disclosed. The coin processing apparatus includes a housing with an input area for receiving a batch of coins, and one or more coin receptacles for stowing processed coins. Also included in the coin processing apparatus is a coin sorting device for separating coins by denomination, and a coin transport mechanism for transferring coins from the input area, through the coin sorting device, to the coin receptacle(s). The coin imaging sensor assembly comprises a sensor assembly housing that is mounted to, adjacent or within the coin sorting device. One or more light emitting devices, which are mounted inside the sensor assembly housing, are operable to emit light onto passing coins. A sensor circuit board is also mounted inside the sensor assembly housing. The sensor circuit board includes one or more photodetector elements operable to sense light reflected off of surfaces of passing coins. An illumination control device is communicatively coupled to and operable for controlling the one or more light emitting devices. In addition, a photodetector control device is communicatively coupled to and operable for controlling the sensor circuit board.

According to yet other aspects of the present disclosure, a coin processing machine is presented for sorting batches of coins comprising coins of mixed diameters. The currency processing machine includes a coin input area for receiving coins from a user, and at least one coin receptacle for receiving and stowing processed coins. The currency processing device also includes a coin processing unit that receives coins from the coin input area, processes the received coins, and outputs the processed coins to the coin receptacle(s). A sensor assembly is mounted to, adjacent or within the coin processing unit. The sensor assembly analyzes coins and generates signals indicative of coin image information for processing the coins. The sensor assembly includes one or more light emitting devices and a sensor circuit board with one or more photodetector elements. An illumination control device is communicatively coupled to and operable for controlling the one or more light emitting devices. In addition, a photodetector control device is communicatively coupled to and operable for controlling the sensor circuit board. An image processing circuit is communicatively coupled to the sensor assembly and configured to process the coin image information signals output therefrom. A processor is communicatively coupled to the image processing circuit and configured to analyze the processed signals and generate therefrom an image for each of the coins.

Methods of making and methods of using any of the foregoing processing systems, processing machines, processing units, etc., are also within the scope and spirit of this disclosure.

Currency processing systems, coin processing machines, coin processing units, and methods of imaging and processing batches of coins are presented herein. Some aspects of the present disclosure are directed to currency processing systems, such as coin processing machines with disk-type coin processing units, which utilize a one-dimensional (1D) or linear array of coin-imaging sensors. For some implementations, multiple linear arrays are aligned one next to the other or staggered. Traditionally, the term imaging has been associated with optical imaging provided by optical sensors. However, as used herein, the term "imaging" also includes images generated by non-optical sensing elements which allow mapping of the specific properties of an object. Typically the quality of the optical image has been associated with the size of the smallest segment of the image, known as a "pixel." The traditional definition of the optical pixel, however, can be extended to other techniques of imaging, such as magnetic, capacitive, electromagnetic and other. This disclosure will teach about using a 1D linear array of sensors to map/image certain properties of objects, such as coins and banknotes.

For some embodiments, the linear array consists of optical sensors, electromagnetic sensors, magnetic in-field or remanence sensors, ultrasonic sensors or capacitive sensors. In this regard, an optical sensor array will produce an optical image, a magnetic sensor array will produce a magnetic image, an ultrasonic sensor will produce an ultrasonic image a capacitive sensor array will produce a capacitive image, and an electromagnetic sensor array including an eddy current sensor array will produce an electromagnetic image including an eddy current image, and so on. Each sensor system may consist essentially of means to excite a specific property of the coin, means to detect such a property using a 1D array of sensors capable of detecting such a property, means to process the sensors' signals, means to convert the signals into a digital format, means to analyze the information contained in the signal against a specific pattern or detection or authentication algorithm, and means to provide information about, for example, coin denomination, authentication, fitness and other relevant information.

In an example, an imaging-capable coin processing machine may include a coin transport system, a coin imaging sensor system, an electronics and image processing system, and a processing system to decide if each processed coin is fit for circulation, is of a particular denomination, belongs to a specific coin set, is authentic, and/or meets other criteria as required by the system. For some embodiments, the coin transport system can transport coins at a linear speed of at least approximately 50 inches per second (ips) and, for some embodiments, at a linear speed of at least approximately 300 ips. It is also within the scope and spirit of this disclosure to process coins at speeds which exceed 300 ips and at speeds that are slower than 50 ips. The 1D sensor array may include means to excite a certain property or properties of a coin using, for example, electric energy, magnetic energy, or electromagnetic energy, and means to capture the response from the coin by capturing imaging information by means of using the plurality of sensing elements. The resolution of the image may range from at least approximately 2 dots per inch (dpi) and, for some embodiments, at least approximately 50 dpi or more.

Aspects of the present disclosure are directed to a currency processing system with a housing, one or more coin receptacles, and a disk-type coin processing unit. The housing has a coin input area for receiving a batch of coins. The one or more coin receptacles are stowed inside or adjacent the housing and are otherwise operatively coupled to the housing. The disk-type coin processing unit is operatively coupled to the coin input area and the one or more coin receptacles to transfer coins therebetween. The coin processing unit includes a rotatable disk for imparting motion to a plurality of the coins, and a sorting head with a lower surface that is generally parallel to and at least partially spaced from the rotatable disk. The lower surface forms a plurality of shaped regions for guiding the coins, under the motion imparted by the rotatable disk, to a plurality of exit stations through which the coins are discharged from the coin processing unit to the one or more coin receptacles. A linear array of sensors is mounted to the sorting head adjacent the rotatable disk. The linear array of sensors is configured to sense each of the coins on the rotatable disk and output a signal indicative of coin image information for processing each coin. In the present disclosure, a disk-type coin processing unit is provided as a specific example for implementation of the novel and inventive concepts of the subject invention; however the invention is applicable to any type of coin processing unit where the position of a processed coin is controlled.

A coin processing machine is also featured in accordance with aspects of this disclosure. The coin processing machine has a housing with a coin input area for receiving therethrough a batch of coins. Plural coin receptacles are stowed inside the housing. A processor is also stored inside the housing or, optionally, stored remotely and communicatively coupled to the coin processing machine. A disk-type coin processing unit is disposed at least partially inside the housing and is operatively coupled to the coin input area and the plurality of coin receptacles to transfer coins therebetween. The coin processing unit includes a rotatable disk for supporting on an upper surface thereof and imparting motion to a plurality of coins received from the coin input area. The coin processing unit also includes a stationary sorting head with a lower surface that is generally parallel to and spaced slightly apart from the rotatable disk. The lower surface forms a plurality of exit channels for guiding the coins, under the motion imparted by the rotatable disk, to exit stations through which the coins are discharged to one or more of the coin receptacles. A linear array of sensors is mounted to the sorting head facing the rotatable disk. Optionally, the linear array of sensors is mounted to the housing to allow capturing of imaging information from the opposite side of the coin. The linear array of sensors is configured to examine the entirety of an upper surface of each of the coins on the rotatable disk and output to the processor a coin image signal indicative thereof. The processor is configured to receive the coin image signals from the linear array of sensors and generate therefrom an image of the upper surface of each of the coins for processing the coins. Optionally, the linear array of sensors is configured to "face" a surface of each of the coins, which may include an upper surface, a lower surface, or both, and examine the entirety of the coin and output to the processor a coin image signal indicative thereof. In some embodiments, the imaging sensor images the side of the coin.

According to other aspects of the present disclosure, a coin imaging sensor system for a coin processing apparatus is presented. The coin processing apparatus includes a housing with an input area for receiving coins, one or more coin receptacles for stowing processed coins, a coin sorting device for separating the coins by denomination, and a coin transport mechanism for transferring the coins from the input area, through the coin sorting device, to the one or more coin receptacles. The coin imaging sensor system comprises a linear array of sensors that is mounted inside the housing adjacent the coin transport mechanism downstream from the coin input area and upstream from the one or more coin receptacles. The linear array of sensors is configured to sense each of the coins and output a signal indicative of coin image information. An image processing circuit is operatively coupled to the linear array of sensors and configured to process the coin image information signals output therefrom. The coin imaging sensor system also includes a processor that is operatively coupled to the image processing circuit and configured to examine the processed signals and generate therefrom an image for each of the coins for processing the coins.

In accord with yet other aspects of the present disclosure, a currency processing device is presented. The currency processing device includes a coin input area for receiving coins from a user, and at least one coin receptacle for receiving and stowing processed coins. The currency processing device also includes a coin processing unit that receives coins from the coin input area, processes the received coins, and outputs the processed coins to the coin receptacle(s). A linear array of sensors is mounted to or adjacent the coin processing unit. The linear array of sensors is configured to examine, for example, one side (surface) or both sides (surfaces) or the side (thickness) of each of the processed coins and output a signal indicative of coin image information. At least one processor receives the coin image signals from the linear array of sensors and generates therefrom an image of a surface of each of the coins.

For any of the disclosed configurations, the linear array of sensors may comprise or consist essentially of electromagnetic imaging sensors, eddy current sensors, magnetic in-field or magnetic remanence imaging sensors, ultrasonic imaging sensors, time-decay fluorescence or phosphorescence optical sensors, and/or capacitive imaging sensors. For some configurations, numerous identical sensors are aligned rectilinearly adjacent one another, extending transversely with respect to the path of transport of the coins. Optionally, a second linear array of sensors can be mounted generally parallel to and aligned with or interlaced with the linear array of sensors. Like the first array, the second linear array of sensors examines passing coins and generates signals indicative of coin image information for processing the coins. It may be desirable that each linear array of sensors be configured to examine substantially the entire area of a surface of each of the coins.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of the exemplary embodiments and modes for carrying out the present invention when taken in connection with the accompanying drawings and appended claims.

BRIEF DESCRIPTION OF THE DRAWINGS

For a more complete understanding of this disclosure, reference is now made to the following description, taken in conjunction with the accompanying drawings, in which.

Figure 1:
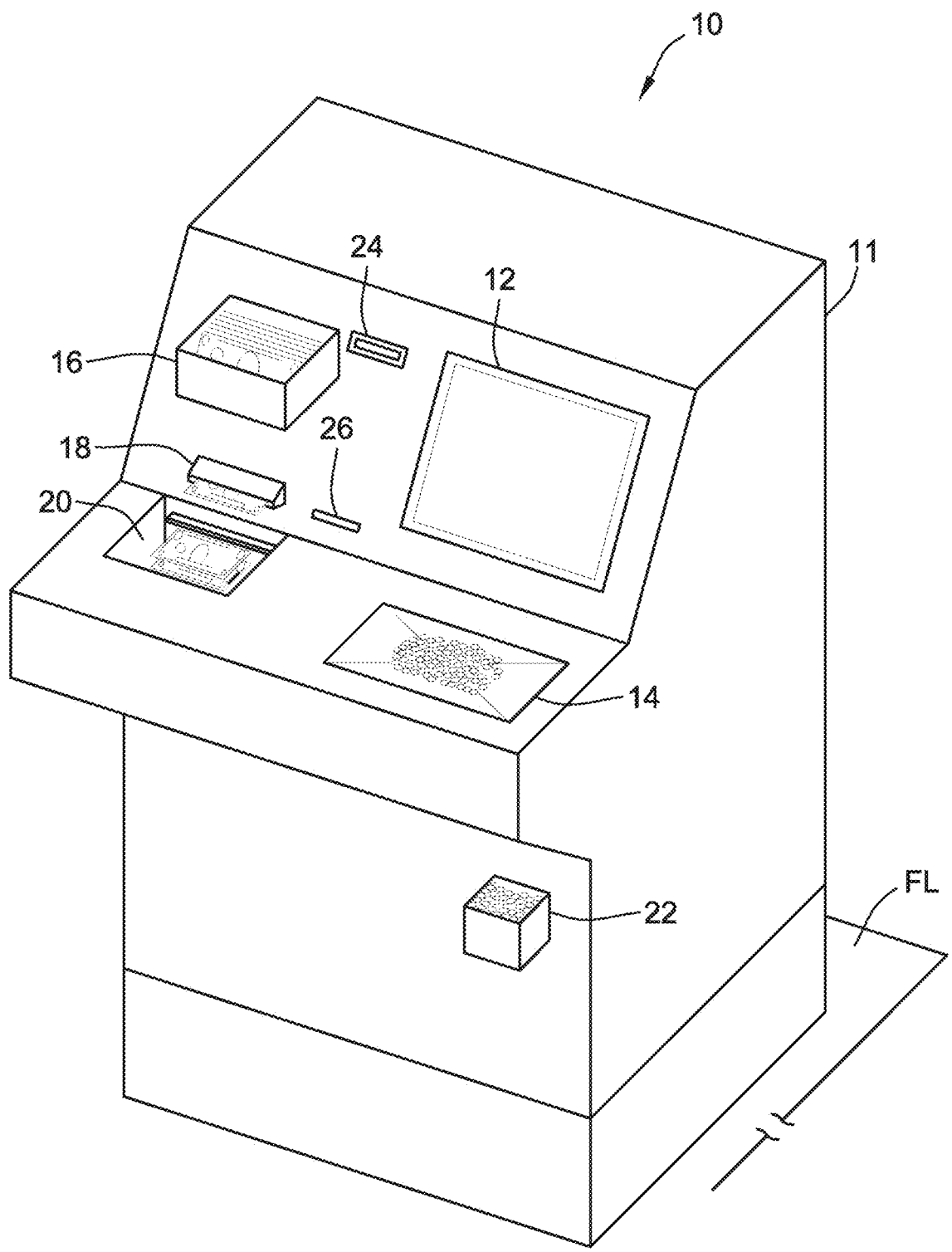
FIG. 1 is a front perspective-view illustration of an example of a currency processing system in accordance with aspects of the present disclosure.

The present disclosure is susceptible to various modifications and alternative forms, and some representative embodiments have been shown by way of example in the drawings and will be described in detail herein. It should be understood, however, that the disclosure is not intended to be limited to the particular forms disclosed. Rather, the disclosure is to cover all modifications, equivalents, combinations and subcombinations, and alternatives falling within the spirit and scope of the invention as defined by the appended claims.

DETAILED DESCRIPTION

This disclosure is susceptible of embodiment in many different forms. There are shown in the drawings, and will herein be described in detail, representative embodiments with the understanding that the present disclosure is to be considered as an exemplification of the principles of the invention and is not intended to limit the broad aspects of the invention to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the word "all" means "any and all"; the word "any" means "any and all"; and the words "including" or "comprising" or "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Currency processing systems, coin processing machines, disk-type coin processing units, and methods of imaging and processing batches of coins are presented herein. For example, aspects of the present disclosure are directed to disk-type coin processing units and currency processing machines with disk-type coin processing units which utilize one-dimensional, two-dimensional and/or multi-wavelength sensor assemblies to process batches of coins. In accord with some embodiments, a currency processing system utilizes a one-dimensional or a two-dimensional optical sensor to capture a visual image of a coin travelling through a high-speed coin counting and sorting machine to determine the fitness, country of origin, and/or denomination of the coin. The one-dimensional (1D) sensor may be a 1D line scan sensor, whereas the two-dimensional (2D) sensor may be a 2D digital camera. The 1D and 2D optical sensors can identify visible fitness issues with genuine coins, such as holes, edge chips, roundness, surface corrosion and diameter, which traditional eddy current coin sensors cannot detect. Using visible pattern recognition, the disclosed optical sensor arrangements can also detect "strangers" and flag counterfeit coins that traditional eddy current coin sensors fail to call as counterfeit or stranger. Disclosed 1D and 2D optical sensor arrangements can also be operable to detect and report coin diameter and/or coin roundness measurements.

In an example, 2D optical sensor arrangements can generate an instantaneous picture of the entire upper and/or lower surface of a coin. By comparison, 1D optical sensor arrangements collect data line-by-line and then utilize a proprietary algorithm to reconstruct an image of coin surface (s) in the systems' software. While the final result from both can look similar or the same, generally one can get a higher resolution image using a 1D sensor arrangement. In instances where the system utilizes 1D optical sensor arrangements to analyze a coin moving along the arc, a software procedure may be introduced to correct for radial distortion(s). In systems where the coin is moving along a straight line, there is typically no need to make such corrections. In systems utilizing 1D optical sensor arrangements, a large opening need not be provided along the transport path since the sensors take image data line by line. This makes the mechanical design and coin control much easier as compared to 2D configurations.

In accord with at least some embodiments, a coin processing unit utilizes multi-wavelength sensors to assess non-metallic coin characteristics that cannot be identified by existing coin discrimination and authentication technologies. Traditionally, coins are made of metals, alloys, or other types of electrically conductive metal-type materials. The principal metal-content and composition sensors in use today are predominantly based on eddy current, magnetic and electromagnetic type technologies. However, new types of coins, including circulation coins, numismatic coins and casino tokens, are being fabricated with non-metallic materials like ceramics, plastics, paints, coatings, ink markings, and other non-electrically-conductive materials. For instance, special pigments are being mixed with non-metallic components of the coin, such as for example a plastic ring or ceramic center. In some new coins, non-metallic, optically active particles are added to the plated layer of the coin. There are also coins or parts of coins that are painted with different types of inks. These new coins or additions to the coin have complex optical characteristics (e.g., Stokes or anti-Stokes features, spectral features, fluorescent or phosphorescent properties, UV properties, IR properties, etc.) that cannot be detected using simple white or single wavelength optical systems. The multi-wavelength sensor systems disclosed herein can properly denominate and authenticate such coins by sensing the characteristics of the non-metallic materials for proper classification.

Multi-wavelength sensors are equally applicable to 1D and 2D solutions. Traditionally, coin imaging systems are limited to using "white light" (light that contains the wavelength components of the visible spectrum) to illuminate and analyze a coin. This allows for fitness, grayscale pattern based denomination and grayscale pattern based authentication. However, each coin has a color. In general, color (or the "visible spectrum") covers only the electromagnetic spectrum from ~400 to ~750 nm. Detecting color is for example detecting R, G and B signals (3 wavelengths). However, current and future coins have additional optical information outside of the visible spectrum (i.e., that which is perceptible by the human eye). Multi-wavelength sensors can collect spectral information of the coin image.

In an example, an imaging-capable coin processing machine may include a coin transport system, a coin imaging sensor system, an electronics and image processing system, and a processing system to decide if each processed coin is fit for circulation, is of a particular denomination, belongs to a specific coin set, is authentic, and/or meets other criteria as required by the system. The resolution of the image may range from at least approximately 2 dots per inch (dpi) while, for some embodiments, at least approximately 50 dpi. 100 dpi, 200 dpi or more, and, for some embodiments, at least approximately 400 dpi. For some embodiments, the coin processing unit can transport coins at a linear speed of less than 50 inches per second, at least approximately 50 inches per second (ips) and, for some embodiments, at a linear speed of at least approximately 300 ips. For some embodiments, the coin processing unit is rated at 10,000 coins per minute (cpm) (e.g., approximately 200 ips), whereas some systems are rated at 15,000-20,000 cpm (e.g., approximately 300-400 ips).

Also featured herein are one-dimensional (1D) CIS imaging sensors with an improved lighting configuration to offer improved performance over conventional CIS sensors, including reduced radial distortion and an increased number of detectable coin attributes. Some embodiments offer pattern recognition of stranger coins. Additional features include a two-dimensional (2D) "snapshot" configuration operable to accurately analyze the outer diameter of the coin to generate images that do not suffer from radius distortion. Other options include orienting each coin image for improved denomination, authentication, or fitness detection. Disclosed embodiments also offer a much higher probability of stranger pattern recognition since the image will not suffer from radius distortion. Also disclosed are exploratory fitness algorithms that have been developed to detect the characteristics mentioned above for the 1D sensor and lighting configuration and the 2D camera images.

Both 1D and 2D imaging systems can utilize an opening in the sort head to view passing coins. 1D imaging systems will typically require a smaller opening since each scan line is individually exposed. Conversely, 2D imaging system typically require an opening at least as large as the largest coin if a single snapshot is to be taken. To reduce the requisite size of the viewing opening, the 2D imaging system can take two or three or more reduced-size "slice" images and stitch them together to form a complete image. In many disk-type coin sorter configurations, processed coins are kept under pad pressure between the sort head and rotating support disk. The 1D and 2D sensor assemblies can be provided with a viewing glass or polymeric window that can withstand the coin's passage pressure. An alternative solution may include temporarily removing the pad pressure during the short time the system needs to capture a single image.

Referring now to the drawings, wherein like reference numerals refer to like components throughout the several views, FIG. 1 illustrates an example of a currency processing system, designated generally as 10, in accordance with aspects of the present disclosure. Many of the disclosed concepts are discussed with reference to the representative currency processing systems depicted in the drawings. However, the novel aspects and features of the present disclosure are not per se limited to the particular arrangements and components presented in the drawings. For example, many of the features and aspects presented herein can be applied to other currency processing systems without departing from the intended scope and spirit of the present disclosure. Examples of currency processing systems into which the disclosed concepts can be incorporated are the JetSort™ family or LX™ family of coin sorting machines available from Cummins-Allison Corp. The inventive aspects of the present disclosure, however, are not limited to coins processing systems utilizing sorting disks and could be utilized in other currency processing systems (e.g., conveyor belt systems, rail systems, powered rail coin sorters) regardless of speed as long as the coin position is controlled. In addition, although differing in appearance, the coin processing systems and devices and functional componentry depicted and discussed herein can each take on any of the various forms, optional configurations, and functional alternatives described above and below with respect to the other disclosed embodiments, and thus can include any of the corresponding options and features, unless explicitly disclaimed or otherwise logically prohibited. It should also be understood that the drawings are not necessarily to scale and are provided purely for descriptive purposes; thus, the individual and relative dimensions and orientations presented in the drawings are not to be considered limiting.

The currency processing system 10 is a hybrid redemption-type and deposit-type currency processing machine with which funds may be deposited into and returned from the machine, in similar or different forms, in whole or in part, and/or funds may be credited to and withdrawn from a personal account. The currency processing machine 10 illustrated in FIG. 1 includes a housing 11 that may house various input devices, output devices, and input/output devices. By way of non-limiting example, the currency processing machine 10 includes a display device 12 that may provide various input and output functions, such as displaying information and instructions to a user and receiving selections, requests, and other forms of inputs from a user. The display device 12 is, in various embodiments, a cathode ray tube (CRT), a high-resolution liquid crystal display (LCD), a plasma display, a light emitting diode (LED) display, a DLP projection display, an electroluminescent (EL) panel, or any other type of display suitable for use in the currency processing machine 10. A touch screen, which has one or more user-selectable soft touch keys, may be mounted over the display device 12. While a display device 12 with a touchscreen may be a preferred means for a user to enter data, the currency processing machine 10 may include other known input devices, such as a keyboard, mouse, joystick, microphone, etc.

The currency processing machine 10 includes a coin input area 14, such as a bin or tray, which receives batches of coins from a user. Each coin batch may be of a single denomination, a mixed denomination, a local currency, or a foreign currency, or any combination thereof. Additionally, a bank note input area 16, which may be in the nature of a retractable pocket or basket, is also offered by the currency processing machine 10. The bank note input area 16, which is illustrated in its open position in FIG. 1, can be retracted by the currency processing machine 10 once the bulk currency has been placed therein by the user. In addition to banknotes, or as a possible alternative, the bank note receptacle 16 of the currency processing machine 10 can also be operable to accommodate casino scrip, paper tokens, bar coded tickets, or other known forms of value. These input devices—i.e., the currency input areas 14 and 16, allow the user of the currency processing machine 10 to input his or her funds, which can ultimately be converted to some other sort of fund source that is available to the user. Optionally or alternatively, the currency processing machine 10 can operate to count, authenticate, valuate, and/or package funds deposited by a user.

In addition to the above-noted output devices, the currency processing machine 10 may include various output devices, such as a bank note dispensing receptacle 20 and a coin dispensing receptacle 22 for dispensing to the user a desired amount of funds in bank notes, coins, or a combination thereof. An optional bank note return slot 18 may also be included with the currency processing machine 10 to return notes to the user, such as those which are deemed to be counterfeit or otherwise cannot be authenticated or processed. Coins which cannot be authenticated or otherwise processed may be returned to the user via the coin dispensing receptacle 22. The currency processing machine 10 further includes a paper dispensing slot 26, which can be operable for providing a user with a receipt of the transaction that was performed.

In one representative transaction, the currency processing machine 10 receives funds from a user via the coin input area 14 and/or the bank note input area 16 and, after these deposited funds have been authenticated and counted, the currency processing machine 10 returns to the user an amount equal to the deposited funds but in a different variation of bank notes and coins. Optionally, the user may be assessed one or more fees for the transaction (e.g., service fees, transaction fees, etc.). For example, the user of the currency processing machine 10 may input $102.99 in various small bank notes and pennies and in turn receive a $100 bank note, two $1 bank notes, three quarters, two dimes, and four pennies. As another option or alternative, the currency processing machine 10 may simply output a voucher or a receipt of the transaction through the paper dispensing slot 26 which the user can then redeem for funds by an attendant of the currency processing machine 10. Yet another option or alternative would be for the currency processing machine 10 to credit some or all of the funds to a personal account, such as a bank account or store account. As yet another option, the currency processing machine 10 may credit some or all of the funds to a smartcard, gift card, cash card, virtual currency, etc.

The currency processing machine 10 may also include a media reader slot 24 into which the user inserts a portable medium or form of identification, such as a driver's license, credit card, or bank card, so that the currency processing machine 10 can, for example, identify the user and/or an account associated with the user. The media reader 24 may take on various forms, such as a ticket reader, card reader, bar code scanner, wireless transceiver (e.g., RFID, Bluetooth, etc.), or computer-readable-storage-medium interface. The display device 12 with a touchscreen typically provides the user with a menu of options which prompts the user to carry out a series of actions for identifying the user by displaying certain commands and requesting that the user press touch keys on the touch screen (e.g. a user PIN). The media reader device 24 of the illustrated example is configured to read from and write to one or more types of media. This media may include various types of memory storage technology such as magnetic storage, solid state memory devices, and optical devices. It should be understood that numerous other peripheral devices and other elements exist and are readily utilizable in any number of combinations to create various forms of a currency processing machine in accord with the present concepts.

Figure 2:
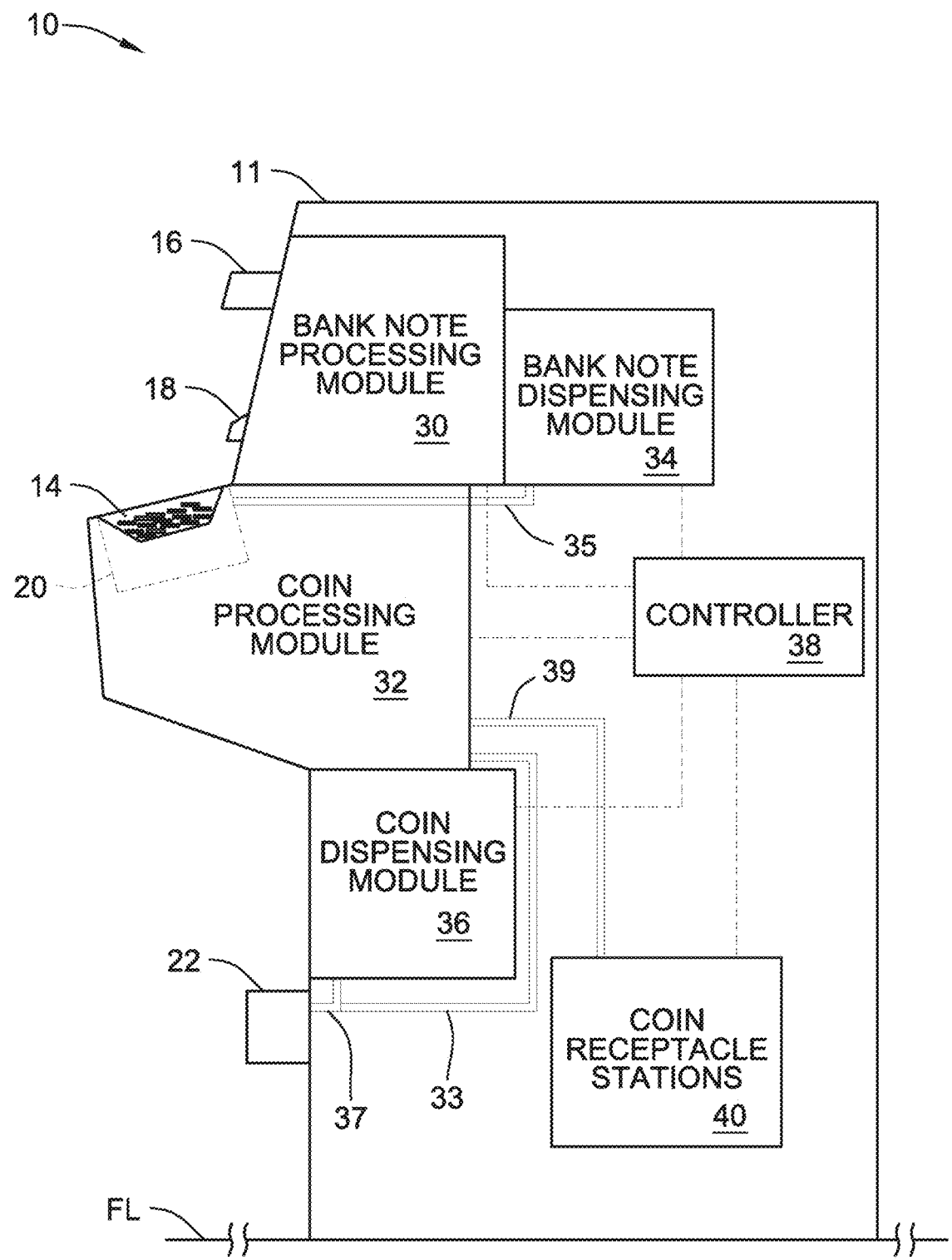
FIG. 2 is a schematic side-view illustration of the representative currency processing machine of FIG. 1.

FIG. 2 is a schematic illustration of the currency processing machine 10 showing various modules which may be provided in accord with the disclosed concepts. A bank note processing module 30, for example, receives bank notes from the bank note input area 16 for processing. In accord with a representative configuration, the inward movement of a retractable bank note input area 16 positions a stack of bills at a feed station of the bank note scanning and counting device which automatically feeds, counts, scans, authenticates, and/or sorts the bank notes, one at a time, at a high rate of speed (e.g., at least approximately 350 bills per minute). In place of, or in addition to the bank note input area 16, the currency processing machine 10 may include a single bank note receptacle for receiving and processing one bank note at a time. The bank notes that are recognized and/or deemed authentic by the bank note processing module 30 are delivered to a currency canister, cassette or other known storage container. When a bank note cannot be recognized by the bank note processing module 30, it can be returned to the customer through the bank note return slot 18. Exemplary machines which scan, sort, count, and authenticate bills as may be required by the bank note processing module 30 are described in U.S. Pat. Nos. 5,295,196, 5,970,497, 5,875,259, which are incorporated herein by reference in their respective entireties and for all purposes.

The representative currency processing machine 10 shown in FIG. 2 also includes a coin processing module 32. The coin processing module 32 may be operable to sort, count, valuate and/or authenticate coins which are deposited in the coin input receptacle 14, which is operatively connected to the coin processing module 32. The coins can be sorted by the coin processing module 32 in a variety of ways, but one known method is sorting based on the diameters of the coins. When a coin cannot be authenticated or counted by the coin processing module 32, it can be directed back to the user through a coin reject tube 33 which leads to the coin dispensing receptacle 22. Thus, a user who has entered such a non-authenticated coin can retrieve the coin by accessing the coin dispensing receptacle 22. Examples of coin sorting and authenticating devices which can perform the function of the coin processing module 32 are disclosed in U.S. Pat. Nos. 5,299,977, 5,453,047, 5,507,379, 5,542,880, 5,865,673, 5,997,395, which are incorporated herein by reference in their respective entireties and for all purposes.

The currency processing machine 10 further includes a bank note dispensing module 34 which is connected via a transport mechanism 35 to the user-accessible bank note dispensing receptacle 20. The bank note dispensing module 34 typically dispenses loose bills in response to a request of the user for such bank notes. Also, the bank note dispensing module 34 may be configured to dispense strapped notes into the bank note dispensing receptacle 20 if that is desired. In one embodiment of the present disclosure, the user may select the denominations of the loose/strapped bills dispensed into the bank note dispensing receptacle 20.

The currency processing machine 10 also includes a coin dispensing module 36 which dispenses loose coins to the user via the coin dispensing receptacle 22. The coin dispensing module 36 is connected to the coin dispensing receptacle 22, for example, via a coin tube 37. With this configuration, a user of the currency processing machine 10 has the ability to select the desired coin denominations that he or she will receive during a transaction, for example, in response to user inputs received by one or more of the available input devices. Also, the coin dispensing module 36 may be configured to dispense packaged (e.g., sachet or rolled) coins into the coin dispensing receptacle 22 if that is desired. The coins which have been sorted into their respective denominations by the coin processing module 32 are discharged into one or more coin chutes or tubes 39 which direct coins to a coin receptacle station(s) 40. In at least some aspects, a plurality of tubes 39 are provided and advantageously are positioned to direct coins of specified denominations to designated coin receptacles. The currency processing machine 10 may include more or fewer than the modules illustrated in FIG. 2, such as a coin packaging module or a note packaging module.

The currency processing machine 10 includes a controller 38 which is coupled to each module within the currency processing machine 10, and optionally to an external system, and controls the interaction between each module. For example, the controller 38 may review the input totals from the funds processing modules 30 and 32 and direct an appropriate funds output via the funds dispensing modules 34 and 36. The controller 38 also directs the operation of the coin receptacle station 40 as described below. While not shown, the controller 38 is also coupled to the other peripheral components of the currency processing machine 10, such as a media reader associated with the media reader slot 24 (See FIG. 1) and also to a printer at the receipt dispenser 26, if these devices are present on the coin processing mechanism 10. The controller 38 may be in the nature of a central processing unit (CPU) connected to a memory device. The controller 38 may include any suitable processor, processors and/or microprocessors, including master processors, slave processors, and secondary or parallel processors. The controller 38 may comprise any suitable combination of hardware, software, or firmware disposed inside and/or outside of the housing 11.

Figure 3:
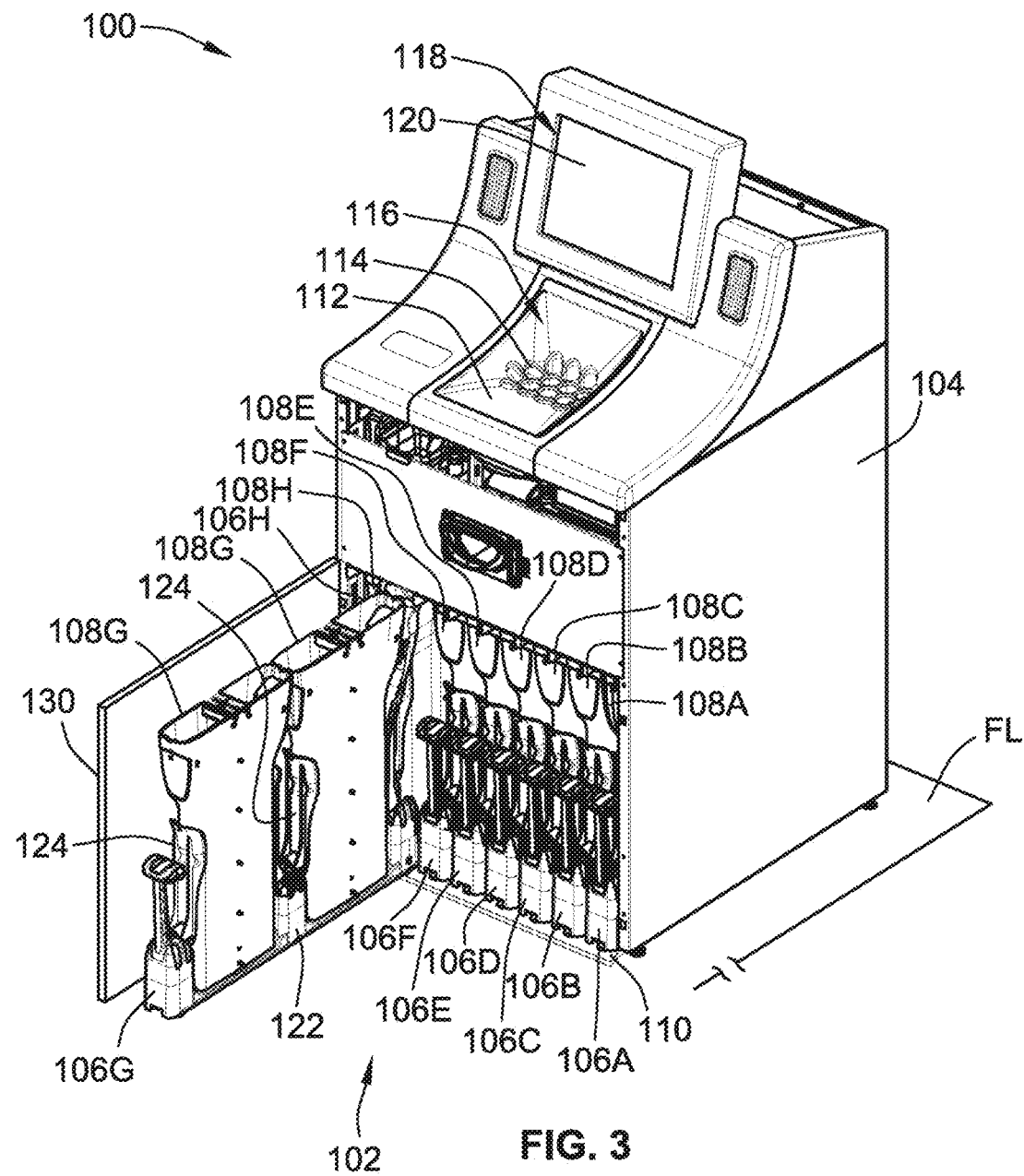
FIG. 3 is a front perspective-view illustration of an example of a coin processing machine in accordance with aspects of the present disclosure.

Another example of a currency processing system is illustrated in accordance with aspects of this disclosure in FIG. 3, this time represented by a coin processing machine 100. The coin processing machine 100 has a coin tray 112 that holds coins prior to and/or during inputting some or all of the coins in the coin tray 112 into the coin processing machine 100. The coin tray 112 may be configured to transfer coins deposited thereon, e.g., by pivoting upwards and/or by downwardly sloping coin surfaces, to a coin sorting mechanism (not visible in FIG. 3; may correspond to coin processing unit 200 of FIG. 4) disposed within a cabinet or housing 104. The coins are transferred from the coin tray 112 to the sorting mechanism, under the force of gravity, via a funnel arrangement 114 formed in a coin input area 116 of the cabinet 104. Once processed, the coin sorting mechanism discharges sorted coins to a plurality of coin bags or other coin receptacles that are housed within the cabinet (or "housing") 104.

A user interface 118 interacts with a controller (e.g., controller 38 of FIG. 2) of the coin processing machine 100. The controller is operable, in at least some embodiments, to control the initiation and termination of coin processing, to determine the coin totals during sorting, to validate the coins, and to calculate or otherwise determine pertinent data regarding the sorted coins. The user interface 118 of FIG. 3 includes a display device 120 for displaying information to an operator of the coin processing machine 100. Like the display device 12 illustrated in FIG. 1, the display device 120 of FIG. 3 may also be capable of receiving inputs from an operator of the coin processing machine 100, e.g., via a touchscreen interface. Inputs from an operator of the coin processing machine 100 can include selection of predefined modes of operation, instructions for defining modes of operation, requests for certain outputs to be displayed on the display device 120 and/or a printer (not shown), identification information, such as an identification code for identifying particular transactions or batches of coins, etc.

During an exemplary batch sorting operation, an operator dumps a batch of mixed coins into the coin tray 112 and inputs an identification number along with any requisite information via the interface 118. The operator (or the machine 100) then transfers some or all of the coins within the coin tray 112 to the sorting mechanism through the coin input area 116 of the cabinet 104. Coin processing may be initiated automatically by the machine 100 or in response to a user input. While the coins are being sorted, the operator can deposit the next batch of coins into the coin tray 112 and enter data corresponding to the next batch. The total value of each processed (e.g., sorted, denominated and authenticated) batch of coins can be redeemed, for example, via a printed receipt or any of the other means disclosed herein.

The coin processing machine 100 has a coin receptacle station 102 disposed within the housing 104. When the coin processing machine 100 is disposed in a retail setting or other publicly accessible environment, e.g., for use as a retail coin redemption machine, the coin receptacle station 102 can be secured inside housing 104, e.g., via a locking mechanism, to prevent unauthorized access to the processed coins. The coin receptacle station 102 includes a plurality of moveable coin-receptacle platforms 106A-H ("moveable platforms"), each of which has one or more respective coin receptacles 108A-H disposed thereon. Each moveable platform 106A-H is slidably attached to a base 110, which may be disposed on the ground beneath the coin processing machine 100, may be mounted to the coin processing machine 100 inside the housing 104, or a combination thereof. In the illustrated embodiment, the coin receptacle station 102 includes eight moveable coin-receptacle platforms 106A-H, each of which supports two coin receptacles 108A-H, such that the coin processing machine 100 accommodates as many as sixteen individual receptacles. Recognizably, the coin processing machine 100 may accommodate greater or fewer than sixteen receptacles that are supported on greater or fewer than eight coin-receptacle platforms.

The coin receptacles 108A-H of the illustrated coin receptacle station 102 are designed to accommodate coin bags. Alternative variations may be designed to accommodate coin cassettes, cashboxes, coin bins, etc. Alternatively still, the moveable platforms 106A-H may have more than one type of receptacle disposed thereon. In normal operation, each of the coin receptacles 108A-H acts as a sleeve that is placed inside of a coin bag to keep coins within a designated volume during filling of the coin bag. In effect, each coin receptacle 108A-H acts as an internal armature, providing an otherwise non-rigid coin bag with a generally rigid internal geometry. Each of the platforms 106A-H includes a coin bag partition 122 that separates adjacent coin bags from one another for preventing coin bags from contacting adjacent coin bags and disrupting the flow of coins into the coin bags. For other embodiments, each moveable platform 106A-H may include multiple partitions 122 to accommodate three or more coin receptacles 108A-H. The moveable platforms 106A-H also include bag clamping mechanisms 124 for each of the coin receptacles 108A-H. Each bag clamping mechanism 124 operatively positions the coin bag for receiving processed coins, and provides structural support to the coin receptacle 108A-H when the moveable platform 106A-H is moved in and out of the machine.

The number of moveable platforms 106A-H incorporated into the coin processing machine 100 can correspond to the number of coin denominations to be processed. For example, in the U.S. coin set: pennies can be directed to the first coin receptacles 108A disposed on the first moveable platform 106A, nickels can be directed to the second coin receptacles 108B disposed on the second moveable platform 106B, dimes can be directed to the third coin receptacles 108C disposed on the third moveable platform 106C, quarters can be directed to the fourth coin receptacles 108D disposed on the fourth moveable platform 106D, half-dollar coins can be directed to the fifth coin receptacles 108E disposed on the fifth moveable platform 106E, dollar coins can be directed to the sixth coin receptacles 108F disposed on the sixth moveable platform 106F. The seventh and/or eighth moveable platforms 106G, 106H can be configured to receive coin overflow, invalid coins, or other rejected coins. Optionally, coins can be routed to the coin receptacles 108A-H in any of a variety of different manners. For example, in the illustrated configuration, if the operator of the coin processing machine 100 is anticipating a larger number of quarters than the other coin denominations, three or more of the coin receptacles 108A-H on the moveable platforms 106A-H may be dedicated to receiving quarters. Alternatively, half-dollar coins and dollar coins, of which there are fewer in circulation and regular use than the other coin denominations, can each be routed to a single dedicated coin receptacle.

In operation, an operator of the coin processing machine 100 who desires to access one or more of the coin receptacles 108A-H unlocks and opens a front door 130 of the housing 104 to access the coin receptacle station 102. Depending on which coin receptacle(s) the operator needs to empty, for example, the operator slides or otherwise moves one of the moveable coin-receptacle platforms 106A-H from a first "stowed" position inside the housing 104 (e.g., moveable platform 106A in FIG. 3) to a second "extracted" position outside of the housing 104 (e.g., moveable platform 106G in FIG. 3). If any of the coin bags are filled and need to be replaced, the operator may remove filled coin bags from the extracted movable platform, replace the filled coin bags with empty coin bags, return the movable platform to the stowed position, and subsequently shut and lock the front door 130.

Figure 4:
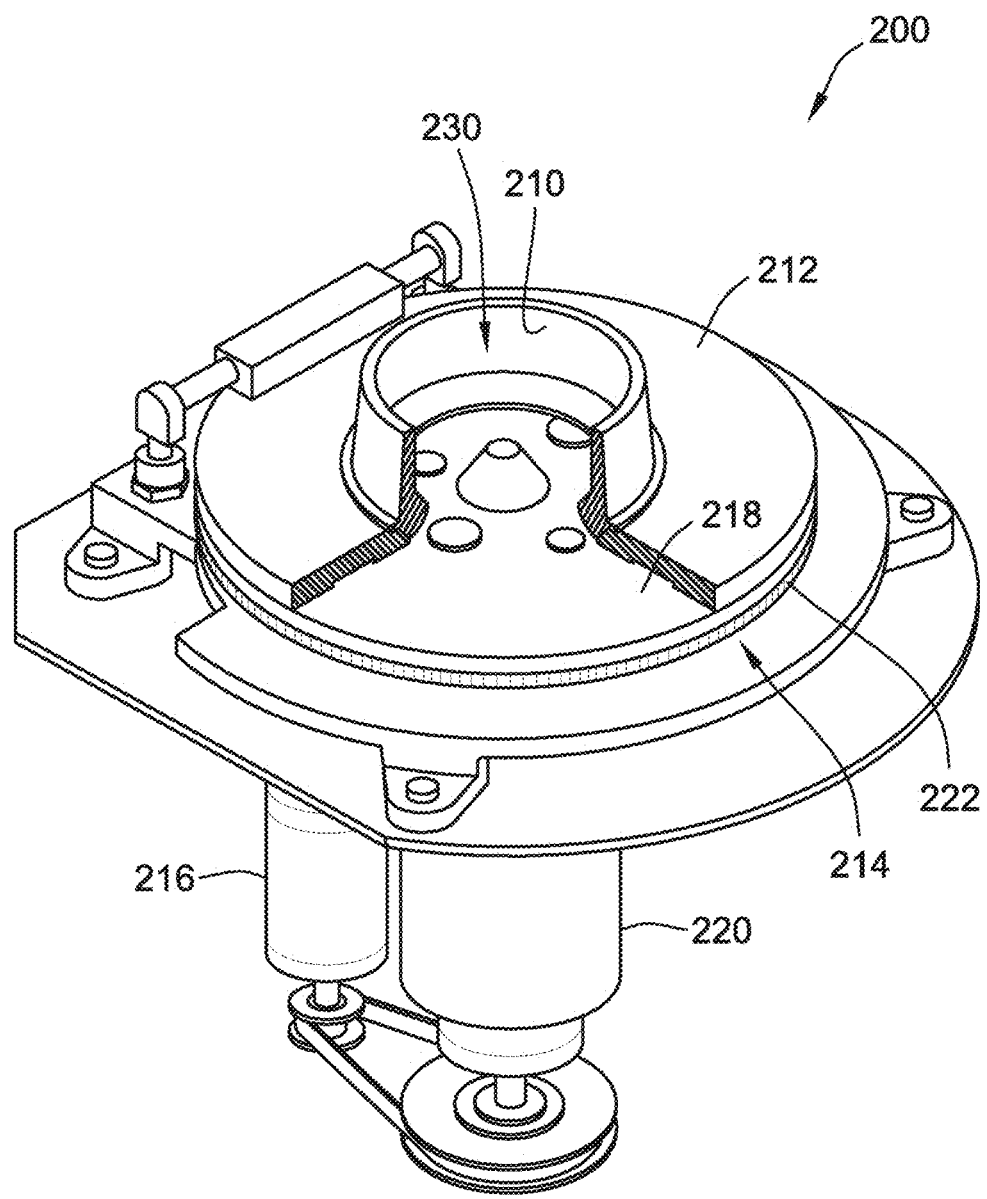
FIG. 4 is a partially broken away perspective-view illustration of an example of a disk-type coin processing unit in accordance with aspects of the present disclosure.

FIG. 4 shows a non-limiting example of a coin sorting device, represented herein by a disk-type coin processing unit 200 that can be used in any of the currency processing systems, methods and devices disclosed herein. The coin processing unit 200 includes a hopper channel, a portion of which is shown at 210, for receiving coins of mixed denominations from a coin input area (e.g., coin input areas 14 or 116 of FIGS. 1 and 3). The hopper channel 210 feeds the coins through a central opening 230 in an annular, stationary sorting head 212 (oftentimes referred to as a "sorting disk" or "sort disk"). As the coins pass through this opening, the coins are deposited onto the top surface of a resilient pad 218 disposed on a rotatable disk 214. According to some embodiments, coins are initially deposited by a user onto a coin tray (e.g., coin tray 112 of FIG. 3) disposed above the coin processing unit 200; coins flow from the coin tray into the hopper channel 210 under the force of gravity.

This rotatable disk 214 is mounted for rotation on a shaft (not visible) and driven by an electric motor 216. The rotation of the rotatable disk 214 of FIG. 4 is slowed and stopped by a braking mechanism 220. The disk 214 typically comprises a resilient pad 218, preferably made of a resilient rubber or polymeric material, that is bonded to, fastened on, or integrally formed with the top surface of a solid disk 222. The resilient pad 218 may be compressible such that coins laying on the top surface thereof are biased or otherwise pressed upwardly against the bottom surface of the sorting head 212 as the rotatable disk 214 rotates. The solid disk 222 is typically fabricated from metal, but it can also be made of other materials, such as a rigid polymeric material.

The underside of the inner periphery of the sorting head 212 is spaced above the pad 218 by a distance which is approximately the same as or, in some embodiments, just slightly less than the thickness of the thinnest coin. While the disk 214 rotates, coins deposited on the resilient pad 218 tend to slide outwardly over the top surface of the pad 218 due to centrifugal force. As the coins continue to move outwardly, those coins that are lying flat on the pad 218 enter a gap between the upper surface of the pad 218 and the lower surface of the sorting head 212. As is described in further detail below, the sorting head 212 includes a plurality of coin directing channels (also referred to herein as "exit channels") for manipulating the movement of the coins from an entry area to a plurality of exit stations (or "exit slot") where the coins are discharged from the coin processing unit 200.

The coin directing channels may sort the coins into their respective denominations and discharge the coins from exit stations in the sorting head 212 corresponding to their denominations.

Figure 5:
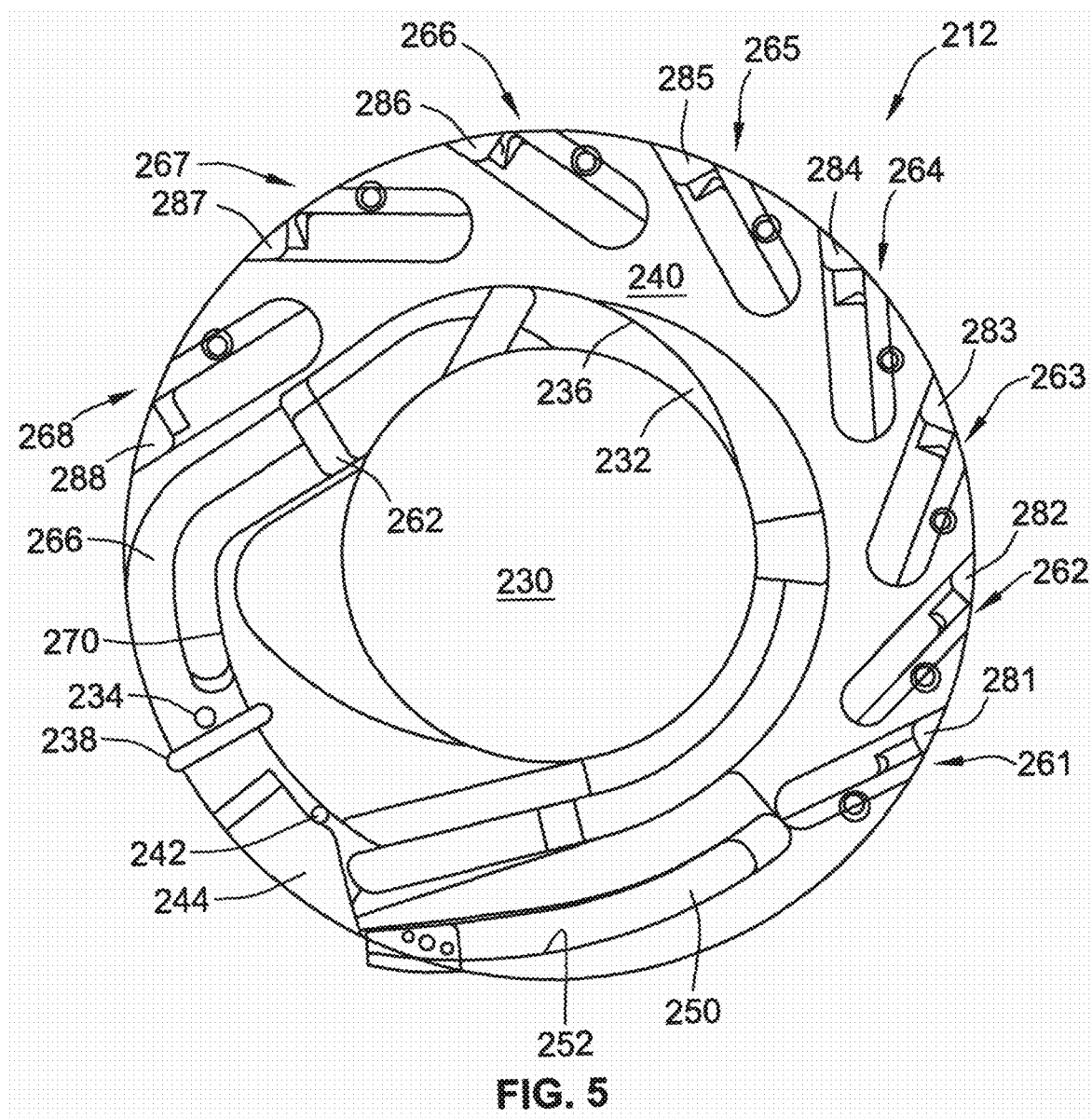
FIG. 5 is an enlarged bottom-view illustration of the sorting head of the exemplary disk-type coin processing unit of FIG. 4.

Referring now to FIG. 5, the underside of the sorting head 212 is shown. The coin set for a given country can be sorted by the sorting head 212 due to variations in the diameter and/or thickness of the individual coin denominations. For example, according to the United States Mint, the U.S. coin set has the following diameters:

Penny=0.750 in. (19.05 mm)
Nickel=0.835 in. (21.21 mm)
Dime=0.705 in. (17.91 mm)
Quarter=0.955 in. (24.26 mm)
Half Dollar=1.205 in. (30.61 mm)
Presidential One Dollar=1.043 in. (26.49 mm)

The coins circulate between the stationary sorting head 212 and the rotating pad 218 on the rotatable disk 214, as shown in FIG. 4. Coins that are deposited on the pad 218 via the central opening 230 initially enter an entry channel 232 formed in the underside of the sorting head 212. It should be kept in mind that the circulation of the coins in FIG. 5 appears counterclockwise as FIG. 5 is a view of the underside of the sorting head 212.

An outer wall 236 of the entry channel 232 divides the entry channel 232 from the lowermost surface 240 of the sorting head 212. The lowermost surface 240 is preferably spaced from the pad 218 by a distance that is slightly less than the thickness of the thinnest coins. Consequently, the initial outward radial movement of all the coins is terminated when the coins engage the outer wall 236, although the coins continue to move more circumferentially along the wall 236 (e.g., in a counterclockwise direction in FIG. 5) by the rotational movement imparted to the coins by the pad 218 of the rotatable disk 214.

While the pad 218 continues to rotate, those coins that were initially aligned along the wall 236 move across the ramp 262 leading to a queuing channel 266 for aligning the innermost edge of each coin along an inner queuing wall 270. The coins are gripped between the queuing channel 266 and the pad 218 as the coins are rotated through the queuing channel 266. The coins, which were initially aligned with the outer wall 236 of the entry channel 232 as the coins move across the ramp 262 and into the queuing channel 266, are rotated into engagement with inner queuing wall 270. As the pad 218 continues to rotate, the coins which are being positively driven by the pad move through the queuing channel 266 along the queuing wall 270 past a trigger sensor 234 and a discrimination sensor 238, which may be operable for discriminating between valid and invalid coins. In some embodiments, the discrimination sensor 238 may also be operable to determine the denomination of passing coins. The trigger sensor 234 sends a signal to the discrimination sensor 238 that a coin is approaching.

In the illustrated example, coins determined to be invalid are rejected by a diverting pin 242 that is lowered into the coin path such that the pin 242 impacts the invalid coin and thereby redirects the invalid coin to a reject channel 244. In some embodiments, the reject channel 244 guides the rejected coins to a reject chute that returns the coin to the user (e.g., rejected coins ejected into the coin reject tube 33 to the coin dispensing receptacle 22 of FIG. 2). The diverting pin 242 depicted in FIG. 5 remains in a retracted "non-diverting" position until an invalid coin is detected. Those coins not diverted into the reject channel 244 continue along inner queuing wall 270 to a gauging region 250. The inner queuing wall 270 terminates just downstream of the reject channel 244; thus, the coins no longer abut the inner queuing wall 270 at this point and the queuing channel 266 terminates. The radial position of the coins is maintained, because the coins remain under pad pressure, until the coins contact an outer wall 252 of the gauging region 250.

The gauging wall 252 aligns the coins along a common outer radius as the coins approach a series of coin exit channels 261-268 which discharge coins of different denominations through corresponding exit stations 281-288. The first exit channel 261 is dedicated to the smallest coin to be sorted (e.g., the dime in the U.S. coin set). Beyond the first exit channel 261, the sorting head 212 shown in FIGS. 4 and 5 forms seven more exit channels 262-268 which discharge coins of different denominations at different circumferential locations around the periphery of the sorting head 212. Thus, the exit channels 261-268 are spaced circumferentially around the outer periphery of the sorting head 212 with the innermost edges of successive channels located progressively closer to the center of the sorting head 212 so that coins are discharged in the order of increasing diameter. The number of exit channels can vary according to alternative embodiments of the present disclosure.

The innermost edges of the exit channels 261-268 are positioned so that the inner edge of a coin of only one particular denomination can enter each channel 261-268. The coins of all other denominations reaching a given exit channel extend inwardly beyond the innermost edge of that particular exit channel so that those coins cannot enter the channel and, therefore, continue on to the next exit channel under the circumferential movement imparted on them by the pad 218. To maintain a constant radial position of the coins, the pad 218 continues to exert pressure on the coins as they move between successive exit channels 261-268.

Further details of the operation of the sorting head 212 shown in FIGS. 4 and 5 are disclosed in U.S. Patent Application Publication No. US 2003/0168309 A1, which is incorporated herein by reference in its entirety. Other disk-type coin processing devices and related features that may be suitable for use with the coin processing devices disclosed herein are shown in U.S. Pat. Nos. 6,755,730; 6,637,576; 6,612,921; 6,039,644; 5,997,395; 5,865,673; 5,782,686; 5,743,373; 5,630,494; 5,538,468; 5,507,379; 5,489,237; 5,474,495; 5,429,550; 5,382,191; and 5,209,696, each of which is incorporated herein by reference in its entirety and for all purposes. In addition, U.S. Pat. Nos. 7,188,720 B2, 6,996,263 B2, 6,896,118 B2, 6,892,871 B2, 6,810,137 B2, 6,748,101 B1, 6,731,786 B2, 6,724,926 B2, 6,678,401 B2, 6,637,576 B1, 6,609,604, 6,603,872 B2, 6,579,165 B2, 6,318,537 B1, 6,171,182 B1, 6,068,194, 6,042,470, 6,039,645, 6,021,883, 5,982,918, 5,943,655, 5,905,810, 5,564,974, and 4,543,969, and U.S. Patent Application Publication Nos. 2007/0119681 A1 and 2004/0256197 A1, are incorporated herein by reference in their respective entireties and for all purposes.

The above referenced U.S. patents and published application described in more detail various operating speeds of the disk-type coin processing devices such as shown in FIG. 4. For example, according to some embodiments, sorting head 212 has an eleven inch diameter and the pad 218 rotates at a speed of approximately three hundred revolutions per minute (300 rpm). According to some embodiments, the sorting head 212 has an eleven inch diameter and the pad 218 rotates at a speed of about 350 rpm. According to some embodiments, the sorting disc 214 has an eleven inch diameter and is capable of sorting a retail mix of coins at a rate of about 3000 coins per minute when operating at a speed for about 250 rpm. A common retail mix of coins is about 30% dimes, 28% pennies, 16% nickels, 15% quarters, 7% half-dollar coins, and 4% dollar coins. According to some embodiments of the coin processing system 200 of FIG. 4, the system 200 is cable of sorting a retail mix of coins at a rate of about 3300 coins per minute when the sorting head 212 has a diameter of eleven inches and the disc is rotated at about 300 rpm. According to some embodiments, the coin processing system 200 is capable of sorting a "Euro financial mix" of coins at rate of about 3400 coins per minute, wherein the sorting head 212 has a diameter of eleven inches and the disc is rotated at about 350 rpm. A common Euro financial mix of coins made up of about 41.1% 2 Euro coins, about 16.7% 1 Euro coins, about 14.3% 50¢ Euro coins, about 13.0% 20¢ Euro coins, about 11.0% 10¢ Euro coins, about 12.1% 5¢ coins and about 8.5% 1¢ Euro coins. According to some embodiments, a coin processing system counts and discriminates at least about 2350 mixed coins per minute or at least about 4280 U.S. nickels per minute, when operating at a speed of about 250 rpm. According to some embodiments, a coin processing system sorts at least about 3300 mixed coins per minute or at least about 6000 U.S. nickels per minute, when operated at a speed of at about 350 rpm.

According to some embodiments, when an eight (8) inch sort head is used to process dimes only and the rotatable disc is operated at 300 rpm, the dimes are counted at a rate of at least about 2200 coins per minute. When only U.S. quarters (diameter=0.955 inch) are counted, the quarters are counted at a rate of at least about 1000 coins per minute. A common retail mix of coins is about 30% dimes, 28% pennies, 16% nickels, 15% quarters, 7% half-dollars, and 4% dollars. When this retail mix of coins is placed in the coin sorter system having an eight (8) inch sort head, the coins are sorted and counted at a rate of at least about 1200 coins per minute. When this same eight (8) inch sort head is used to process dimes only and the rotatable disc is operated at 500 rpm, the dimes are counted at a rate of at least about 3600 coins per minute. When only U.S. quarters are counted, the quarters are counted at a rate of at least about 1600 coins per minute when the disc is rotated at 500 rpm. When the above retail mix of coins is placed in the coin sorter system having an eight (8) inch sort head and the disc is rotated at 500 rpm, the coins are sorted and counted at a rate of at least about 2000 coins per minute.

According to some embodiments, a 13-inch diameter sorting head 212 is operated at various speeds such as 115 rpm, 120 rpm (low-speed mode), 125 rpm, 360 rpm, and 500 rpm (nominal sorting speed).

According to some embodiments, a 13-inch diameter sorting head 212 is operated to count and sort mixed coins at rates in excess of 600, 2000, 3000, 3500, and 4000 coins per minute.

Figure 6:
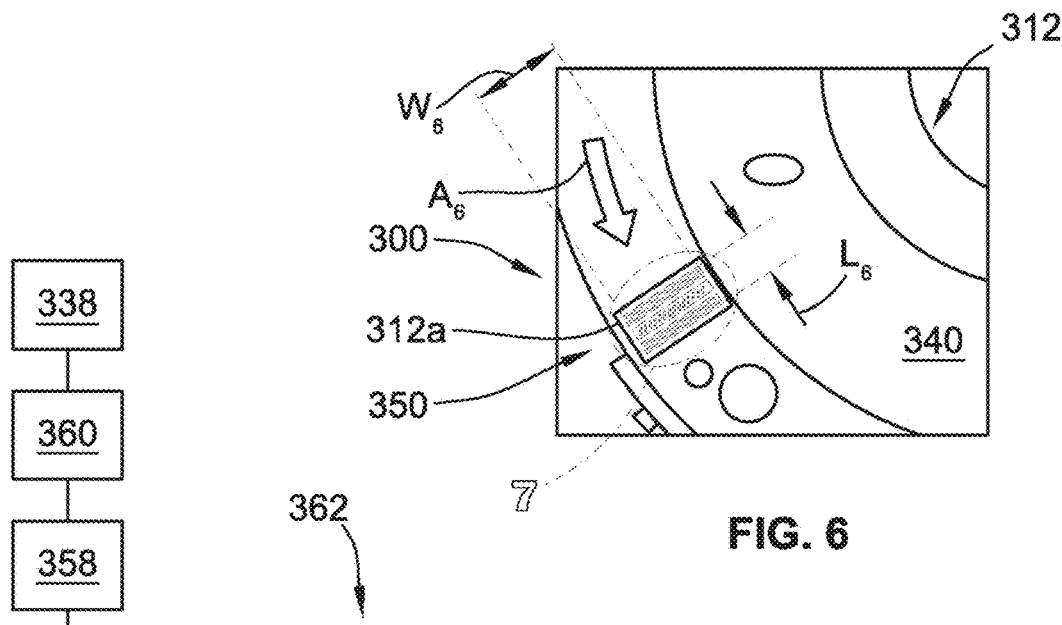
FIG. 6 is an underside perspective-view illustration of the annular sorting head of a disk-type coin processing unit with a representative linear array of optical coin-imaging sensors in accordance with aspects of the present disclosure.

Turning next to FIG. 6, there is shown a coin processing unit, designated generally as 300, for sorting coins, counting coins, authenticating coins, denominating coins, validating coins, and/or any other form of processing coins. As indicated above, the coin processing unit 300 can be incorporated into or otherwise take on any of the various forms, optional configurations, and functional alternatives described herein with respect to the examples shown in FIGS. 1-5, and thus can include any of the corresponding options and features. By way of non-limiting example, the coin processing unit 300 of FIG. 6 may be a disk-type coin processing unit for sorting batches of coins, including batches with coins of mixed denomination, country of origin, etc. The coin processing unit 300 is operatively coupled to the coin input area of a currency processing system (e.g., coin input area 116 of coin processing machine 100) to receive therefrom deposited coins, and is also operatively coupled to one or more coin receptacles (e.g., coin receptacles 108A-H) into which processed coins are deposited. In alternative embodiments, the sensor arrangements or coin imaging assemblies disclosed herein can be incorporated into other types of coin processing apparatuses, such as programmable power rail coin processing devices, without departing from the intended scope and spirit of the present disclosure.

Similar to the disk-type coin processing unit 200 of FIGS. 4 and 5, the coin processing unit 300 of FIG. 6 comprises a rotatable disk (not visible in FIG. 6, but structurally and functionally similar to the rotatable disk 214 of FIG. 4) for supporting on an upper surface thereof and imparting motion to coins received from the coin input area of the currency processing system. Like the configuration illustrated in FIG. 4, the rotatable disk of FIG. 6 can be mounted for common rotation with a drive shaft that is driven by an electric motor. A stationary sorting head 312, which is adjacent the rotatable disk, has a lower surface 340 that is located generally parallel to and spaced slight apart from the top surface of the rotatable disk. The lower surface 340 of the sorting head 312 forms a plurality of distinctly shaped regions (or "exit channels"), each of which guides coins of a common diameter, responsive to motion imparted thereto by the rotatable disk, to one of various exit stations through which the coins are discharged from the coin processing unit 300 to the one or more coin receptacles.

Figure 7:
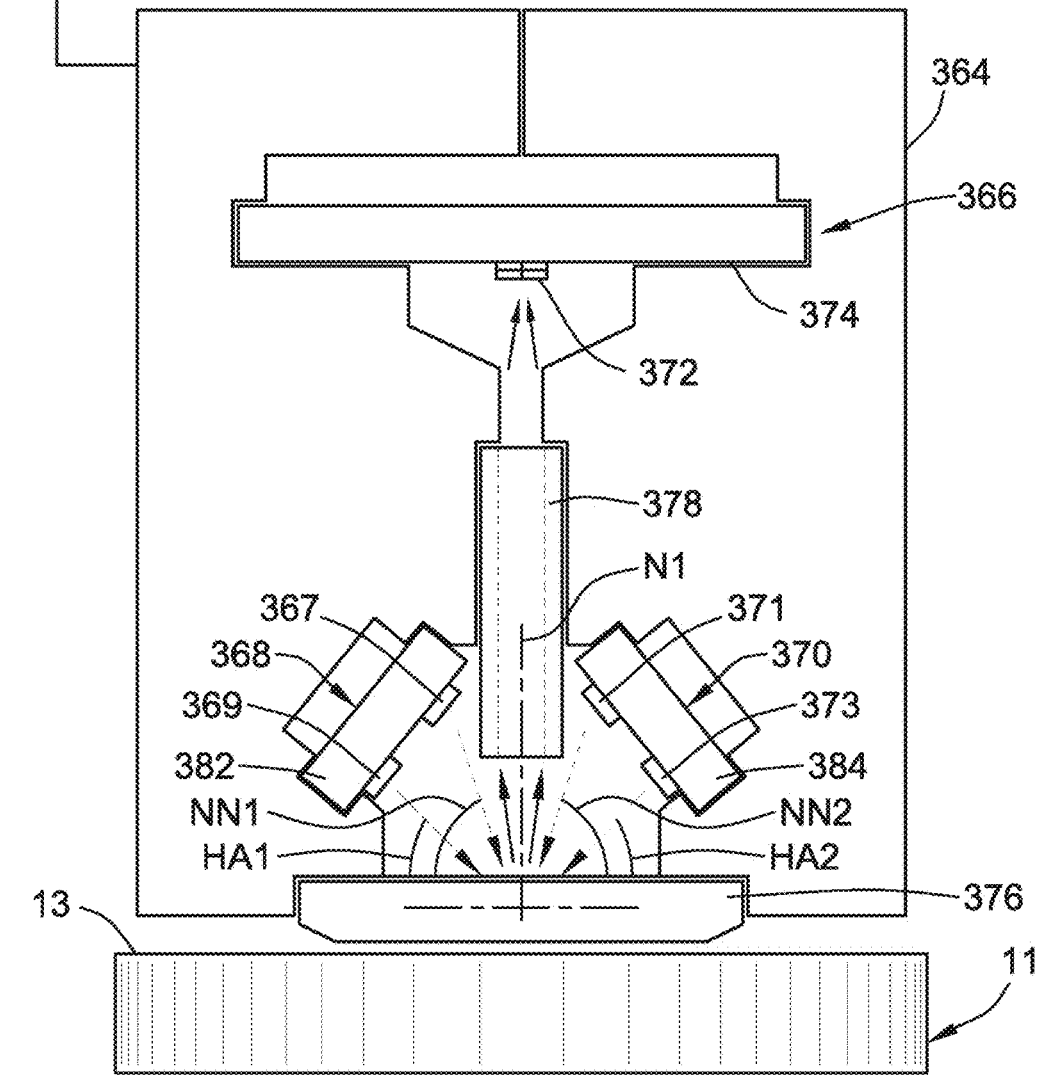
FIG. 7 is a schematic illustration of an example of a linear optical sensor arrangement in accordance with aspects of the present disclosure.

A linear array of sensors, designated generally as 350 in FIG. 6, is mounted proximate to, within and/or, as shown, directly on the sorting head 312 adjacent and, in some embodiments, facing the rotatable disk. The linear array of sensors 350 examines or otherwise senses coins seated on the rotatable disk and outputs a signal indicative of coin image information for each of the processed coins. By way of non-limiting example, the linear array of sensors 350 includes a row of rectilinearly aligned optical sensors for detecting topographic variations, surface details, coin wear, and/or other pre-designated characteristics of passing coins. The sensor array 350 has a width $W_6$ parallel to a radius of the rotatable disk and a length $L_6$ perpendicular to its width $W_6$. Coins move past the sensor array 350 in direction $A_6$ which is generally perpendicular to the width $W_6$ of the sensor array 350. The sensor array 350 illuminates passing coins and receives reflected light from passing coins via opening 312a in the sorting head 312. For some embodiments, the coin processing unit 300 may include one or more additional sensor arrays positioned, for example, to image obverse and reverse faces of the coin and/or the side of the coin. The sensor array(s) could also extend beyond the sorting disk, for example, in configurations where the coins extend outside the sorting disk. With reference to FIGS. 6 and 7, the coin image information signals are stored, for example, in memory device 360 or any other type of computer-readable medium. The memory device 360 can be read, for example, by one or more processors 338 whereby the signals can be interpreted, and an image of the topographic variations in the coin can be generated. The imaging information detected by the sensor array 350 can be processed by array electronics (e.g., an analog signal filter in the sensor circuit 358) and interpreted by imaging software (e.g., stored in a physical, non-transient computer readable medium associated with the processor(s) 338). With the coin image information signals received from the coin imaging sensor system 350, the processor(s) 338 can determine, for example, whether each of the coins is valid or invalid, which may include determining the denomination and/or authenticity of each coin, by comparing the sensed coin image to a previously authenticated image that is stored in a library in the memory device 360.

FIG. 7 of the drawings illustrates one of the linear optical sensors (or "sensor arrangement") 362 from the sensor array 350 of FIG. 6. In the illustrated example, the sensor arrangement 362 includes a bipartite housing 364 within which is nested a photodetector 366 and first and second light emitting devices 368 and 370, respectively. Photodetector 366 comprises a linear array of light-sensitive photosensors 372 that detect the presence of visible light, infrared (IR), and/or ultraviolet (UV) light energy. For example, each photosensor may utilize a photoconductive semiconductor in which the electrical conductance varies depending on the intensity of radiation striking the semiconductor. In this regard, the photosensors 372 may take on any of a variety of available configurations, such as photodiodes, bipolar phototransistors, active-pixel sensors (APS), photosensitive field-effect transistors (photoFET), etc. Enclosed within the housing 364 is a printed circuit board (PCB) 374 with a lower surface onto which the photosensors 372 are mounted and oriented with a normal incidence with the upper surface 13 of a passing coin 11. The angle of incidence is the angle between a ray or line incident on a surface and a line perpendicular to that surface at the point of incidence, called the normal N1. For the embodiment of FIG. 7, the angle between a straight line perpendicular to the photosensors 372 and the normal N1 of the coin's upper surface 13 is zero or substantially zero.

The first light emitting device 368 of the sensor arrangement 362 of FIG. 7 comprises multiple light sources for controllably emitting light onto the surface 13 of the passing coin 11 at multiple distinct incidences. By way of example, and not limitation, the light sources of the first light emitting device 368 comprise a first row of light emitting diodes (LED) 367 configured to emit light onto the coin 11 at a first near-normal angle of incidence NN1, and a second row of LEDs 369 configured to emit light onto the coin 11 at a first high-angle of incidence HAL Likewise, the second light emitting device 370, which is diametrically spaced from the first light emitting device 368 relative to the coin 11, comprises multiple light sources for controllably emitting light onto the surface 13 of the passing coin 11 at multiple distinct incidences. In the illustrated example, the light sources of the second light emitting device 370 comprises a third row of LEDs 371 configured to emit light onto the coin 11 at a second near-normal angle of incidence NN2, and a fourth row of LEDs 373 configured to emit light onto the coin 11 at a second high-angle of incidence HA2. For near-normal incidence, the angle of incidence of illumination is approximately or substantially parallel to, but not completely parallel to the normal of the surface of the coin 11. For example, the first near-normal incidence NN1 may be equal to approximately 5 degrees from the normal N1, while the second near-normal incidence NN2 may be equal to approximately −5 degrees from the normal N1. Comparatively, for high-angle incidence, the angle of incidence of illumination is an oblique angle that is at least approximately 45 degrees from the normal of the coin. In the illustrated embodiment, for example, the first high-angle of incidence HA1 may be equal to approximately 65 degrees from the normal N1 of the coin 11, whereas the second high-angle of incidence HA2 may be equal to approximately −65 degrees from the normal N1.

A transparent quartz cover glass 376 is mounted to the housing 364 under the photodetector 366 to allow light generated by the light emitting devices 368, 370 to pass from the housing 364 to the surface 13 of the coin 11, and to allow light reflected off of the coin 11 to reenter the housing 364 and be captured by the linear array of photosensors 372. Disposed between the photodetector 366 and the passing coin 11 is a lens array 378 for focusing light reflected off of the coin 11 (e.g., via internal refraction) and transmitting the light to the photodetector 366. The lens array 378 may take on a variety of different forms, including a gradient-index (GRIN) lens array or a SELFOC® lens array (SLA), for example.

With continuing reference to FIG. 7, the photodetector 366 senses the time of reflection, intensity and/or incidence angle of the light reflected off of the surface 13 of the coin 11 and outputs a signal indicative of the reflected light as coin image information for optically imaging and processing the coin. One or more processors 338 read or otherwise receive the coin image information signals and determine therefrom whether the passing coin is valid or invalid, which may include determining a denomination, a fitness, a country of origin, or an authenticity, or any combination thereof, of the passing coin by comparing the image data with a library of image data of authentic coins. One or more processors 338 may be operable to selectively simultaneously activate both the first and second light emitting devices 368, 370, and thus all four rows of LEDs 367, 369, 371, 373, to thereby simultaneously provide both high-angle and near-normal illumination (referred to herein as "uniform illumination") of the surface 13 of the passing coin 11. The one or more processors 338 may be further operable to selectively activate only one of the light emitting devices 368, 370 or only the second and fourth rows of high-angle LEDs 369, 373 to thereby provide only high-angle illumination (otherwise referred to herein as "edge-enhanced illumination") of the surface 13 of coin 11. When all four rows of LEDs 367, 369, 371, 373 are turned on such that the coin 11 is illuminated uniformly, the features and details of the surface 13 of coin 11 are visible to the detector. Comparatively, when only high-angle incidence illumination is provided, then an optically edge-enhanced image is obtained, which can be used to measure the topography and wear of the coin. The user can electronically choose the type of illumination suitable for the task required. The sensor arrangement 362 of FIG. 7 allows for real-time electronic selection between the aforementioned types of coin illumination to enable enhanced functionality, such as improved authentication and fitness measurement.

Figure 8:
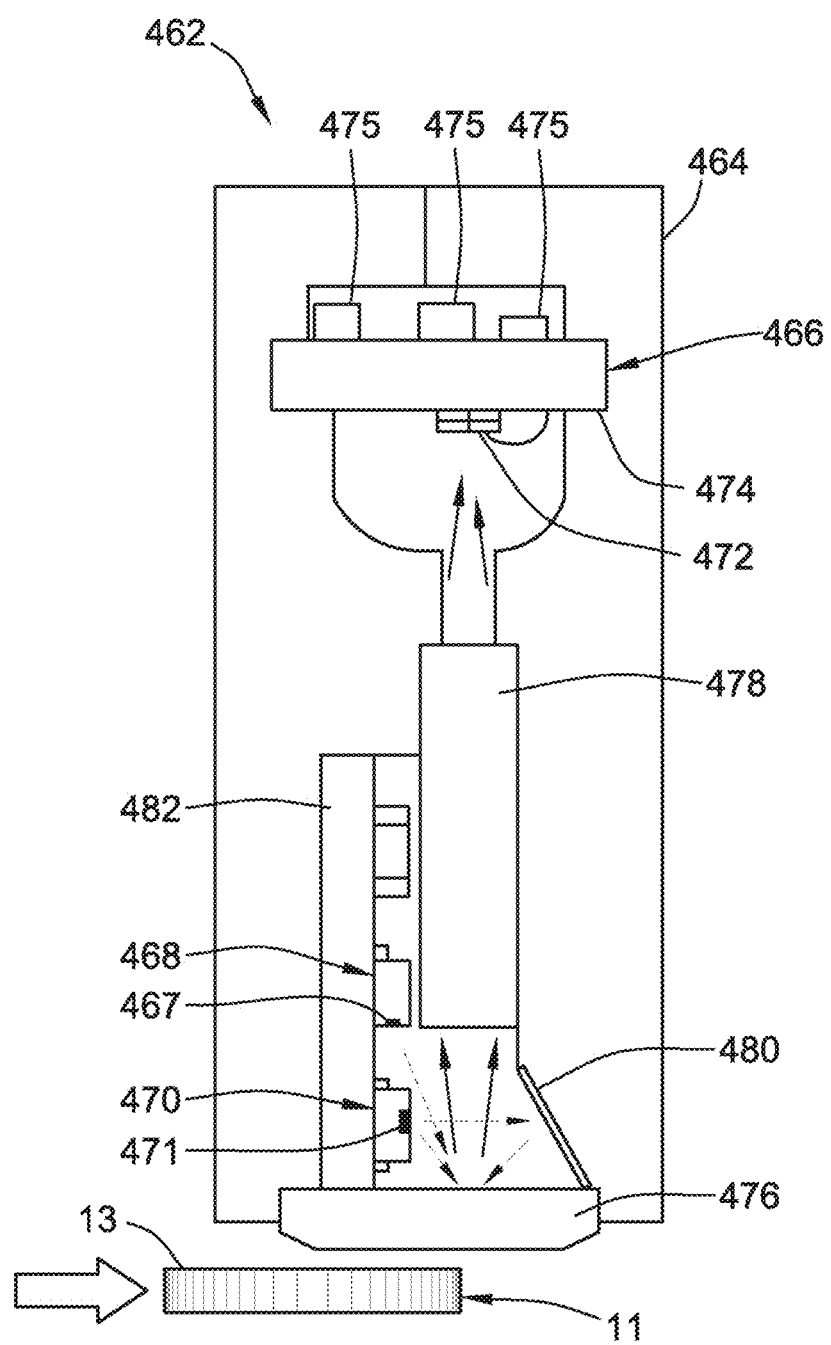
FIG. 8 is a schematic illustration of another example of a linear optical sensor arrangement in accordance with aspects of the present disclosure.
Figure 9:
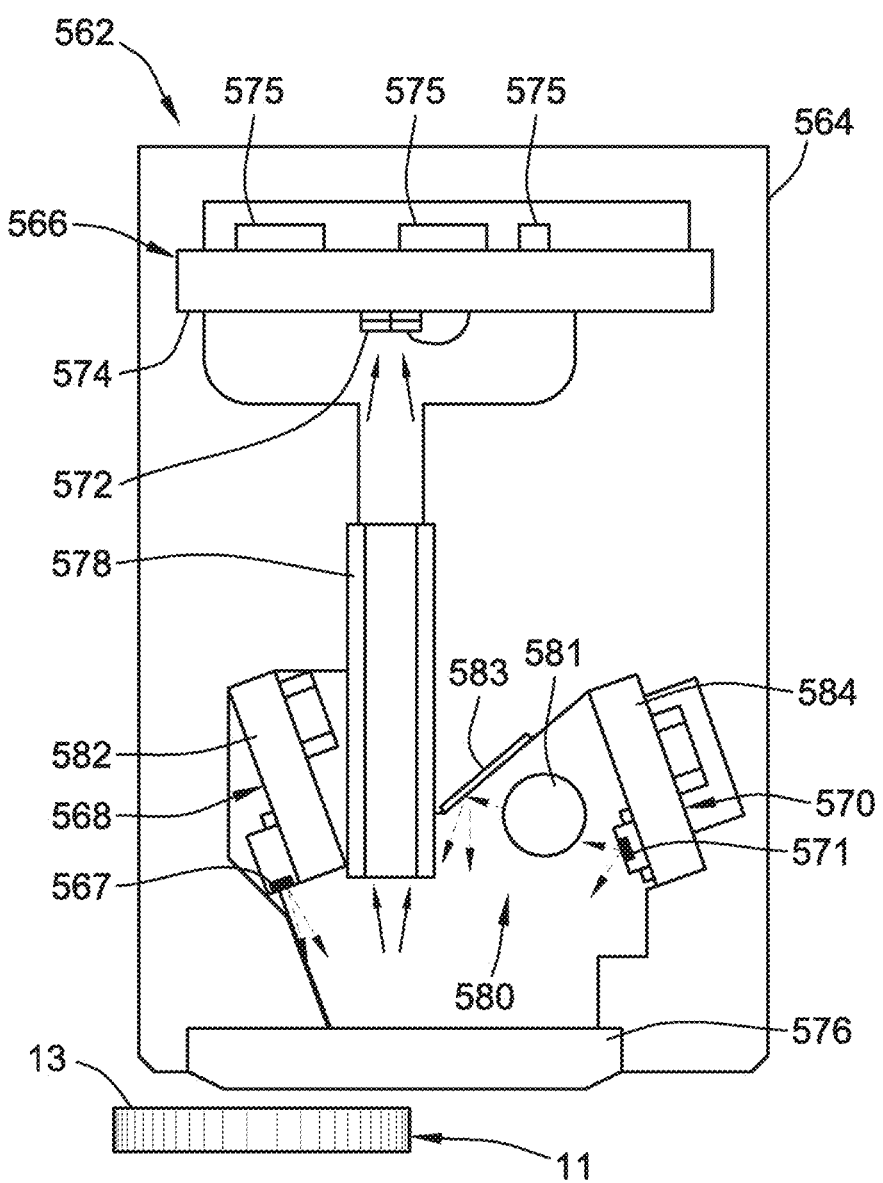
FIG. 9 is a schematic illustration of yet another example of a linear optical sensor arrangement in accordance with aspects of the present disclosure.

Shown in FIGS. 8 and 9 are alternative architectures for the linear optical sensors of the sensor array 350 of FIG. 6. Unless otherwise logically prohibited, the architectures shown in FIGS. 8 and 9 may include any of the features, options and alternatives described above with respect to the architecture in FIG. 7, and vice versa. In the embodiment illustrated in FIG. 8, for example, the sensor arrangement 462 includes a bipartite housing 464 within which is nested a photodetector 466 and first and second light emitting devices 468 and 470, respectively. Like the photodetector 366 of FIG. 7, the photodetector 466 of FIG. 8 comprises a linear array of light-sensitive photosensors 472 that detect the presence of visible light, infrared (IR), and/or ultraviolet (UV) light energy. Enclosed within the housing 464 is a printed circuit board (PCB) 474 with a lower surface onto which the photosensors 472 are mounted and oriented with a normal incidence with the upper surface 13 of a passing coin 11. The PCB 474 supports on an upper surface thereof electronics 475 of the photodetector 466, such as electronics that amplify and process an electronic signal output by a photocell in the photosensor that converts an optical signal into the electronic signal.

In the sensor arrangement 462 of FIG. 8, the first light emitting device 468 comprises one or more light sources for controllably emitting light onto the surface 13 of the passing coin 11 at near-normal incidence. According to one non-limiting example, the first light emitting device 468 comprises a row of light emitting diodes (LED) 467 configured to emit light onto the coin 11 at a near-normal angle of incidence. The second light emitting device 470, however, comprises one or more light sources for controllably emitting light onto the surface 13 of the passing coin 11 at high-angle incidence. In the illustrated example, the second light emitting device 470 comprises a row of LEDs 471 configured to emit light onto the coin 11 at a high-angle of incidence. In contrast to the light emitting devices 368, 370 illustrated in FIG. 7, each light emitting device 468, 470 in the architecture of FIG. 8 is operable to emit light at either high-angle or near-normal incidence. As another point of demarcation, the light emitting devices 468, 470 are both mounted to the same LED printed circuit board (PCB) 482 that is located on the rear side of the housing 464. The light emitting devices 468, 470 are spaced vertically on the LED PCB 482. The light emitting devices 368, 370 of FIG. 7, in contrast, are each mounted to their own respective LED PCB 382 and 384, each of which is positioned at a distinct location within the housing 364. Optionally, the illumination means may comprise a pair of optical waveguides each with multiple LEDs.

Extending across and mounted inside an opening in the housing 464 of the sensor arrangement 462 is a transparent cover glass 476. The cover glass 476 allows light generated by the light emitting devices 468, 470 to pass from the housing 464 to the surface 13 of the coin 11, and then allows light reflected off of the coin 11 to reenter the housing 464 and be captured by the linear array of photosensors 472. Disposed between the photodetector 466 and the passing coin 11 is a lens array 478, such as an SLA or GRIN lens array, for focusing light reflected off of the coin 11 and transmitting the light to the photodetector 466. The architecture of FIG. 8 also utilizes a light diffusing element 480 that is operable to diffuse high-angle incidence light emitted by the second light emitting device 470. In the illustrated example, one or more sections of the inside walls of the sensor housing 464 are coated by scattering media to provide efficient and uniform illumination.

Similar to the sensor arrangements 362, 462 of FIGS. 7 and 8, the sensor arrangement 562 of FIG. 9 includes a rigid outer housing 564 within which is nested a photodetector 566 and a pair of light emitting devices 568 and 570. Like the photodetectors 366 and 466, the photodetector 566 of FIG. 9 comprises a linear array of light-sensitive photosensors 572 that detect the presence of visible light, infrared (IR), and/or ultraviolet (UV) light energy. Enclosed within the housing 564 is a printed circuit board (PCB) 574 with a lower surface onto which the photosensors 572 are mounted and oriented with a normal incidence with the upper surface 13 of a passing coin 11. The PCB 574 also supports on an upper surface thereof electronics 575 which control operation of the photosensors 572.

For the sensor arrangement 562 of FIG. 9, the first light emitting device 568 comprises one or more light sources for controllably emitting light onto the surface 13 of the passing coin 11 at near-normal incidence. By way of example, the first light emitting device 568 comprises a row of light emitting diodes (LED) 567 configured to emit light onto the coin 11 at a near-normal angle of incidence. The second light emitting device 570, in contrast, comprises one or more light sources for controllably emitting light onto the surface 13 of the passing coin 11 at high-angle incidence. For example, the second light emitting device 570 comprises a row of LEDs 571 configured to emit light onto the coin 11 at a high-angle of incidence. Comparable to the light emitting devices 468, 470 of FIG. 8, each light emitting device 568, 570 in the architecture of FIG. 9 is operable to emit light at only-normal incidence or high-angle incidence. In contrast to the architecture of FIG. 8, but comparable to the architecture of FIG. 7, the light emitting devices 568, 570 are each mounted to their own respective LED PCBs 582 and 584 which are diametrically spaced from one another with respect to the coin 11.

A transparent cover glass 576 extends across and closes an opening in the housing 564 of the sensor arrangement 562. The cover glass 576, which is rigidly mounted to the housing 564, allows light generated by the light emitting devices 568, 570 to pass from the housing 564 to the surface 13 of the coin 11, and also allows light reflected off of the coin 11 to enter the housing 564 and be captured by the linear array of photosensors 572. Disposed between the photodetector 566 and the passing coin 11 is a lens array 578, such as an SLA or GRIN lens array, for focusing light reflected off of the coin 11 (e.g., via internal refraction) and transmitting the light to the photodetector 566. The architecture of FIG. 9 also utilizes a light scattering element 580 that is operable to scatter high-angle incidence light emitted by the second light emitting device 570. In the illustrated example, a cylindrical lens 581 and a light scattering wall 583 cooperatively scatter the light emitted by the second light emitting device 570.

Figure 10:
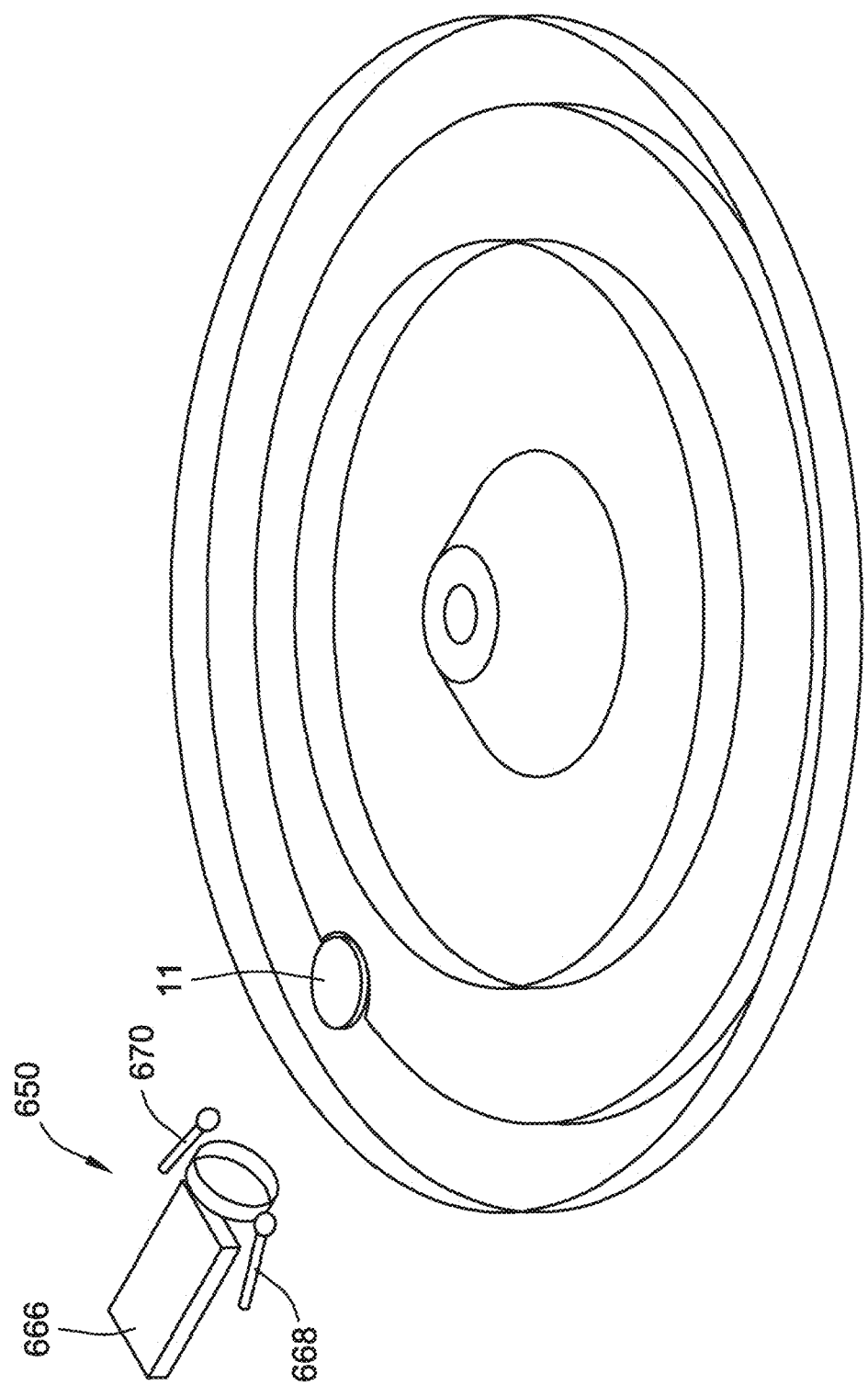
FIG. 10 is a schematic illustration of an example of a linear optical sensor arrangement used to image the side of a coin in accordance with aspects of the present disclosure.

FIG. 10 is a schematic illustration of an example of a linear optical sensor arrangement, designated generally as 650, used to image the side of a coin 11. Unless otherwise logically prohibited, the architecture shown in FIG. 10 may include any of the architectures, features, options and alternatives described above with respect to the sensor arrangements in FIGS. 7-9, and vice versa. The imaging system of FIG. 10 includes one or more light emitting elements 668 and 670 for illuminating the coin 11. Photodetector or photodetector array 666 senses and outputs signals for imaging the side of the coin 11. The coin image information signals are stored, for example, in one or more memory devices (e.g., memory device 360 of FIG. 7) or any other type of computer-readable medium. The memory device(s) can be read, for example, by one or more controllers or processors (e.g., processor(s) 338 of FIG. 7) whereby the signals can be interpreted, and an image of the side of the coin can be generated. The side-imaging sensor arrangement of FIG. 10 can be based on a 1D imaging system or 2D imaging system.

Figure 11A:
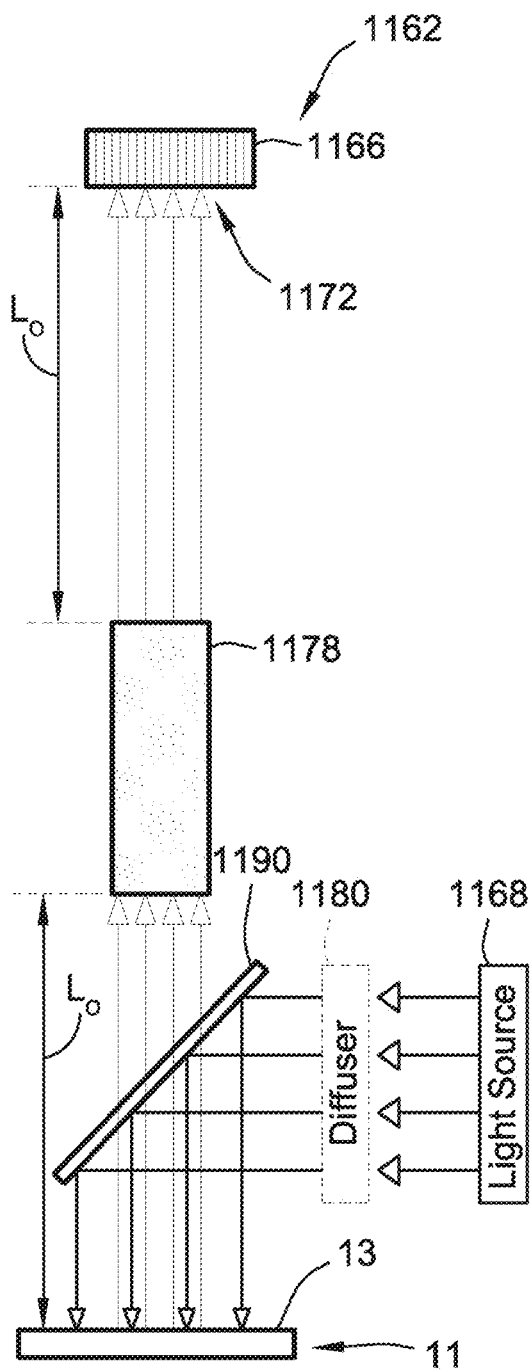
FIGS. 11A and 11B are schematic illustrations of yet other examples of a linear optical sensor arrangement in accordance with aspects of the present disclosure.
Figure 11B:
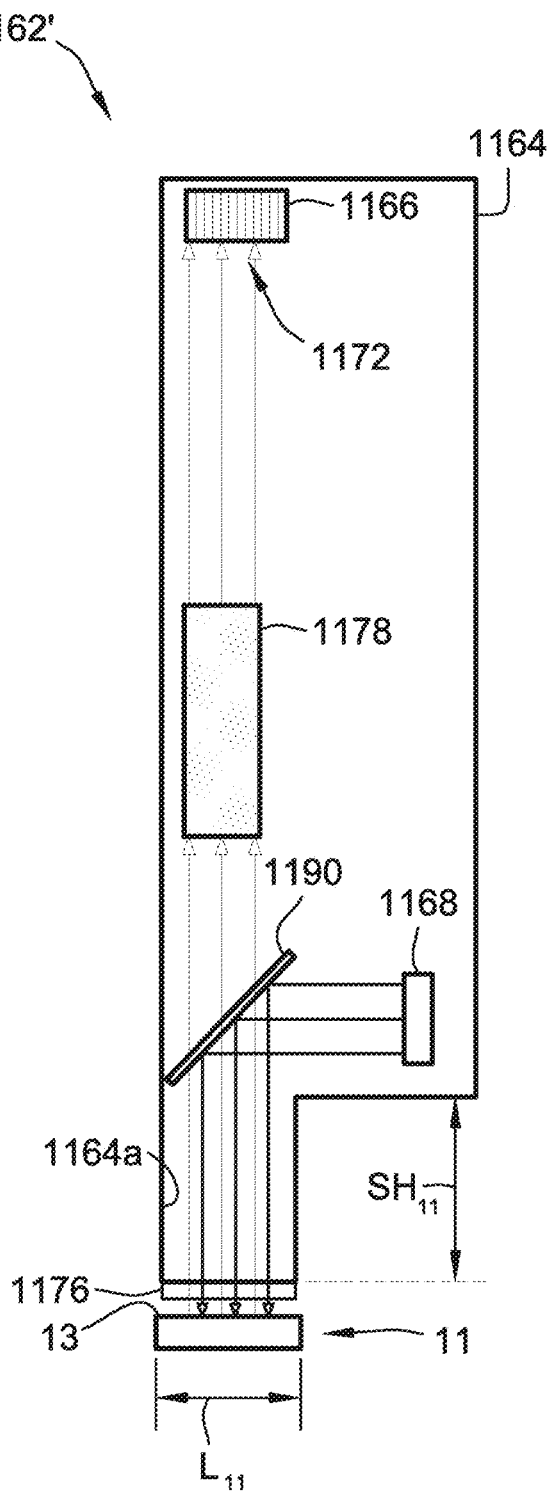

Shown in FIGS. 11A and 11B are alternative architectures for the linear optical sensors of the sensor array 350 of FIG. 6 and/or alternative architectures for the near-normal angle of incidence light sources 367, 371, 467, and/or 567 of FIGS. 7-9. According to some embodiments, the configurations of FIGS. 7-9 may otherwise remain unchanged including the presence of high-angle light sources (e.g., light sources 369, 373, 471, and 571) and their related structures with the light sources 1168 and mirror 1190 being provided in place of or in addition to the near-normal light sources described above in conjunction with FIGS. 7-9 such as light sources, e.g., light emitting diodes 367, 371, 467, 567. According to some embodiments, a Selfoc lens 578 with the proper working distance (Lo) will have to be used to accommodate the change in mechanical dimensions. According to some embodiments, high-angle light sources such as, e.g., light sources 369, 373, 471, and 571, are not included and the sensor arrangements 1162, 1162' only include the normal or near-normal illumination. Unless otherwise logically prohibited, the architectures shown in FIGS. 11A and 11B may include any of the features, options and alternatives described above with respect to the architectures in FIGS. 6-9, and vice versa.

FIGS. 11A and 11B are schematic illustrations of yet other examples of a linear optical sensor arrangement in accordance with aspects of the present disclosure. In the embodiments illustrated in FIGS. 11A and 11B, for example, the sensor arrangement 1162 includes a bipartite or multipart housing 1164 (shown in FIG. 11B only but present in FIG. 11A as well) within which is nested a photodetector 1166 and at least first light emitting devices 1168. Like the photodetector 366 of FIG. 7, the photodetector 1166 of FIGS. 11A and 11B comprise a linear array of light-sensitive photosensors 1172 that detect the presence of visible light, infrared light (IR), and/or ultraviolet light (UV) energy. Enclosed within the housing 1164 is a printed circuit board (PCB) (not shown) with a lower surface onto which the photosensors 1172 are mounted and oriented with a normal or near-normal incidence with the respect to the expected orientation of the upper surface 13 of a passing coin 11. The PCB may support on an upper surface thereof electronics of the photodetector 1166, such as electronics that amplify and process an electronic signal output by a photocell in the photosensor that converts an optical signal into the electronic signal.

In the sensor arrangements 1162 and 1162' of FIGS. 11A and 11B, a first light emitting device 1168 comprises one or more light sources for controllably emitting light onto the surface 13 of the passing coin 11 at normal or near-normal incidence. According to one non-limiting example, the first light emitting device 1168 comprises one or more rows of light emitting diodes (LED), employed with or without the use of optical waveguides or light guides, configured to emit light onto the coin 11 at a normal or near-normal angle of incidence. According to some embodiments, one type of light guide that may be used is a PX-8530 W made by Pixon Technologies.

Although not illustrated, as mentioned above, according to the some embodiments, the sensor arrangements 1162 and 1162' of FIGS. 11A and 11B may comprise second light emitting devices comprising one or more light sources for controllably emitting light onto the surface 13 of the passing coin 11 at high-angle incidence (such as light sources 369, 373, 471, and 571). As described above, in embodiments employing both near-normal light sources 1168 and high-angle light sources, a processor such as processor 338 may operate or activate the near-normal light sources 1168 and high-angle light sources either simultaneously or with only the near-normal light source 1168 being illuminated, or only the high-angle light sources being turned on at any given time to vary the type of illumination incident on the surface 13 of a passing coin 11.

Figure 12:
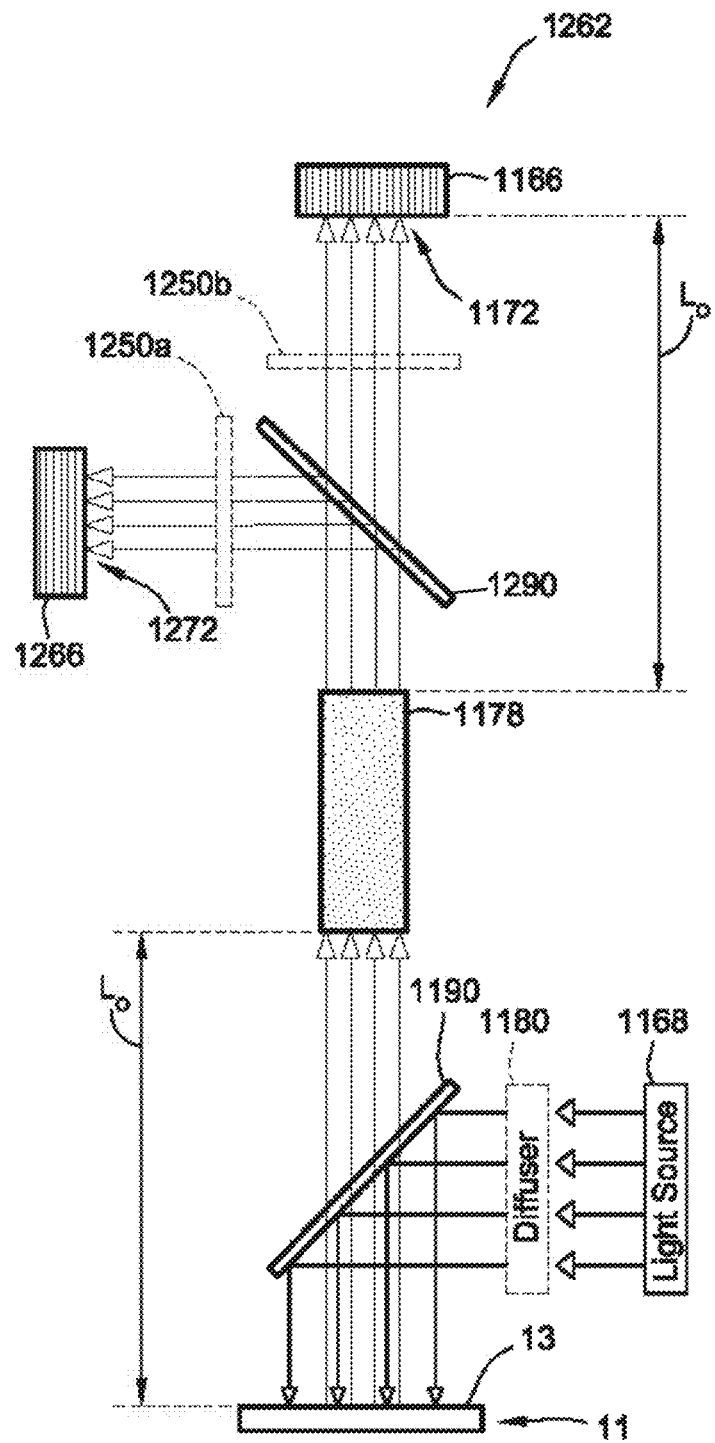
FIG. 12 is a schematic illustration of yet other examples of a linear optical sensor arrangement in accordance with aspects of the present disclosure.

The one or more light sources of the first light emitting device 1168 and/or the one or more light sources of the second light emitting device may emit visible spectrum light, infrared spectrum light (IR), and/or ultraviolet (UV) spectrum light. The same is true for the first and second light emitting devices of FIGS. 7-10. According to some embodiments, one or more light filters are disposed in front of the one or more detectors 1172 of the sensor arrangements 1162 and 1162' (and/or 362, 462, 562, 650) and/or light sources 1168 (e.g., individual LEDs) to allow multiwavelength illumination and selective and/or simultaneous detection of coin images using different parts of the optical spectrum, from UV to visible to IR. Examples of the use of optical filters are illustrated in FIG. 12.

The sensor arrangements 1162 and 1162' of FIGS. 11A and 11B employ one or more half mirrors 1190. According some embodiments, the one or more half mirrors 1190 are employed to re-direct light traveling from lights sources 1168 at an angle near parallel to the surface 13 of a passing coin 11 and direct the light approximately 90° so as to strike the surface 13 of a passing coin 11 at a normal or near-normal angle. Light striking the surface 13 of a passing coin 11 is reflected back into the housing 1164, through the one or more half-mirrors 1190 toward the photodetector 1166. According to some embodiments, the one or more half mirrors 1190 are 50/50 mirrors for reflection and transmission. Optical waveguides or light guides may also be optionally employed to direct light from light sources onto the surface 13 of the coin 11 and/or onto half mirror 1190. According to some embodiments employing waveguides, the light source(s) 1168 may be LEDs or fluorescent tubes.

According to some embodiments, use of the one or more half mirrors 1190, could affect the working distance (Lo) of the lens 1178. The choice of a lens with a specific working distance (Lo) is determined by the sensor geometry. For example, there are different SELFOC lens with differing working distances. According to some embodiments, the working distance (Lo) of lens 1178 is over 11 mm such as when lens 1178 is a SLA 09A made by NSG (Nippon Specialty Glass) which has some embodiments with a working distance of 13.80 mm. Depending on the working distance (Lo) desired for particular applications, an appropriate SELFOC lens can be selected. Other optical lens arraignments performing in a similar way as SELFOC lens could also be used.

According to some embodiments, the sensor arrangements 1162 and 1162' have a scan width which corresponds to distance $W_6$ shown in FIG. 6 of 36-48 mm. According to some embodiments, three (3) or four (4) chips, each chip having a linear array of light-sensitive photosensors 1172 and each chip having a scan width of 12 mm, are employed to achieve an overall scan width of 36-48 mm. In some embodiments, the scan width is chosen to be larger than the diameter of the largest coin to be imaged by the sensor arrangement 1162, 1162'.

According to some embodiments, the one or more light sources of the first light emitting device 1168 and/or the one or more light sources of the second light emitting device may comprise one or more LED arrays and/or one or more optical waveguides for directing light from the light sources to the one or more half mirrors 1190. Optionally, the illumination means may comprise a pair of optical waveguides or light guides each with multiple LEDs.

Extending across and mounted inside an opening in the housing 1164 of the sensor arrangement 1162, 1162' is a transparent cover glass 1176 (shown only in FIG. 11B, but also present in FIG. 11A). The cover glass 1176 allows light generated by the light emitting devices 1168 (and the high-angle light source in embodiments where high-angle light sources are present) to pass from the housing 1164 to the surface 13 of the coin 11, and then allows light reflected off of the coin 11 to reenter the housing 1164 and be captured by the linear array of photosensors 1172. Disposed between the photodetector 1166 and the passing coin 11 is a lens array 1178, such as an SLA or GRIN lens array, for focusing light reflected off of the coin 11 and transmitting the light to the photodetector 1166. The architecture of FIGS. 11A and 11B may also utilize a light diffusing element 1180 that is operable to diffuse light emitted by the light source 1168. Referring to FIG. 11A, the diffuser 1180 may be used to spread out the intensity of illumination coming from the light source 1168 to provide a more uniform distribution of light intensity striking half-mirror 1190. For example, according to some embodiments, the light source 1168 comprises one or more rows of LEDs which may generate generally point sources light such that the light intensity directly in front of each LED is large and in between two adjacent LEDs the light intensity is low. According to some embodiments, the diffuser 1180 spreads out the illumination so a more uniform intensity distribution is achieved. According to some embodiments, light traveling in a generally horizontal direction from the light source 1168 emerges from the diffuser 1180 still traveling in a generally horizontal direction. In some embodiments, the diffuser 1180 is a very thin piece of frosted glass. According to some embodiments, one or more sections of the inside walls 1164a of the sensor housing 1164 (such as near cover glass 1176) are coated by scattering media to provide efficient and uniform illumination.

According to some embodiments, multiple rows of LEDs and/or waveguides may be employed to provide a wider or sider area of illumination. While some of the above embodiments are described as employing LED arrays, desired illumination may be obtained without employing linear arrays of LEDs. For example, waveguides and/or light guides may direct light to the desired locations with the desired distribution over a scan area (e.g., the surface of a passing coin) with or without employing linear arrays of LEDs. For example, waveguide may be employed to achieve required uniformity of illumination and to appropriately diffuse light over a desired scan area. Some exemplary materials that may be employed in waveguides include glass, quartz, and plastic.

According to some embodiments, the sensor arrangements 1162 and 1162' have a scan width of 36-48 mm which corresponds to distance $W_6$ shown in FIG. 6. According to some embodiments, the window opening for cover glass 1176 has a length $L_{11}$ in the general direction of the arcuate movement of passing coins (corresponding to length $L_6$ of FIG. 6) of about 7.5 mm. According to some embodiments, the width of the window opening 312a for the cover glass is slightly longer than the corresponding scan width, e.g., 38-50 mm in the above example.

According to some non-limiting embodiments, the housing 1164 of the sensor arrangement 1162' has a lower portion having a reduced cross-section and the sensor arrangement 1162' has a shoulder distance $SH_{11}$ of about 11-14 mm. The reduced cross-section of the sensor arrangement 1162' facilitates the bottom portion of the housing 1164 of the sensor arrangement fitting within the opening 312a in the sorting head 312 shown in FIG. 6. According to some embodiments, the cover glass 1176 is a 1.0 mm thick Sapphire. According to some embodiments, the cover glass 1176 may be quartz. According to some embodiments, the bottom of the cover glass 1176 should be slightly recessed from, slightly protruding from, or flush with the lower surface 340 of the sorting head 312 so that the passing coin 11 does not contact the cover glass 1176. The vertical position of the sensor arrangement 1162, 1162' can be adjusted up or down to position the cover glass 1176 at the appropriate level. The shoulder distance $SH_{11}$ influences how far a reduced cross-section of the sensor arrangement 1162, 1162' may project through a sensor arrangement opening in the sorting head 312 (see FIG. 6). If a given shoulder distance $SH_{11}$ is less than the thickness of the sorting head 312 and the sensor arrangement 1162' needs to be positioned closer to the rotatable disk positioned below the lower surface 340 of the sorting head 312, the top surface of the sorting head 312 may be lowered (e.g., machined away), if necessary to arrange the sensor arrangement 1162' at the appropriate vertical position. Note a housing such as housing 1164 having a lower portion having a reduced cross-section and one or more shoulders and a shoulder distance $SH_{11}$ of about 11-14 mm may employed according to some embodiments in connection with sensor arrangements 1262 and/or 1362 including where the sensor arrangement has light sources 1168, 1368 on opposing sides of the area where coins 11 are to be scanned as in FIG. 13.

Figure 13:
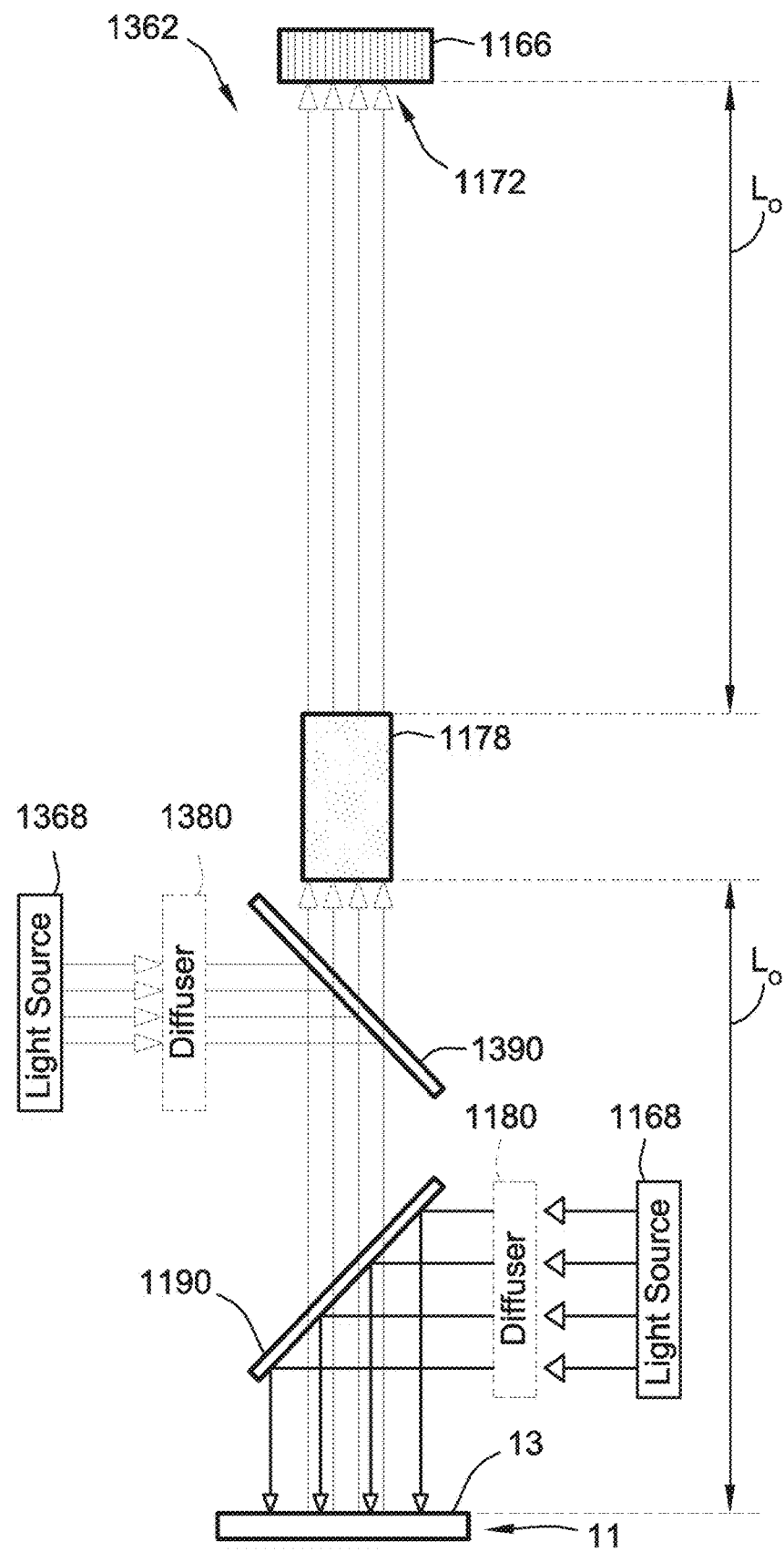
FIG. 13 is a schematic illustration of yet other examples of a linear optical sensor arrangement in accordance with aspects of the present disclosure.

Shown in FIGS. 12 and 13 are alternative architectures for the linear optical sensors of the sensor array 350 of FIG. 6 and/or alternative architectures for the near-normal angle of incidence light sources 367, 371, 467, and/or 567 of FIGS. 7-9. According to some embodiments, except for potentially selecting a different SELFOC lens having the appropriate working distance (Lo), the configurations of FIGS. 7-9 may otherwise remain unchanged including the presence of high-angle light sources (e.g., light sources 369, 373, 471, and 571) and their related structures with the light sources 1168, 1368 and mirror(s) 1190,1390 being provided in place of or in addition to the near-normal light sources described above in conjunction with FIGS. 7-9 such as light sources, e.g., light emitting diodes 367, 371, 467, 567. According to some embodiments, high-angle light sources such as, e.g., light sources 369, 373, 471, and 571, are not included and the sensor arrangements 1262, 1362 only include the normal or near-normal illumination. Unless otherwise logically prohibited, the architectures shown in FIGS. 12 and 13 may include any of the features, options and alternatives described above with respect to the architectures in FIGS. 6-9 and 11A-11B, and vice versa.

FIGS. 12 and 13 are schematic illustrations of yet other examples of linear optical sensor arrangements in accordance with aspects of the present disclosure. The embodiment of the sensor arrangement 1262 of FIG. 12 illustrates the use of multiple photodetectors 1166, 1266 but otherwise may be the same as described above in connection with FIGS. 11A and 11B. Like the photodetector 366 of FIG. 7, the photodetectors 1166, 1266 of FIG. 12 comprise linear arrays of light-sensitive photosensors 1172, 1272 that detect the presence of visible light, infrared light (IR), and/or ultraviolet light (UV) energy. According to some embodiments, one or more half mirrors 1290 are employed to re-direct some of the light reflected from the surface 13 of a passing coin 11 and through the lens 1178 to the photodetector 1266. In some embodiments, the photodetectors 1166, 1266 are employed to sense light of different wavelengths. According to some embodiments, filters 1250a, 1250b may be placed in front of one or both of the photodetectors 1166, 1266 and/or in front of select ones of the photosensors 1172, 1272 so that photodetectors 1166, 1266 and/or select ones of the photosensors 1172, 1272 are responsive to select wavelengths of light. For example, photodetectors 1166 (with or without the use of filter 1250b) may be responsive to only visible light while photodetectors 1266 (with or without the use of filter 1250a) may be responsive to only infrared light. As another example, select ones of the photosensors 1272 (with or without the use of filter 1250a) may be responsive to only ultraviolet light while other ones of the photosensors 1272 (with or without the use of filter 1250a) may be responsive to only infrared light. Additionally or alternatively, filters 1250*a*, 1250*b* may be placed in front of single or multiple ones of the light sources 1168. According to some embodiments, different photodetectors/sensors may be employed with the different photodetectors/sensors being responsive to detection of different wavelengths of light, e.g., some photodetectors/sensors may be responsive to UV light but not be responsive to IR light and/or visible light, and vice versa. For example, according to some embodiments, one or more types of photodetectors/photosensors are employed to detect different wavelengths of illumination such as, for example, GaAsP detectors detecting light in the 200-800 nm range, Ge detectors detecting light in the 600-1700 nm range and InGaAs detectors detecting light in the 800-1900 nm, and/or Silicon sensors detecting light in the 200-1100 nm range.

According to some embodiments, the illumination of a passing coin 11 with different wavelengths of light is synchronized with the sensing of light by one or more of the photodetectors 1166, 1266 and/or some or all of the photosensors 1172, 1272. For example, in some embodiments, in a first period of time a coin 11 may be illuminated with only ultraviolet light and readings taken from the photodetectors 1166, 1266 and/or some or all of the photosensors 1172, 1272 while in a second period of time the coin 11 may be illuminated with only visible light and readings taken from the photodetectors 1166, 1266 and/or some or all of the photosensors 1172, 1272 and/or in a third period of time the coin 11 may be illuminated with only infrared light and readings taken from the photodetectors 1166, 1266 and/or some or all of the photosensors 1172, 1272. A processor such as processor 338 may be used to control the time of the activation of different light sources and/or the sampling of different photodetectors 1166, 1266 and/or some or all of the photosensors 1172, 1272. According to some embodiments the switching the wavelength of light of the illumination will allow multi-wavelength imaging of the coin.

According to some embodiments, multiple detectors such as for example, photodetectors 1166, 1266 including high and low resolution arrays of detectors may be employed for detecting multiple wavelengths of light.

The embodiment of the sensor arrangement 1362 of FIG. 13 illustrates the use of light sources 1168, 1368 positioned on opposite sides of a location at which a coin is to be illuminated but otherwise may be the same as described above in connection with FIGS. 11A, 11B, and/or 12. As shown in FIG. 13, according to some embodiments, first 1168 and second 1368 light sources or light emitting devices may be positioned on opposite sides of cover glass 1176. According to some embodiments, the light sources 1168, 1368 generate light having the same range of wavelengths, e.g., broadband illumination including UV, visible, and IR light. According to some embodiments, the light sources 1168, 1368 generate light having the different ranges of wavelengths, e.g., light source 1168 may generate visible light and light source 1368 may generate UV or IR light. According to some embodiments, more than two light sources may be employed, e.g., one for UV light, one for visible light, and one for IR light. As described above, light of different wavelengths may be sequentially or simultaneously used to illuminate the surface 13 of a passing coin 11 and the activation of the one or more light sources may be controlled by a processor such as processor 338 and may be synchronized with sampling by one or more photodetectors 1166, 1266 and/or some or all of the photosensors 1172, 1272. Selection of the wavelengths of light detected by sensors could be controlled by using selective wavelengths illumination or filters in the detectors optical path.

Although not illustrated, as mentioned above, according the some embodiments, the sensor arrangements 1262 and 1362 of FIGS. 12 and 13 may comprise second light emitting devices comprising one or more light sources for controllably emitting light onto the surface 13 of the passing coin 11 at high-angle incidence (such as light sources 369, 373, 471, and 571). As described above, in embodiments employing both near-normal light sources 1168 and high-angle light sources, a processor such as processor 338 may operate or activate the near-normal light sources 1168 and high-angle light sources either simultaneously or with only the near-normal light source 1168 being illuminated, or only the high-angle light sources being turned on at any given time to vary the type of illumination incident on the surface 13 of a passing coin 11.

According to some embodiments, the one or more half mirrors 1190, 1290, 1390 are 50/50 mirrors for reflection and transmission. Optical waveguides may also be optionally employed to direct light from light sources 1168, 1368 onto the surface 13 of the coin 11 and/or onto one or more of the half mirrors 1190, 1390.

According to some embodiments, the lens 1178 may be a SELFOC lens.

The architectures of FIGS. 12 and 13 may also utilize one or more light diffusing elements 1180, 1380 operable to diffuse light emitted by the light source(s) 1168, 1368. According to some embodiments, one or more sections of the inside walls 1164*a* of the sensor housing 1164 (such as near cover glass 1176) are coated by scattering media to provide efficient and uniform illumination.

According to some embodiments, multiple rows of LEDs and/or waveguides may be employed to provide a wider area of illumination. While some of the above embodiments are described as employing LED arrays, desired illumination may be obtained without employing linear arrays of LEDs. For example, waveguides may direct light to the desired locations with the desired distribution over a scan area (e.g., the surface of a passing coin) with or without employing linear arrays of LEDs. For example, waveguide may be employed to appropriately diffuse light over a desired scan area. Some exemplary materials that may be employed in waveguides include glass, quartz, and plastic.

According to some embodiments, the sensor arrangements 1162, 1162', 1262, 1362 of FIGS. 11A, 11B, 12 and 13 enable high-speed real-time imaging of a moving coin. According to some embodiments, the coin processing unit 200 of FIG. 4 employing the sensor arrangements 1162, 1162', 1262, and/or 1362 process coins of a plurality of denominations (mixed coins) at a rate of 3,100 coins per minute and the sensor arrangements 1162, 1162', 1262, and/or 1362 image the coins at that rate. According to some embodiments, the coin processing unit 200 of FIG. 4 employing the sensor arrangements 1162, 1162', 1262, and/or 1362 process coins of a plurality of denominations (mixed coins) at a rate of at least 1,000 to 4,000 coins per minute and the sensor arrangements 1162, 1162', 1262, and/or 1362 image the coins at that rate. According to some embodiments, the coin processing unit 200 of FIG. 4 employing the sensor arrangements 1162, 1162', 1262, and/or 1362 process coins of a single of denomination at a rate of 10,000-12,000 coins per minute and the sensor arrangements 1162, 1162', 1262, and/or 1362 image the coins at that rate. According to some embodiments, the coin processing unit 200 of FIG. 4 employing the sensor arrangements 1162, 1162', 1262, and/or 1362 process coins of a single of denomination at a rate of at least 10,000 coins per minute and the sensor arrangements 1162, 1162', 1262, and/or 1362 image the coins at that rate. According to some embodiments, the coin processing unit 200 of FIG. 4 employing the sensor arrangements 1162, 1162', 1262, and/or 1362 process coins of a plurality of denominations (mixed coins) at a rate wherein the rotatable disk 214 and the resilient pad 218 rotate at a rate of at least about 400 revolutions per minute (rpm) and the sensor arrangements 1162, 1162', 1262, and/or 1362 image the coins at that rate.

According to some embodiments, the coin processing unit 200 of FIG. 4 employing the sensor arrangements 1162, 1162', 1262, and/or 1362 employs a sorting head 212 having an 11-inch diameter and a rotating disk 214 and pad 222 that has a normal operating speed of 320-360 revolutions per minute (rpm). According to some such embodiments, the disk is rotated at a normal operating speed of 320 rpm and coins passing by under the sorting head 212 are imaged by the sensor arrangements 1162, 1162', 1262, and/or 1362 when the disk is rotating at 320 rpm with a linear speed of at least 9,000 inches per minute. According to some such embodiments, the disk is rotated at a normal operating speed of 360 rpm and coins pass by and are imaged by the sensor arrangements 1162, 1162', 1262, and/or 1362 when the disk is rotating at 360 rpm with a linear speed of at least 10,000 inches per minute or at least 11,000 inches per minute. According to some such embodiments, the disk is rotated at a higher operating speed of 500 rpm and coins pass by and are imaged by the sensor arrangements 1162, 1162', 1262, and/or 1362 when the disk is rotating at 500 rpm with a linear speed of at least 15,000 inches per minute. It should be noted that according to some embodiments, the speed of rotation of the disk is monitored by an encoder and the sensor arrangements 1162, 1162', 1262, and/or 1362 are controlled by a processor such as processor 338 so that even as the disk is slowing down (such as when it is needed to stop the rotation of the disk) or speeding up (such as when starting up the rotation of the disk after it has been stopped), the coin processing unit 200 of FIG. 4 is still able to image the passing coins even though their speed of movement past the sensor arrangements 1162, 1162', 1262, and/or 1362 is changing and/or is below their speed when the disk is rotating at a normal operating speed.

According to some embodiments, the sensor arrangements 1162, 1162', 1262, 1362 of FIGS. 11A, 11B, 12 and 13 enable speed independent operation such as by employing an encoder which monitors the rotation of the rotatable disk 214 and the resilient pad 218 disposed on therein which in turn can be used to monitor and track the movement of coins disposed on the surface of the resilient pad. The output of the encoder can be used by a processor such as processor 338 to adjust the sampling times of linear optical sensors (or "sensor arrangements") 362, 462, 562, 650, 1162, 1162' 1262 and/or 1362 and/or the timing of activating the various light sources and/or LEDs discussed above in connection with FIGS. 7-13. For example, as the speed of the rotatable disk 214 is increased, the processor 338 may increase the rate at which the outputs of these sensor arrangements 362, 462, 562, 650, 1162, 1162' 1262 and/or 1362 are sampled and/or increase the rate and/or adjust the timing of when the various light sources and/or LEDs discussed above in connection with FIGS. 7-13 are turned on. Likewise, as the speed of the rotatable disk 214 is decreased, the processor 338 may decrease the rate at which the outputs of these sensor arrangements 362, 462, 562, 650, 1162, 1162', 1262 and/or 1362 are sampled and/or decrease the rate and/or adjust the timing of when the various light sources and/or LEDs discussed above in connection with FIGS. 7-13 are turned on. As a result, the resulting images obtained may be independent of the speed of the rotatable disk 214 and the speed at which a coin to be imaged passes the sensor arrangements 362, 462, 562, 650, 1162, 1162', 1262 and/or 1362.

Aspects of the present disclosure are distinguishable from other coin-imaging apparatuses that are commercially available by utilizing a linear, low-cost sensor array instead of utilizing a conventional two-dimensional (2D) imaging camera. 2D cameras are slow, costly, and difficult to implement in many coin sorters because of the required large window for imaging. Aspects of the present disclosure solve these issues by utilizing a high-speed linear sensor array that only requires a narrow window in the coin sorter. In addition, aspects of this disclosure enable capturing two different types of images: uniform illumination to reveal coin surface details, and high-angle illumination to produce edge-enhanced images to reveal surface topography variations and coin wear. Additionally, the sensor image capture mode can be reconfigured in real time to (1) switch between the two different types of images, and (2) simultaneously capture both types of images by simple electronic control. One or more of the sensor systems disclosed herein can produce an image of a coin that reveals details on the surface of the coin regardless of topography.

Figure 14:
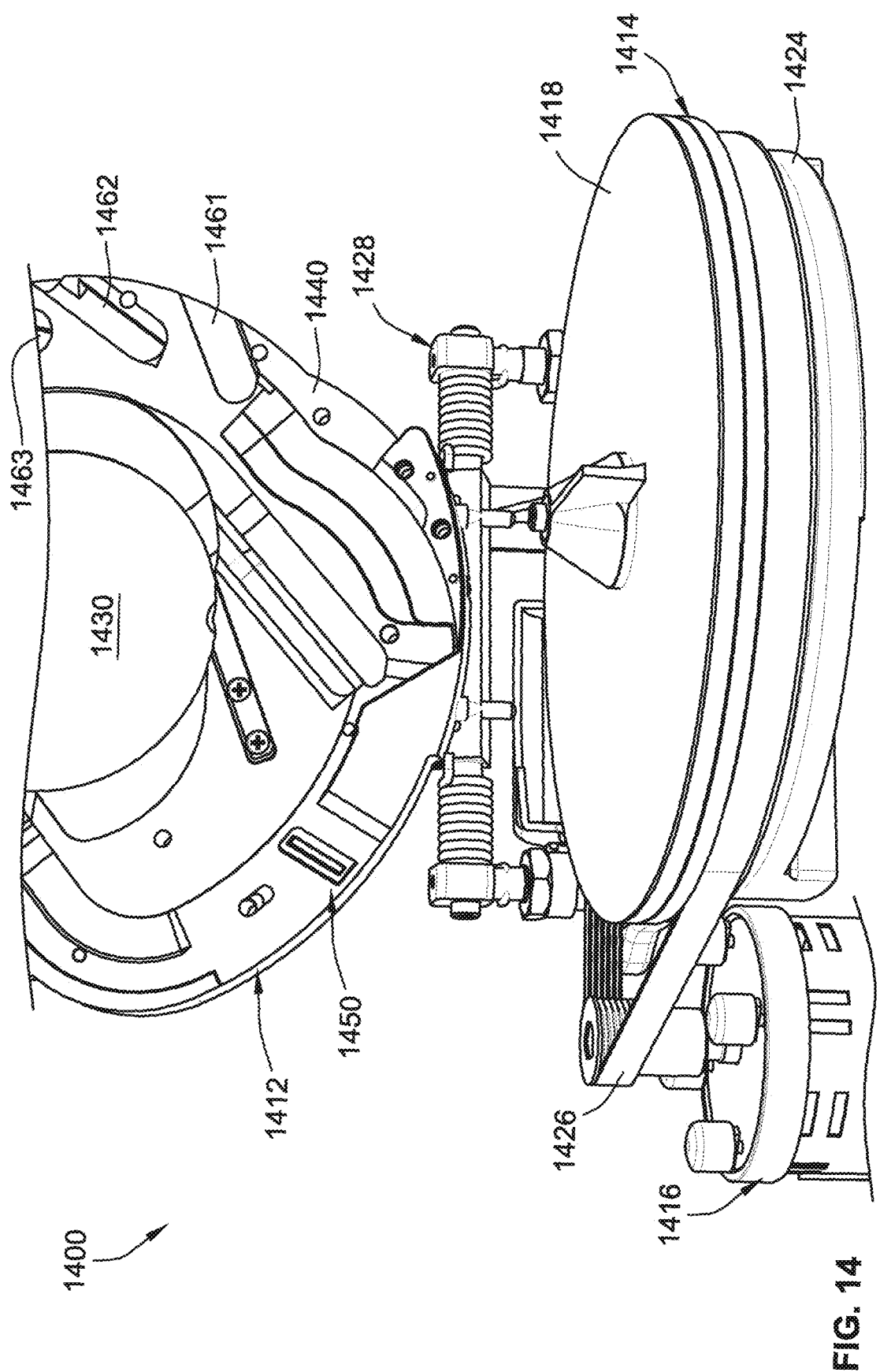
FIG. 14 is a side perspective-view illustration of the annular sorting head assembly of an example of a disk-type coin processing unit with a representative coin-imaging sensor arrangement in accordance with aspects of the present disclosure.

Turning next to FIG. 14, there is shown a coin processing unit, designated generally as 1400, for sorting coins, counting coins, authenticating coins, denominating coins, validating coins, and/or any other form of processing coins. Similar to coin processing unit 300, the coin processing unit 1400 can be incorporated into or otherwise take on any of the various forms, optional configurations, and functional alternatives described herein with respect to the examples shown in FIGS. 1-9, and vice versa, and thus can include any of the corresponding options and features. By way of non-limiting example, the coin processing unit 1400 of FIG. 14 is a disk-type coin processing unit for sorting batches of coins, including batches with coins of mixed denomination, country of origin, etc. The coin processing unit 1400 is operatively coupled to the coin input area of a currency processing system (e.g., coin input area 116 of coin processing machine 100) to receive therefrom deposited coins, and is also operatively coupled to one or more coin receptacles (e.g., coin receptacles 108A-H) into which processed coins are deposited. In alternative embodiments, the coin-imaging sensor assemblies disclosed herein can be incorporated into other types of coin processing apparatuses, such as programmable power rail coin processing devices, without departing from the intended scope and spirit of the present disclosure.

Similar to the disk-type coin processing unit 200 of FIGS. 4 and 5, the coin processing unit 1400 of FIG. 14 comprises a rotatable disk 1414 for supporting on an upper surface thereof, and imparting motion to, coins received from a coin input area (e.g., coin input bin 16 of FIG. 1) of a currency processing system (e.g., currency processing machine 10 of FIG. 1). Coins are typically fed through a central opening 1430 in an annular sorting head 1412 (or "sorting disk") and deposited onto a resilient pad 1418 disposed on the rotatable disk 1414. In contrast to the configuration illustrated in FIG. 4, the rotatable disk 1414 of FIG. 14 is mounted for rotation on a support spindle 1424 and is driven by an electric motor 1416 through driving engagement of a continuous drive belt 1426 that extends circumferentially around the outer periphery of the disk 1414. The sorting head 1412 is pivotably mounted proximate the rotatable disk 1414 via a lateral spring-biased hinge 1428. In so doing, the sorting head 1412 can be selectively transitioned from a raised or "inoperative" position, whereat the sorting disk is displaced from the rotatable disk 1414 (e.g., is generally orthogonal with the rotatable disk 1414 as seen in FIG. 14), to a lowered or "operational" position, such that a lower surface 1440 of the sort disk 1412 is positioned generally parallel to and spaced slightly apart from the top surface 1418 of the rotatable disk 1414 (e.g., FIG. 4). The lower surface 1440 of the sorting head 1412 forms a plurality of distinctly shaped regions/exit channels—three of which are designated at 1461, 1462 and 1463 in FIG. 14. Each exit channel guides coins of a common diameter, responsive to motion imparted thereto by the rotatable disk 1414, to one of various exit stations through which the coins are discharged from the coin processing unit 1400 to the one or more coin receptacles.

Figure 15:
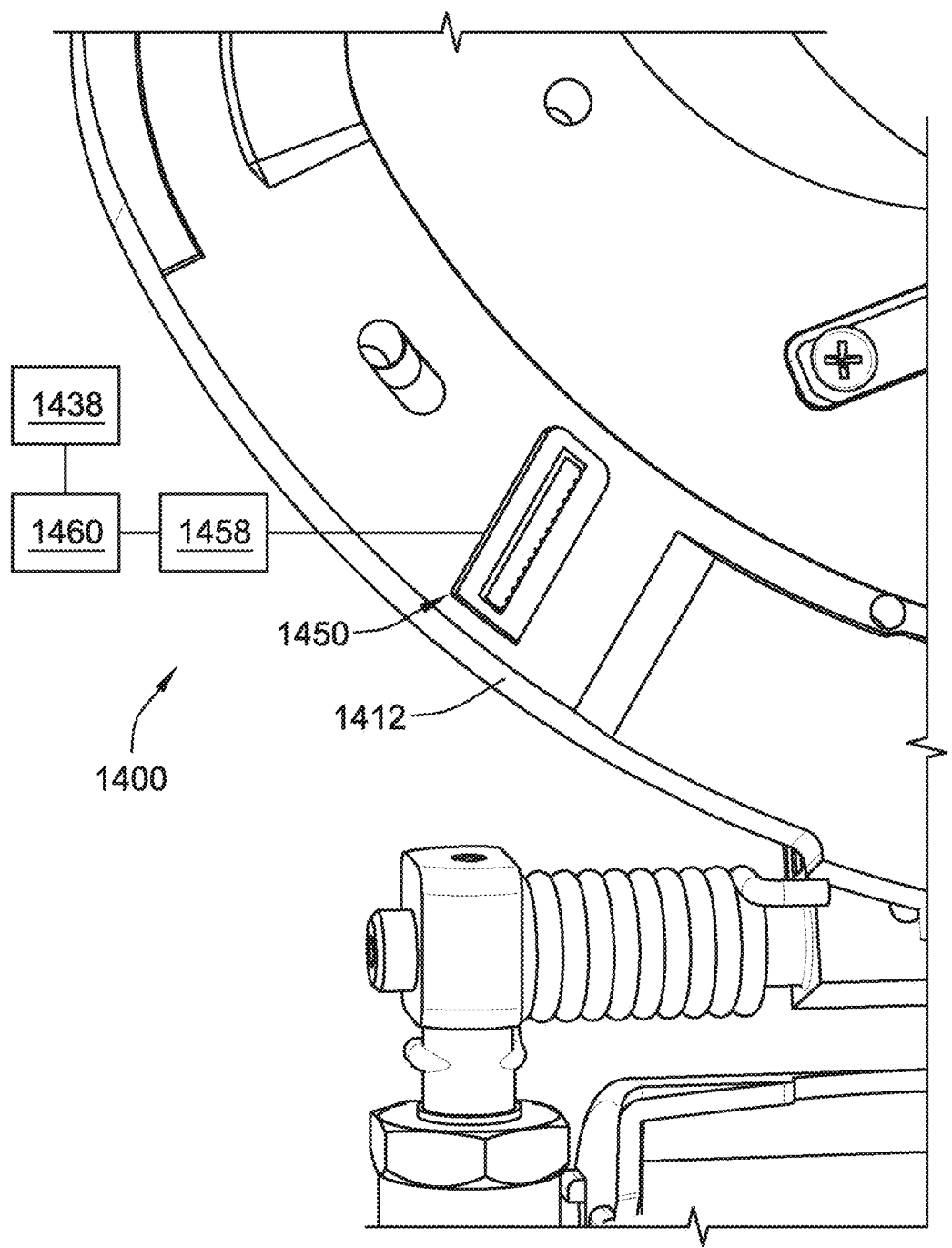
FIG. 15 is an enlarged perspective-view illustration of the coin-imaging sensor arrangement of FIG. 14.

A linear array of sensors, designated generally as 1450 in FIGS. 14 and 15, is mounted proximate to or, as shown, directly on and at least partially within the sorting head 1412. When the sort disk 1412 is placed in the generally horizontal "operational" position, the sensor array 1450 is adjacent and facing the resilient pad 1418 disposed on the rotatable disk 1414. Sensor array 1450 examines or otherwise senses coins seated on the rotatable disk 1414 and outputs a signal indicative of coin image information for each of the processed coins. For some implementations, the linear array 1450 consists essentially of a one-dimensional (1D) array of optical imaging sensors. By way of non-limiting example, the linear array of sensors 1450 includes a row of rectilinearly aligned optical sensors for detecting topographic variations, surface details, coin wear, and/or other pre-designated characteristics of passing coins. For some embodiments, the coin processing unit 1400 may include one or more additional sensor arrays or individual sensors positioned, for example, to image obverse and reverse faces of the coin and/or the side of the coin. The sensor array(s) could also extend beyond the sorting disk, for example, in configurations where the coins extend outside the sorting disk.

Coin image information signals generated by the sensor array 1450 are stored, for example, in a resident system memory device 1460, such as flash memory, electrically erasable programmable read only memory (EEPROM), random access memory (RAM), or any other type of computer-readable medium. The memory device 1460 can be read, for example, by a central processing unit (CPU) 1438 which may comprise one or more processors whereby the signals can be interpreted, and an image of the topographic variations in the coin can be generated. In at least some aspects of the presented concepts, the imaging information detected by the sensor array 1450 is processed by array electronics (e.g., an analog signal filter and/or amplifiers in a sensor control circuit 1458) and interpreted by imaging software (e.g., stored in a physical, non-transient computer readable medium associated with the processor(s) 1438). With the coin image information signals received from the coin imaging sensor system 1450, the processor(s) 1438 then determines, for example, whether each of the coins is valid or invalid, which may include determining the denomination and/or authenticity of each coin, by comparing the sensed coin image to a previously authenticated image that is stored in a library in the memory device 1460. For at least some configurations, the CPU 1438 is further operable to accept signals from an operator interface panel (e.g., touchscreen display device 12 of FIG. 1), one or more encoder sensors, one or more coin-tracking counters, one or more discrimination sensors (not shown), etc. CPU 1438 produces output signals to control the coin sorter drive system (e.g., motor 1416), coin-tracking counters, the operator interface panel, and the sensor array 1450.

Figure 16:
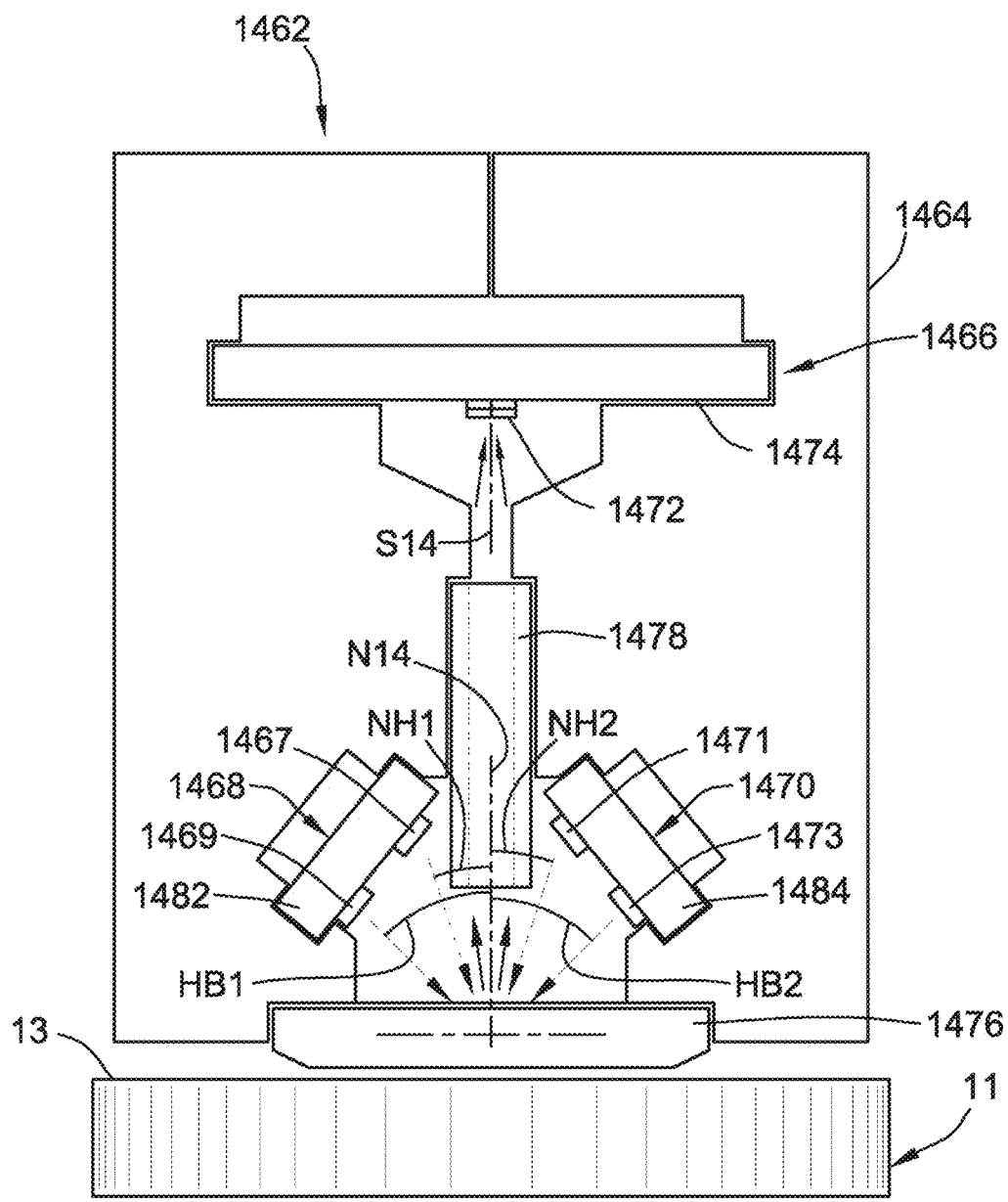
FIG. 16 is a schematic illustration of an example of a coin-imaging sensor assembly in accordance with aspects of the present disclosure.

FIG. 16 of the drawings illustrates an example of one of the linear optical sensors 1462 (also referred to herein as "sensor assembly" or "sensor arrangement") from the sensor array 1450 of FIGS. 14 and 15. In the illustrated non-limiting example, the sensor assembly 1462 includes a bipartite housing 1464 within which is nested a photodetector 1466 and first and second light emitting devices 1468 and 1470, respectively. Photodetector 1466 comprises a linear array of light-sensitive photosensor elements 1472 that detect the presence of visible light, infrared transmission (IR), and/or ultraviolet (UV) energy. For example, each photosensor may utilize a photoconductive semiconductor in which the electrical conductance varies depending on the intensity of radiation striking the semiconductor. In this regard, the photosensors 1472 may take on any of a variety of available configurations, such as photodiodes, avalanche photodiodes, phototransistors, active-pixel sensors (APS), photosensitive field-effect transistors (photoFET), etc. The sensing chips/elements can use complementary metal-oxide-semiconductor (CMOS) technology or charge-coupled device (CCD) technology, or both. Enclosed within the housing 1464 is a sensor printed circuit board (PCB) 1474 with a lower surface onto which the photosensors 1472 are mounted and oriented with a normal or substantially normal incidence with the upper surface 13 of a passing coin 11. Depending on the design and configuration, additional passive and active electronic components and/or connectors are mounted on the sensor PCB. The angle of incidence is the angle between a ray or line incident on a surface and a line perpendicular to that surface at the point of incidence, called the normal N14. For the embodiment of FIG. 16, the angle between a straight line S14, which is perpendicular to the photosensors 1472 and PCB 1474, and the normal N14 of the coin's upper surface 13 is zero or substantially zero. While only select components of the sensor assembly 1462 have been shown and are described in detail herein, the sensor assembly 1462 can include numerous additional and alternative features, options, and other well-known peripheral components (e.g., active and passible elements) without departing from the intended scope and spirit of the present disclosure.

In the illustrated non-limiting example, first light emitting device 1468 of the sensor arrangement 1462 of FIG. 16 comprises multiple light sources for controllably emitting light onto the surface 13 of the passing coin 11 at multiple distinct incidences. By way of example, and not limitation, the light sources of the first light emitting device 1468 comprise a first row of light emitting diodes (LED) 1467 configured to emit light onto the coin 11 at a first near-normal angle of incidence NH1, and a second row of LEDs 1469 configured to emit light onto the coin 11 at a first high-angle of incidence HB1. Likewise, the second light emitting device 1470, which is diametrically spaced from the first light emitting device 1468 relative to the coin 11, comprises multiple light sources for controllably emitting light onto the surface 13 of the passing coin 11 at multiple distinct incidences. In the illustrated example, the light sources of the second light emitting device 1470 comprise a third row of LEDs 1471 configured to emit light onto the coin 11 at a second near-normal angle of incidence NH2, and a fourth row of LEDs 1473 configured to emit light onto the coin 11 at a second high-angle of incidence HB2. The group of LEDs can emit single-wavelength or multi-wavelength light depending on, for example, the intended application or configuration. For at least some alternate designs, the light emitting device(s) can comprise a plurality of optical waveguides or other light carrying medium and a group of light emitting elements at one or each end of each of the waveguides. For near-normal incidence, the angle of incidence of illumination is approximately or substantially parallel to, but not completely parallel to the normal of the surface of the coin 11. For example, the first near-normal incidence NH1 may be equal to approximately −5 degrees or less from the normal N14 (on a standard Cartesian coordinate system), while the second near-normal incidence NH2 may be equal to approximately 5 degrees or less from the normal N14. Comparatively, for high-angle incidence, the angle of incidence of illumination is an oblique angle that is at least approximately 45 degrees from the normal of the coin. In the illustrated embodiment, for example, the first high-angle of incidence HB1 may be equal to approximately −65 degrees from the normal N14 of the coin 11, whereas the second high-angle of incidence HB2 may be equal to approximately 65 degrees from the normal N14.

A transparent quartz cover glass 1476 is mounted to the housing 1464 under the photodetector 1466 to allow light generated by the light emitting devices 1468, 1470 to pass from the housing 1464 to the surface 13 of the coin 11, and to allow light reflected off of the coin 11 to reenter the housing 1464 and be captured by the linear array of photosensors 1472. In alternate embodiments, a sapphire glass or other transparent material with the requisite optical spectrum medium can be employed. Disposed between the photodetector 1466 and the passing coin 11 is a lens array 1478 for focusing light reflected off of the coin 11 (e.g., via internal refraction) and transmitting the light to the photodetector 1466. The lens array 1478 may take on a variety of different forms, including a gradient-index (GRIN) lens array or a SELFOC® lens array (SLA), for example. Light emitting devices 1468, 1470 are mounted to their own respective LED PCB's 1482 and 1484, each of which is positioned at a distinct location within the housing 1464.

With continuing reference to FIG. 16, the photodetector 1466 senses the time of reflection, intensity, incidence angle and/or other parameter of the light reflected off of the surface 13 of the coin 11 and outputs a signal indicative of the reflected light as coin image information for optically imaging and processing the coin. One or more processors 1438 read or otherwise receive the coin image information signals and determine therefrom whether the passing coin is valid or invalid, which may include determining a denomination, a fitness, a country of origin, or an authenticity, or any combination thereof, of the passing coin by comparing the image data with a library of image data of authentic coins. One or more processors 1438 are operable, in at least some embodiments, to simultaneously activate both the first and second light emitting devices 1468, 1469, and thus all four rows of LEDs 1467, 1469, 1471, 1473, to thereby simultaneously provide both high-angle and near-normal illumination (referred to herein as "uniform illumination") of the surface 13 of the passing coin 11. The one or more processors 1438 may be further operable to selectively activate only one of the light emitting devices 1468, 1469 or only the second and fourth rows of high-angle LEDs 1469, 1473 to thereby provide only high-angle illumination (otherwise referred to herein as "edge-enhanced illumination") of the surface 13 of coin 11. When all four rows of LEDs 1467, 1469, 1471, 1473 (or other light sources) are turned on such that the coin 11 is illuminated uniformly, the features and details of the surface 13 of coin 11 are visible to the detector. Comparatively, when only high-angle incidence illumination is provided, then an optically edge-enhanced image is obtained, which can be used to measure the topography and wear of the coin. The user can electronically choose the type of illumination suitable for the task required. The sensor arrangement 1462 of FIG. 16 allows for real-time electronic selection between the aforementioned types of coin illumination to enable enhanced functionality, such as improved authentication and fitness measurement.

Figure 17:
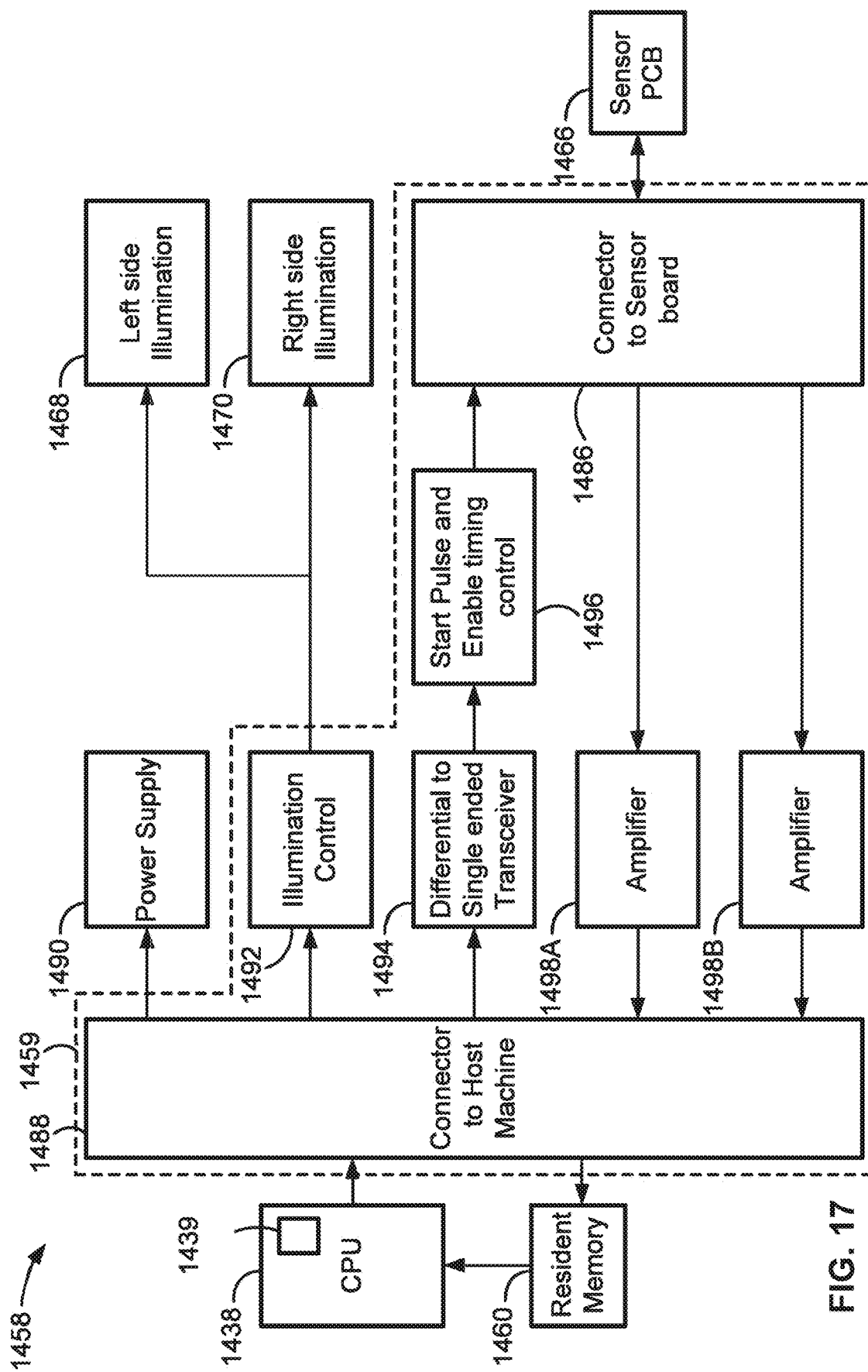
FIG. 17 is a diagrammatic illustration of an example of an electronic sensor control circuit for controlling operation of the coin-imaging sensor assembly of FIG. 16.

Shown in FIG. 17 is an example of an electronic sensor control circuit 1458 for helping to control operation of the coin-imaging sensor assembly 1462 of FIG. 16. The illustrated example may be a two channel system or, optionally, a multichannel system. In the case of a three or four channel system, for example, circuit content and layout will be varied from that which is shown in the drawings (e.g., the number of amplifiers will increase to three or four). Control circuit 1458—the components of which may be mounted to a dedicated and distinct interface PCB 1459—includes a pair of connectors 1486 and 1488 for operatively connecting to the photodetector 1466 and sensor PCB 1474 a main machine PCB 1439 of the CPU 1438, respectively. In particular, the first connector 1486, which may be in the nature of a discrete multi-pin connector, operates to mechanically and electrically connect an illumination control device 1492 and a photodetector control device 1494/1496 of the control circuit 1458 to the main machine PCB 1439. Connector 1486 also operates to mechanically and electrically connect the CPU 1438 to a pair of amplifiers 1498A and 1498B of the control circuit 1458 and electrically connect the CPU 1438 to the sensor PCB 1474 of the sensor assembly 1462. In this regard, the second connector 1488, which may also be in the nature of a discrete multi-pin connector, mechanically and electrically connects the photodetector control device 1494/1496 and amplifiers 1498A and 1498B to the sensor circuit board 1474. Optionally, one or both of the connectors 1486, 1488 may be omitted and replaced, for example, by one or more flex cables or other flexible electrical interconnects.

Illumination of the first and second light emitting devices 1468 and 1470 (designated "Left side illumination" and "Right side illumination" in FIG. 17) is regulated by an illumination control device 1492. The illumination control device 1492 may be in the nature of a microprocessor or other discrete integrated circuit (IC) package that is operable to modulate or otherwise control light output of the light emitting devices 1468, 1470. Each means for illuminating coins can be controlled separately, for example, by a separate control device, or together, for example, by a single, shared control device (as shown). As indicated above, the illumination control circuitry 1492 may be mounted on the interface board 1459. For at least some embodiments where simple illumination control is desired, power supply can be activated ("turned on") and deactivated ("turned off") by a simple switching mechanism. For multi-wavelength applications, a microprocessor can be implemented to control type and length of each illumination. Coin illumination can be provided by one or more raw LED's, one or more discrete LED's, one or more LED's coupled to one or more waveguides, fiber optics, one or more groups of different wavelength LEDs, etc. Tangentially, the sensing chips/elements can use complementary metal-oxide-semiconductor (CMOS) technology or charge-coupled device (CCD) technology, or both.

The first connector 1486 of FIG. 17 may also be operable to connect the control circuit 1458 to a power supply 1490, which may be resident to the circuit 1458 (e.g., a battery or battery pack) or discrete from the circuit 1458 (e.g., provided by way of the main machine PCB or other external power source). Power supply 1490 generally provides conditioned power to the sensor assembly 1462 and the electronic sensor control circuit 1458. A power conditioner can be implemented to deliver voltage and/or current at a desired or predetermined level with desired or predetermined characteristics to enable the various devices of the control circuit 1458 and sensor assembly 1462 to function properly.

A photodetector control device—represented in FIG. 17 in a non-limiting example by a differential-to-single-ended transceiver 1494 and a start pulse and enable timing control module 1496—is communicatively coupled to and operable for controlling the photodetector 1466 and sensor PCB 1474 of the sensor assembly 1462. Each element of the photodetector control device may be in the nature of one or more microprocessors or other discrete integrated circuit (IC) package(s) operable, for example, to initiate and discontinue the collection of data by the photodetector elements 1472 of the sensor circuit board 1474. By way of non-limiting example, photodetector control device provides electronic control signals to the photodetector 1466 for when to begin collecting data, when to end collecting data, and any other information required to control sensor chip performance.

Also shown in FIG. 17 is a pair of amplifiers 1498A and 1498B mounted on the interface PCB 1459. As indicated above, these amplifiers 1498A, 1498B are communicatively coupled to the sensor circuit board 1474, e.g., via connector 1488, and operate to boost and/or condition analog signals generated by the photosensor assembly 1466. For some embodiments, the sensing chips 1472 on the sensor board 1474 can be provided with built-in amplifiers if additional boosting and/or conditioning of the analog signal is required. It is also possible to combine amplifiers with analog-to-digital (A/D) converters. In some applications, the A/D converter(s) are mounted on a host card.

Figure 18:
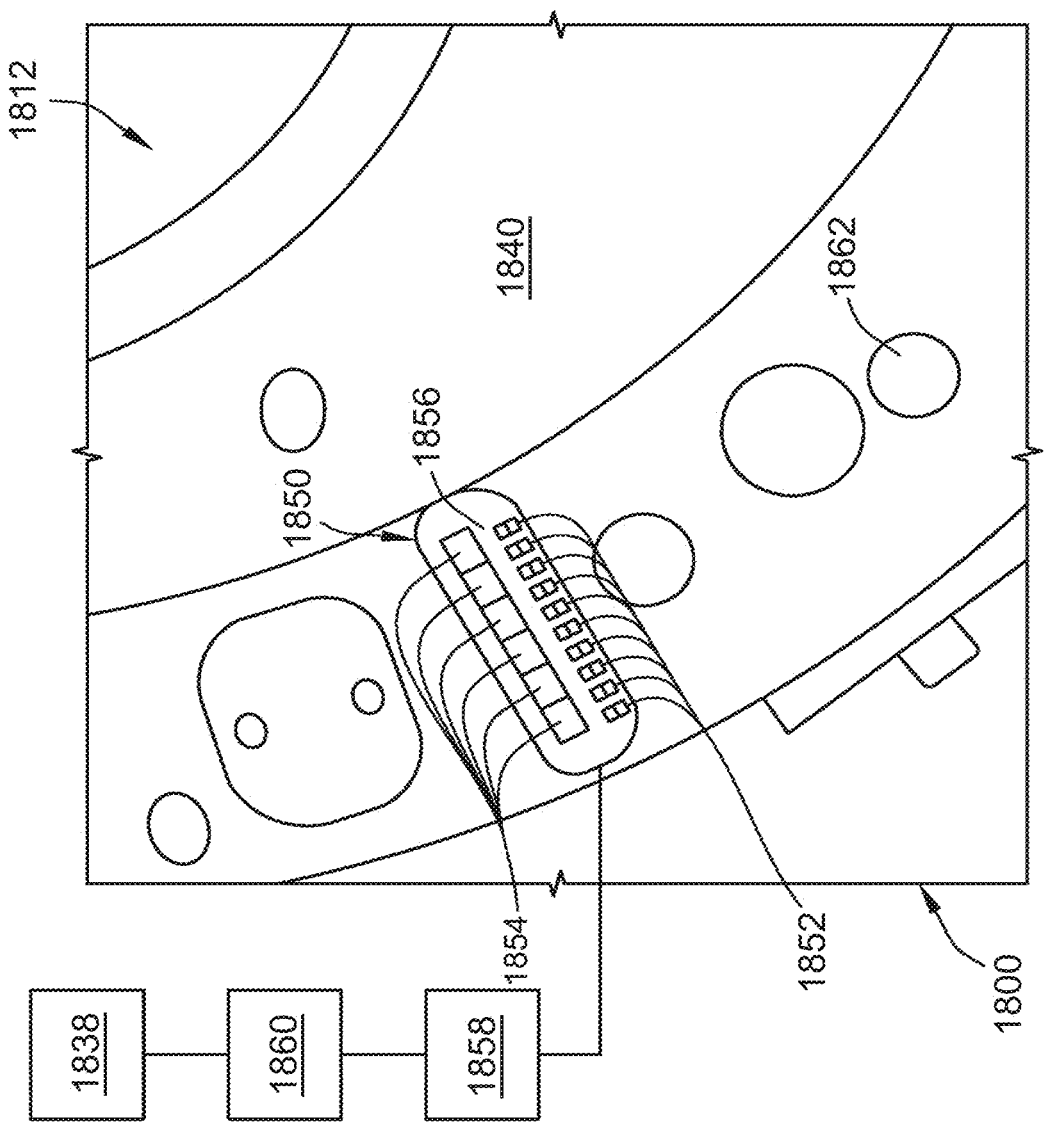
FIG. 18 is an underside perspective-view illustration of the annular sorting head of a disk-type coin processing unit with a representative one-dimensional linear array of coin-imaging sensors, such as capacitive sensors, in accordance with aspects of the present disclosure.

Turning next to FIG. 18, there is shown a coin processing unit, designated generally as 1800, for sorting coins, counting coins, authenticating coins, denominating coins, validating coins, and/or any other form of processing coins. As indicated above, the coin processing unit 1800 can be incorporated into or otherwise take on any of the various forms, optional configurations, and functional alternatives described herein with respect to the examples shown in FIGS. 1-5, and thus can include any of the corresponding options and features. By way of non-limiting example, the coin processing unit 1800 of FIG. 18 may be a disk-type coin processing unit for sorting batches of coins, including batches with coins of mixed denomination, country of origin, etc. The coin processing unit 1800 is operatively coupled to the coin input area of a currency processing system (e.g., coin input area 116 of coin processing machine 100) to receive therefrom deposited coins, and is also operatively coupled to one or more coin receptacles (e.g., coin receptacles 108A-H) into which processed coins are deposited. In alternative embodiments, the linear sensor arrays disclosed herein can be incorporated into other types of coin processing apparatuses, such as programmable power rail coin processing devices.

Similar to the disk-type coin processing unit 200 of FIGS. 4 and 5, the coin processing unit 1800 of FIG. 18 comprises a rotatable disk (not visible in FIG. 18, but structurally and functionally similar to the rotatable disk 214 of FIG. 4) for supporting on an upper surface thereof and imparting motion to coins received from the coin input area of the currency processing system. Like the configuration illustrated in FIG. 4, the rotatable disk of FIG. 18 can be mounted for common rotation with a drive shaft that is driven by an electric motor. A stationary sorting head 1812, which is adjacent the rotatable disk, has a lower surface 1840 that is located generally parallel to and spaced slightly apart from the top surface of the rotatable disk. The lower surface 1840 of the sorting head 1812 forms a plurality of distinctly shaped regions (or "exit channels"), each of which guides coins of a common diameter, responsive to motion imparted thereto by the rotatable disk, to one of various exit stations through which the coins are discharged from the coin processing unit 1800 to the one or more coin receptacles.

A linear array of sensors, designated generally as 1850 in FIG. 18, is mounted proximate to or, as shown, directly on and within the sorting head 1812 adjacent and, in some embodiments, facing the rotatable disk. The linear array of sensors 1850 examines or otherwise senses coins seated on the rotatable disk and outputs a signal indicative of coin image information for each of the processed coins. For some implementations, the linear array 1850 consists essentially of a one-dimensional (1D) array of non-optical imaging sensors. By way of non-limiting example, the linear array of sensors 1850 includes a row of rectilinearly aligned capacitive imaging sensors for detecting topographic variations or other predetermined characteristics of passing coins. In the embodiments shown in FIG. 18, the linear array 1850 includes a row of drive plates 1852 aligned parallel to a row of pickup plates 1854. Pickup plates 1854 and drive plates 1852, which lie transverse to the path of travel of passing coins, are separated by one or more sensor gaps 1856. As a coin being sensed passes by the coin imaging sensor system 1850, a sensor circuit 1858 energizes drive plates 1854 with drive signals. As surface variations of the imprint on the obverse side or reverse side of the coin passes across the sensor gap(s) 1856, the drive signals applied to drive plates 1852 are capacitively coupled to pickup plates 1854 according to the capacitances of the individual sensor gaps. The capacitance will vary in accordance with the surface variations (e.g., peaks and valleys) of the coin passing across the sensor gap(s) 1856. The capacitance variations are measured and stored, for example, in memory device 1860 or any other type of computer-readable medium. The memory device 1860 can be read, for example, by one or more processors 1838 whereby the changes in capacitance can be interpreted, and an image of the topographic variations in the coin can be reconstructed. With the coin image information signals received from the coin imaging sensor system 1850, the processor(s) 1838 can determine, for example, whether each of the coins is valid or invalid, which may include determining the denomination and/or authenticity of each coin, by comparing the reconstructed coin image to a previously authenticated image that is stored in a library in the memory device 1860.

The sorting head 1812 may include a cutout into which is seated a coin trigger sensor 1862 that is disposed just upstream of the linear sensor array 1850. The coin trigger sensor 1862 detects the presence of a coin and outputs an activation signal for readying the sensors 1850. Coins first move across the coin trigger sensor 1862 (e.g., a photo detector or a metal proximity detector), which responsively sends a signal to the processor(s) 1838 indicating that a coin is approaching the linear sensor array 1850. It is envisioned that the coin processing unit 200 be provided with multiple linear arrays of sensors, for example, to obtain imaging data from both obverse and reverse sides of each passing coin. In this regard, a linear array of sensors could be mounted adjacent the sorting head 1812 to obtain imaging data from the edges of passing coins.

Figure 19:
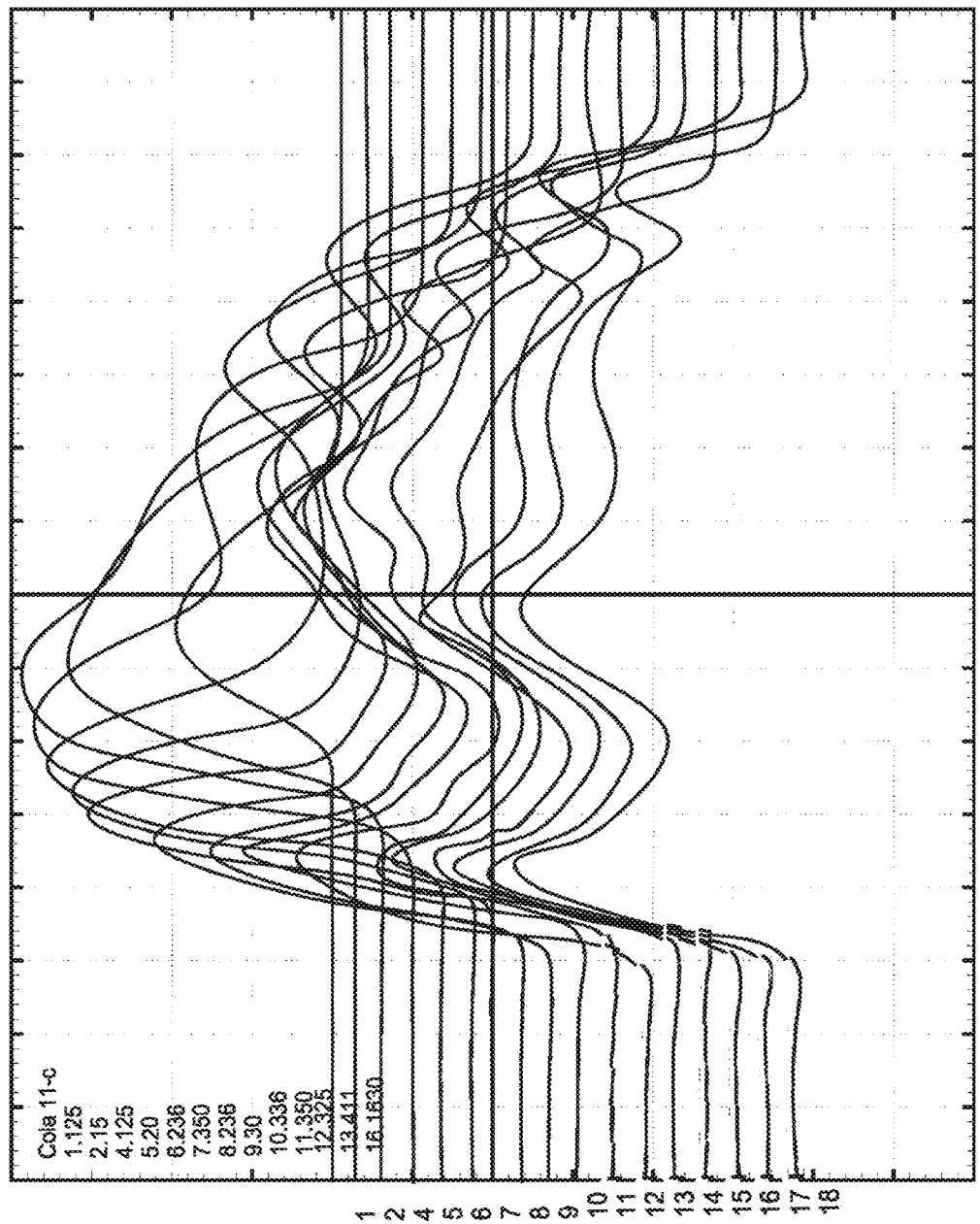
FIG. 19 is an example of a reconstructed image of a coin analyzed with the one-dimensional linear array of coin-imaging sensors of FIG. 18.

FIG. 19 is an example of a reconstructed image of a coin analyzed with the one-dimensional linear array of coin-imaging sensors 1850 of FIG. 18. The array 1850 allows for the scanning of each coin along multiple cords and generating a trace for each said cord to more effectively and efficiently create a complete and accurate image of the coin. Within each array, a single sensor can act as a trace sensor for detecting information along a single arc. The imaging information detected by the sensor array can be processed by array electronics (e.g., an analog signal filter in the sensor circuit 1858) and interpreted by imaging software (e.g., stored in a physical, non-transient computer readable medium associated with the processor(s) 1838). In this regard, the image allows for fast and accurate processing of coins, which may include, in any combination, determining denomination, authenticity, and/or validity, detecting if the coin is part of a specific class, identifying locations of any flaws, defects or imperfections, classifying coins as fit or unfit, etc. A linear sensor array, as disclosed herein, can offer a lower cost, simpler, faster and more compact system solution for coin imaging and processing. The use of a linear sensor array can also help to minimize or otherwise eliminate problems associated with spatial averaging as observed in a single "wide" sensor. Such wide sensors lack sufficient resolution and cause spatial blending of coin information. In addition, single channel sensors typically provide information from only a narrow portion of the coin or data on a single characteristic (e.g., the coins electrical impedance). An array of sensors, as disclosed herein, can obtain information from the entire coin regardless of the coin's dimensions, and form an image without inadvertent spatial blending.

Each of the disclosed linear sensor array embodiments may take on a variety of optional and alternative configurations. One such option is illustrated in FIG. 18, for example, wherein the width of the linear array of sensors 1850 can be approximately equal to, equal to, or greater than the diameter of the largest coin to be processed (e.g., the U.S. Half Dollar) such that the array is operable to examine all or substantially all of the top surface, bottom surface, or side surface, or a combination thereof, of each passing coin of any denomination. As another option, each sensor in the coin imaging sensor system 1850 can carry a single excitation frequency (e.g., 1F) or multiple excitation frequencies (e.g., 4F). Optional configurations of the coin imaging sensor system comprise means to excite passing coins and read the electrical/capacitive response as a "trace," each of which can be measured along the diameter or another cord of the coin. In addition, while the illustrated example of FIG. 18 is shown with only a single array, the coin processing unit 1800 may further comprise a second or third linear array of sensors that is mounted proximate to or directly on or within the sorting head. The second or third linear array may be generally parallel to and adjacent or interlaced with the first linear array of sensors. The second or third linear array may take on other locations and orientations. Like the first array, the second or third sensor array is operable to examine or otherwise sense each passing coin on the rotatable disk and output signals indicative of coin image information for processing the coins. For some embodiments, the disclosed linear sensor arrays allow for processing of coins at a linear speed of less than 50 inches per second, at least approximately 50 inches per second (ips), for some embodiments, at a linear speed of at least approximately 300 ips, and, for some embodiments, at a linear speed of at least approximately 400 ips. For some embodiments, the disclosed linear sensor arrays allow for processing of at least approximately 10,000 coins per minute (cpm) and, for some embodiments, at least approximately 15,000 cpm. For some embodiments, the disclosed linear sensor arrays allow for an image resolution of at least approximately 2 dots per inch (dpi) and, for some embodiments, at least approximately 50 dpi or more.

In accordance with another aspect of the disclosed concepts, the linear array of sensors may comprise rectilinearly aligned magnetic in-field or magnetic remanence imaging sensors. Designated generally as 2050 in FIG. 20, for example, is a magnetic field imaging sensor array that is mounted on a sorting head 2012 of a disk-type coin processing unit 2000. Like the linear sensor array 1850 of FIG. 18, the sensor array 2050 of FIG. 20 consists essentially of a one-dimensional (1D) array of imaging sensors that is operable to examine or otherwise sense coins seated on an adjacent rotatable disk (or other coin transport mechanism) and output a signal indicative of coin image information for processing each of the coins. In the same vein, the sensor array 2050 of FIG. 20 can include any of the options and alternatives described above with respect to the sensor array 1850. As a non-limiting example, the sensor array 2050 may comprise a single linear array of sensing elements or multiple linear arrays of sensing elements that are aligned adjacent one another or interlaced with one another.

Figure 20:
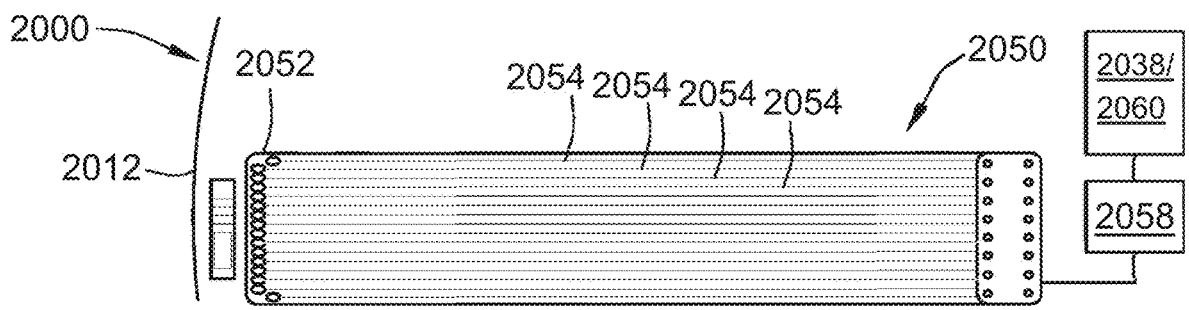
FIG. 20 is a plan-view illustration of an example of a one-dimensional linear array of magnetic in-field coin-imaging sensors in accordance with aspects of the present disclosure.
Figure 21:
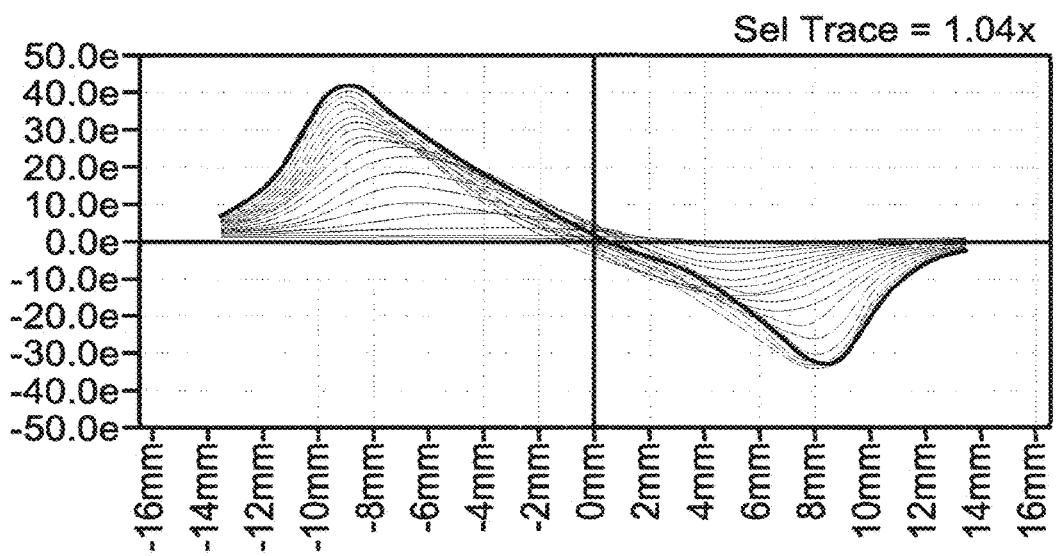
FIGS. 21 and 22 are examples of reconstructed images of coins analyzed with the one-dimensional linear array of magnetic field coin-imaging sensors of FIG. 20.
Figure 22:
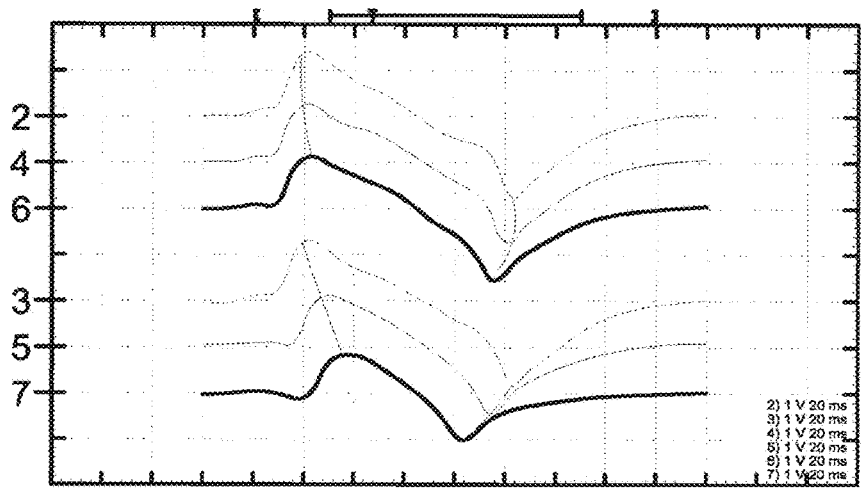

The sensor array 2050 of FIG. 20 comprises a substrate 2052 with an arrangement of N (where N is a positive integer) spaced-apart magnetic field sensing elements 2054 that are supported on the substrate 2052. As a coin being sensed passes by the coin imaging sensor system 2050, a sensor circuit 2058 generates a magnetic field that energizes the coin. Each magnetic field sensing element 2054 is capable of measuring a minimum measurable magnetic field. The magnetic field sensing elements 2054 may take the form of extraordinary magnetoresistance (EMR) devices, anisotropic magnetoresistance (AMR) devices, giant magnetoresistance (GMR) devices, tunneling magnetoresistance (TMR) devices, or other types of magnetoresistance devices. One or more processors 2038 with one or more memory devices 2060 process signals from the magnetic field sensing elements 2054 to produce an output signal such that the magnetic field sensor is capable of measuring a magnetic field. For some optional and alternative configurations, the imaging sensor array 2050 comprises thin film magnetic remanence (MRem) type imaging sensors, Hall technology type imaging sensors, magnetic resonance imaging (MRI) type sensors, or other magnetic imaging sensor technology. When the remanence sensor is used, a permanent magnet or other means to magnetize the coin are implemented in the coin path ahead of the sensor. FIGS. 21 and 22 are examples of reconstructed images of coins analyzed with the one-dimensional linear array of magnetic field coin-imaging sensors of FIG. 21.

Figure 23:
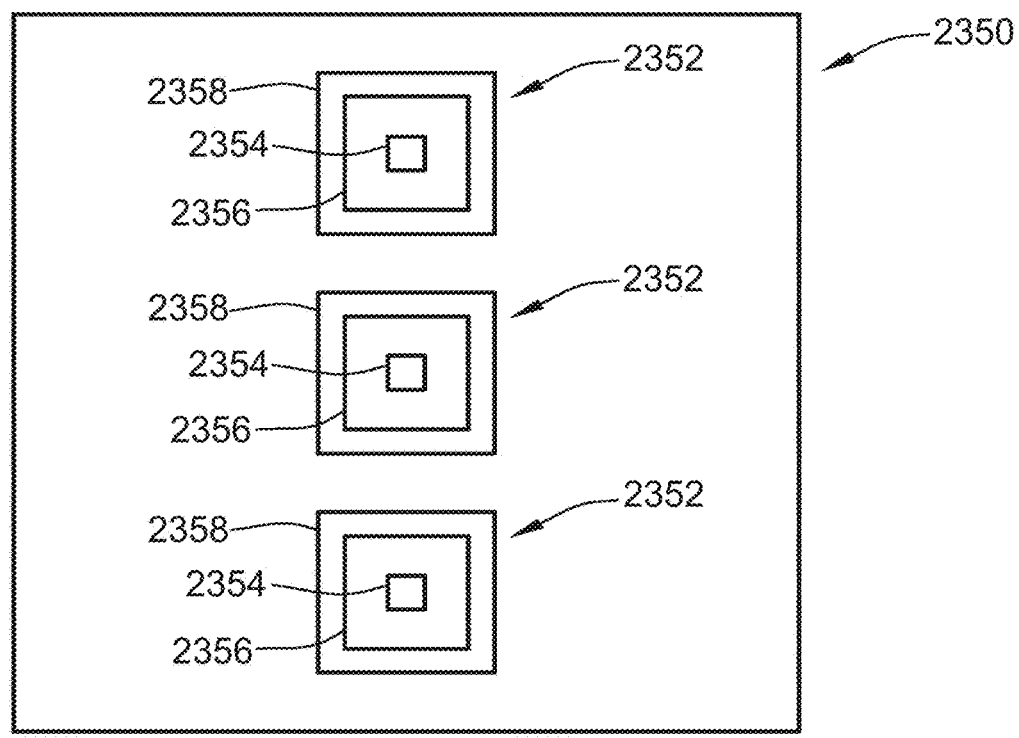
FIG. 23 is a schematic illustration of an example of a one-dimensional linear array of electromagnetic coin-imaging sensors in accordance with aspects of the present disclosure.

Turning next to FIG. 23, a one-dimensional linear array of electromagnetic coin-imaging sensors, designated generally as 2350, is illustrated in accordance with aspects of the present disclosure. Like the linear sensor arrays 1850 of FIG. 18 and 2050 of FIG. 20, the sensor array 2350 of FIG. 23 consists essentially of a one-dimensional (1D) array of non-optical sensors that is operable to examine or otherwise sense coins seated on an adjacent rotatable disk (or other coin transport mechanism) and output a signal indicative of coin image information for processing each of the coins. In the same vein, the sensor array 2350 of FIG. 23 can include any of the options and alternatives described above with respect to the sensor arrays 1850 and 2050.

Figure 24:
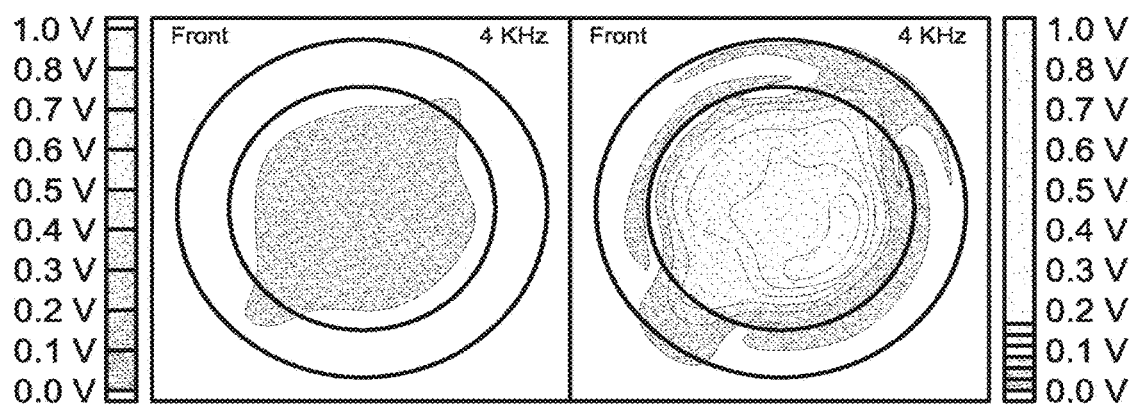
FIG. 24 is an example of a raster scan of a coin analyzed with the one-dimensional linear array of electromagnetic coin-imaging sensors of FIG. 23.

In the illustrated example, the linear sensor array 2350 includes a plurality of electromagnetic imaging sensors 2352, each of which comprises a ferromagnetic core 2354, a primary coil 2356, and a secondary coil 2358. The primary coil 2356 is wound around a first portion of the core 2354 for driving a low frequency signal, and the secondary coil 2358 is wound around a second region of the core 2354 for driving a high frequency signal. The primary coil 2356 may comprise a larger number of turns and use a smaller gauge wire than the secondary coil 2358. Furthermore, the primary and secondary coils 2356, 2358 are separated from one another by a space therebetween. When an external generator causes an electrical alternate current flowing in the coils 2356, 2358, an oscillating magnetic field is created. As a coin is routed through this oscillating electromagnetic field, various coin properties related to coin structure and conductive materials used in coin construction known as an electromagnetic signature (EMS) can be sensed. These sensed properties are output as electrical signals that can be collected and compared against a library or dataset of predetermined coins having corresponding electromagnetic properties to process the coin. FIG. 24 is an example of a raster scan of a coin analyzed with the electromagnetic linear sensor array 2350 of FIG. 23.

In an optional configuration, the linear array comprises a row of optical sensors. For optical imaging, each optical sensor or "pixel" of the array will detect the amount of light being reflected from or transmitted through the sensed object. The resultant image typically depends on the wavelength of the light illuminating the object. By way of contrast, each sensor element of a magnetic array is performing a similar function as the optical "pixel" in the optical array. However, in the case of magnetic arrays, the object is excited with a magnetic field (static or alternating), and the response depends, for example, on the magnetic properties of the coin, the strength and direction of the excitation field, the distance between the sensor and the coin, and the type of field (AC vs. DC). The pixel size can be very small or can be large. For example, the sensor could have an effective resolution from a fraction or a few dpi to thousands of dpi.

Coin imaging in a coin processing machine of the various embodiments herein can include optical imaging using optical sensors and optical sensor arrays such as described with respect to FIGS. 7-17, non-optical imaging using non-optical sensors and sensor arrays such as described with respect to FIGS. 18-24, or both optical and non-optical imaging. There is a growing need to not only denominate and authenticate coins with a high precision of accuracy but also to sort them based on fitness criteria. Integrated sensor technology can be used for these purposes. Integrated sensors technology is an integration of multiple technologies, such as optical and non-optical imaging technologies, into a single unit or machine to allow for a precision correlation between each type of imaging. As the sophistication of coin structures is increasing, new coin materials are introduced, and new security features are added to the inside and surface of the coin, single type sensor detection technologies may not be sufficient to accomplish all the authentication and fitness goals. Although sensor arrays based on individual technologies can be used (such as optical, magnetic, capacitive, eddy current, ultrasonic and more), there is a need to correlate information obtained using the different technologies. Another important factor is that a detection area of a coin processing machine can have a limited amount of space, which may preclude using multiple imaging sensor arrays.

To address the shortcoming of using individual sensor technologies, an integrated sensor combining different technologies, or more than one separate sensor or sensor array of different technologies, can be used, such as a combination of eddy current imaging sensors and optical imaging sensors, a combination of the eddy current imaging and magnetic imaging, a combination of a multifunction magnetic sensor with an optical sensor, or a combination of other sensor types disclosed herein. In some embodiments using solid state magnetic detectors, the same sensor could simultaneously perform eddy current and magnetic imaging. Combining sensor technologies into an integrated sensor, or using separate but multiple sensor types, allows for the simultaneous collection and processing of coin images obtained using different sensing technologies.

Figure 25:
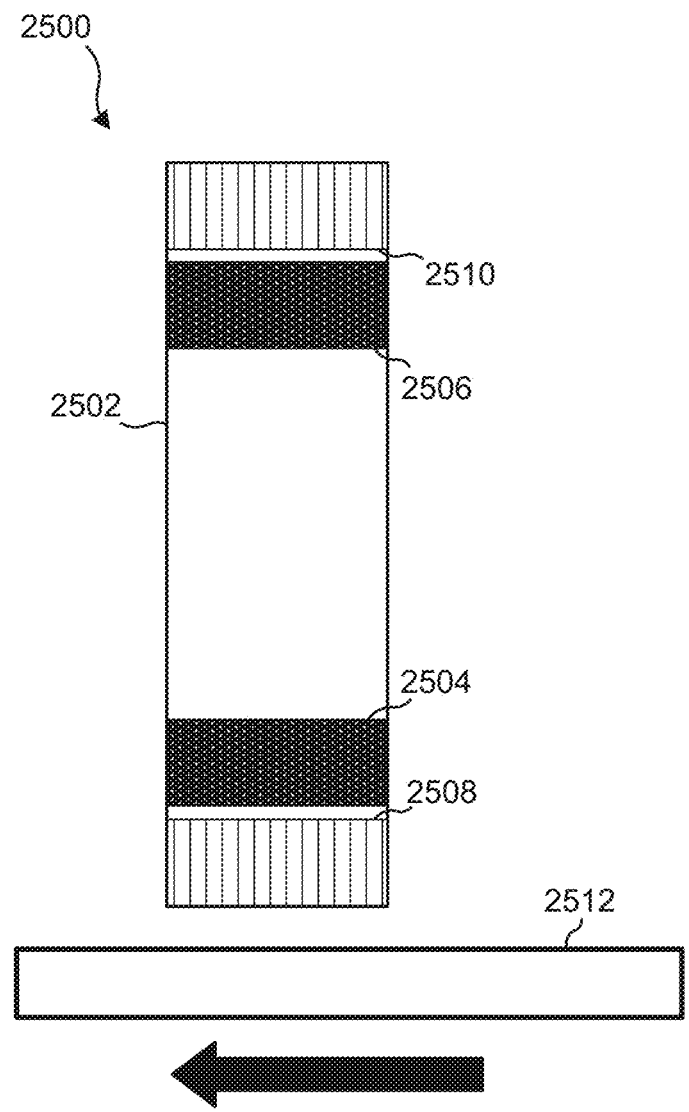
FIG. 25 illustrates an example eddy current sensor in accordance with various embodiments of the present disclosure.

FIG. 25 illustrates an example eddy current sensor 2500 in accordance with various embodiments of the present disclosure. Electromagnetic coin-imaging sensor arrays of the various embodiments of the present disclosure, such as that described with respect to FIG. 23, can include eddy current sensors for the evaluation of coin structure and properties to help with denomination, authentication, and coin fitness. Such eddy current sensor arrays can be 1D or 2D eddy current sensor array systems, or can be multiple 1D array systems. Eddy current based coin imaging systems comprising of a 1D sensor array or a 2D sensor array can be incorporated into coin processing machine systems such as the examples shown in FIGS. 1-5. The eddy current sensor 2500 can be used with associated electronics and algorithms to decide if a coin is fit for circulation, belongs to specific coin set and/or is authentic. The eddy current sensors 2500 can also be used in conjunction with other sensor types, such as other non-optical sensors and optical sensors, as described herein.

Some previous eddy current sensors used for non-optical coin imaging include proximity sensors which use a form of inductive eddy currents, and single channel eddy current sensors. By way of non-limiting example some previous single channel sensors include 3 coils, a driving coil to excite the eddy currents in the conductive structure of the coin, and pickup and backup coils. The pickup and backup coils are in the field generated by the driving coil. The magnetic field generated by the driving coil is picked up by the essentially identical pickup and backup coils. The signals generated in both coils are subtracted from each other and in the absence of a coin in front of the sensor the output signal is virtually zero, i.e., very small. When a coin is present, the magnetic signal generated by the eddy currents in the coin is picked up by the coils and the set of coils generates a differential signal. An example of a previous 3 coil eddy current sensor includes a larger diameter driving coil with almost identical smaller diameter pickup and backup coils disposed inside the driving coil. Other previous 3 coil eddy current sensors include sensors where the pickup coil, the backup coil, and the driving coil are of the same diameter and create a pancake type structure, for example with the driving coil being disposed between the backup coil and the pickup coil within the sensor.

Previous sensors such as described above have the pickup and backup coils close to each other, causing signals from coins to be picked up by both the pickup and backup coils, skewing comparisons between the signals output by the pickup and backup coils that are used for non-optical coin imaging. Such previous sensors were also impractical for use in a sensor array, as the previous sensors have too large of a diameter, such as 10 mm. Some previous eddy current sensor systems utilize a single eddy current sensor or group of sensors mostly randomly distributed in the sensing area. The shape of some previous sensors is round and there are also sensors which are elongated in one direction. Such previous sensors can detect information from the whole coin, but rather than providing detailed and higher resolution imaging information, the information is averaged across the whole coin. The eddy current sensor 2500 disclosed herein alleviates the above problems with previous eddy current sensors.

The eddy current sensor 2500 provides a focused eddy current sensor having a reduced diameter and pickup and backup coils spaced farther apart. The eddy current sensor 2500 includes a body 2502 including a pickup coil 2504 and a backup coil 2506 spaced farther apart within the body 2502, such as over 1 cm, than previous sensors such as those described above, such that magnetic fields generated by eddy currents are only picked up by the pickup coil. Unlike the previous sensors described above, the eddy current sensors 2500 includes more than one driving coil, a front driving coil 2508 disposed near or adjacent to the pickup coil 2504, and a back or reference driving coil 2510 disposed near or adjacent to the backup coil 2506. The front driving coil 2508 and the back driving coil 2510 are configured to be in series and to generate essentially the same magnetic field. Therefore, in the absence of a coin, the differential signal between the signals provided by the pickup coil 2504 and the backup coil 2506 is very small or essentially zero. In some of the embodiments the differential signal in the absence of the coin could intentionally set to a small value. When a coin is present, the pickup coil 2504 detects the eddy currents produced by the coin entering the magnetic field of the front driving coil 2508, and a differential signal between the signals provided by the pickup coil 2504 and the backup coil 2506 thereby indicates the presence of the coin and can provide information on different coin properties. Since backup coil 2506 of the focused eddy current sensor is far enough away that the presence of the coin does not affect the signals provided by the backup coil 2506, the differential signal provided when a coin is present is improved over the previous eddy current sensors described herein. In some embodiments, the differential signal can be calculated by a processor, such as the one or more processors 1438 or 1838, by, for example, subtracting the signal received from the backup coil 2506 from the signal received by the pickup coil 2504. It will be understood that the eddy current sensor 2500 can be operatively and/or communicatively coupled to the coin processing machine components disclosed herein, such as in FIGS. 1-5, 17, and 18, such that the signals provided by the eddy current sensor 2500 can be used for determining operations regarding coins processed by the coin processing machine.

A coin 2512 is transported by a transport means, such as described in the various embodiments of a coin processing machine herein, past the eddy current sensor 2500 such that the coin 2512 passes near the front driving coil 2508 and the pickup coil 2504. The coin 2512 can be transported at a linear speed of less than 50 ips, between 50 dpi and 300 dpi, and at a speed higher than 300 ips, to present the coin in front of the eddy current sensor 2500. Based on the signals provided by the eddy current sensor 2500, coins can also be separated in specific groups within a coin processing machine based on detection and system decisions. The eddy current sensor 2500 excites the coin 2512 using electromagnetic or alternating magnetic energy, excite the eddy currents in the coins and captures the electromagnetic or magnetic response from the coin by capturing electromagnetic or eddy current imaging type information using the pickup coil 2504. In various embodiments described herein, such as when an array of eddy current sensors is used, the means to excite the coin 2512 could be, for example, a single coil covering all detection elements in the imaging array, multiple coils for groups or subgroups of detection elements, one coil per sensing element or detector. The coil could be in a form of wounded three dimensional coin or a flat coil. The coin 2512 could also be excited by other means, such as motion of the coin in the stationary magnetic field.

In some embodiments, when the front driving coil 2508 is used as the excitation means, an alternate current flowing in the coil can generate an alternating magnetic field which in turn excites eddy-currents in the coin material. The eddy-currents flowing in the coin 2512 will generate another alternating magnetic field which is subsequently picked up by detecting elements of an imaging system of the coin processing machine as an alternate current. The frequency of the alternating field could vary from very low frequencies in the range of Hz to higher frequencies in the range of kHz and MHz. The driving coils 2508 and 2510 could be excited with a single frequency, with a simultaneous excitation at multiple discrete frequencies, or with a pulse excitation. When using an array of eddy current sensors such as disclosed in the various embodiments herein, each of the driving elements could be excited in an identical way or each of the elements could have a distinct excitation characteristic. In various embodiments, the eddy current sensor 2500 can carry a single excitation frequency (1F) or multiple excitation frequencies (4F or Multi-Frequency-Pulse).

The eddy current sensor 2500 has a smaller diameter than previous sensors described above, such as 5 mm. The smaller diameter provides improved spatial resolution which increases the accuracy of coin imaging and also provides improved ability to image coins which are in close proximity to each other. The resolution of the image could range from 2×1 dpi, 50×50 dpi or more. In some embodiments, the eddy current sensor 2500 can read a coin electromagnetic response as a single trace. Depending on the coin size, the trace could be measured along the diameter of the coin or its cord. For detection of certain nonsymmetrical coins that cannot be properly identified using a single sensor, particularly counterfeits and coins unfit for circulation, an array of eddy current sensors can be used, as described in the various embodiments herein.

Figure 26:
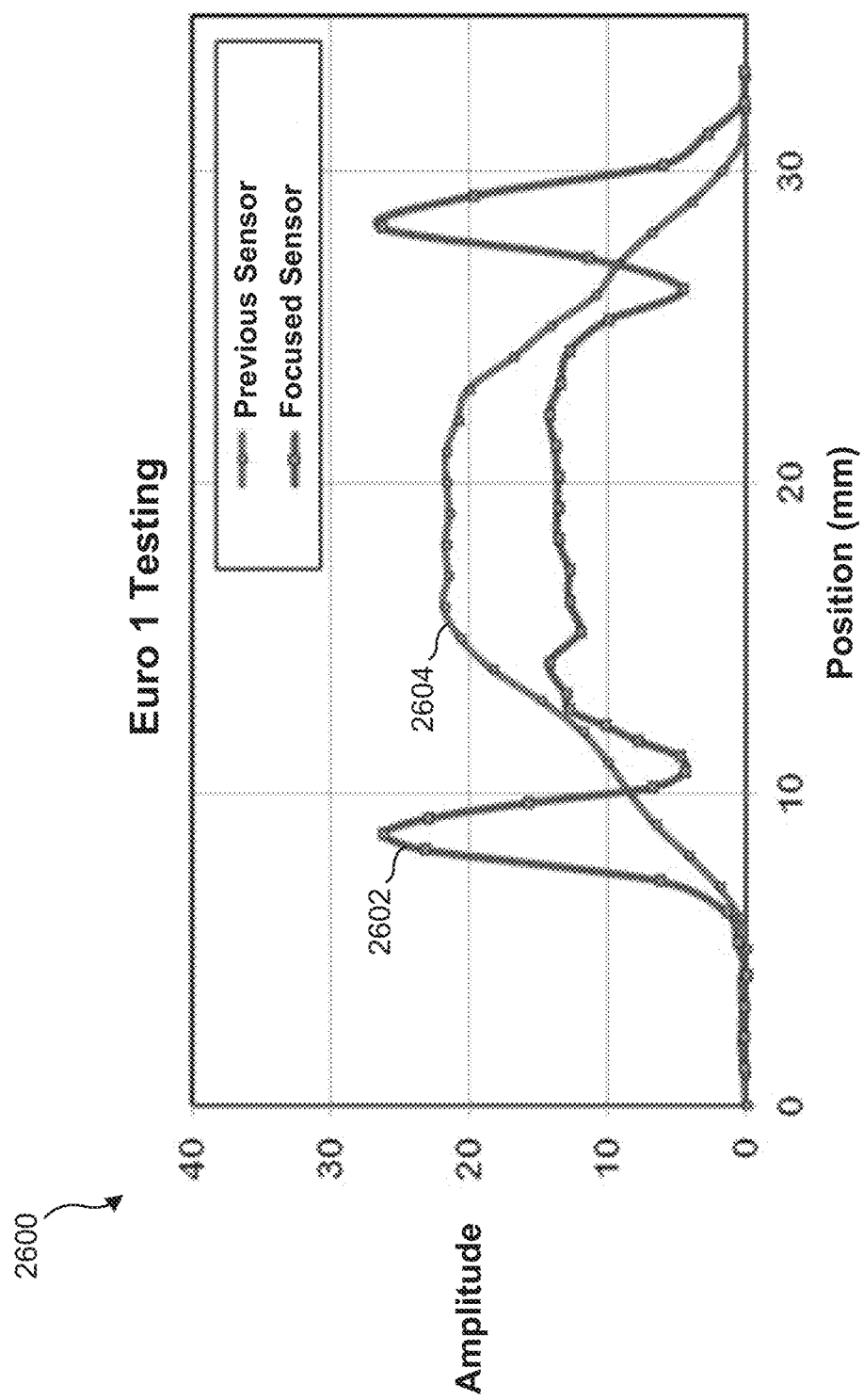
FIG. 26 illustrates an example spatial resolution comparison chart in accordance with various embodiments of this disclosure.

FIG. 26 illustrates an example spatial resolution comparison chart 2600 in accordance with various embodiments of this disclosure. The spatial resolution comparison chart 2600 compares results from a focused eddy current sensor, such as described with respect to FIG. 25, and a previous eddy current sensor such as those described herein. The chart 2600 shows the amplitude of the EMS static characteristics of a bicolor Euro 1 (€1) coin measured using each of the focused eddy current sensor and the previous eddy current sensor. A line 2602 shows the results from the focused eddy current sensor, and a line 2604 shows the results from the previous eddy current sensor. The chart 2600 demonstrates that the focused eddy current sensor provides larger spikes in amplitude readings at certain coin positions.

Figure 27A:
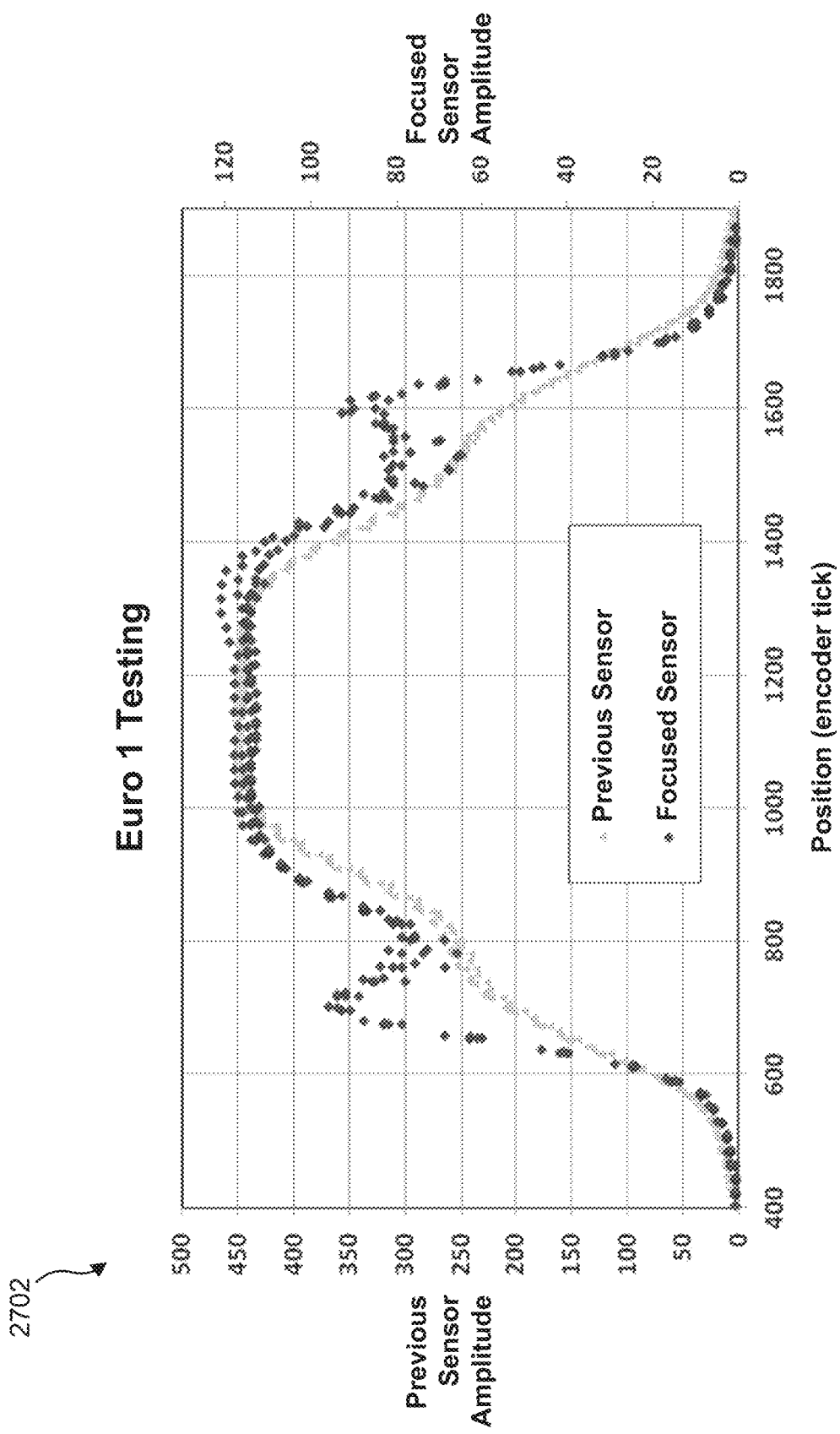
FIGS. 27A and 27B illustrate example dynamic data comparison charts in accordance with various embodiments of this disclosure.
Figure 27B:
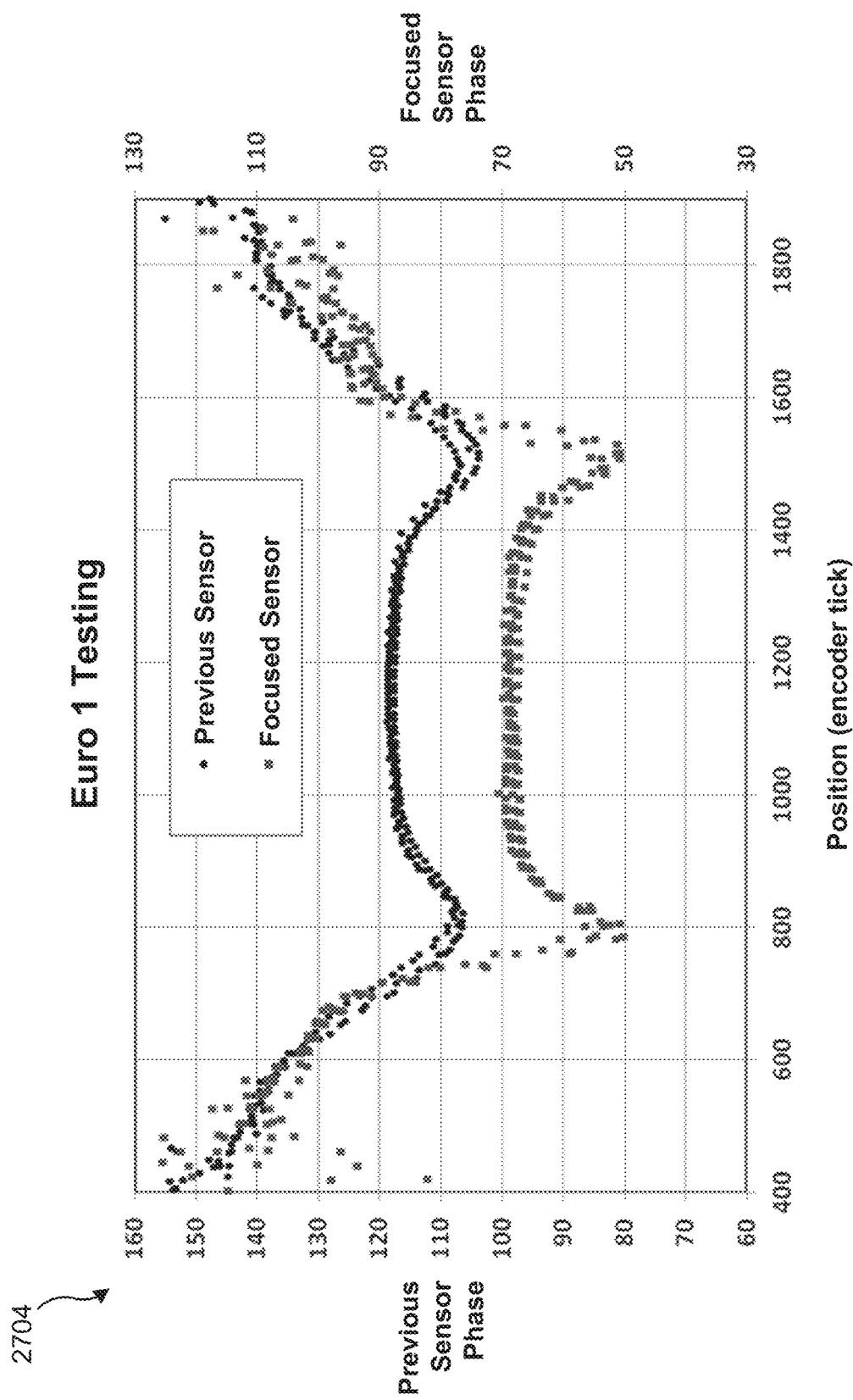

FIGS. 27A and 27B illustrate example dynamic data comparison charts in accordance with various embodiments of this disclosure. FIG. 27A illustrates an example sensor amplitude chart 2702. FIG. 27B illustrates an example sensor phase chart 2704. The example sensor amplitude chart 2702 illustrates an example of differences in amplitude measured using a previous eddy current sensor such as described herein and measured using a focused eddy current sensor such as described with respect to FIG. 25. The example sensor phase chart 2704 illustrates an example of differences in phase measured using a previous eddy current sensor such as described herein and measured using a focused eddy current sensor such as described with respect to FIG. 25. The amplitude and phase data obtained using a focused eddy current sensor shown in FIGS. 27A and 27B illustrate the improved spatial imaging provided by the focused eddy current sensor.

Figure 28A:
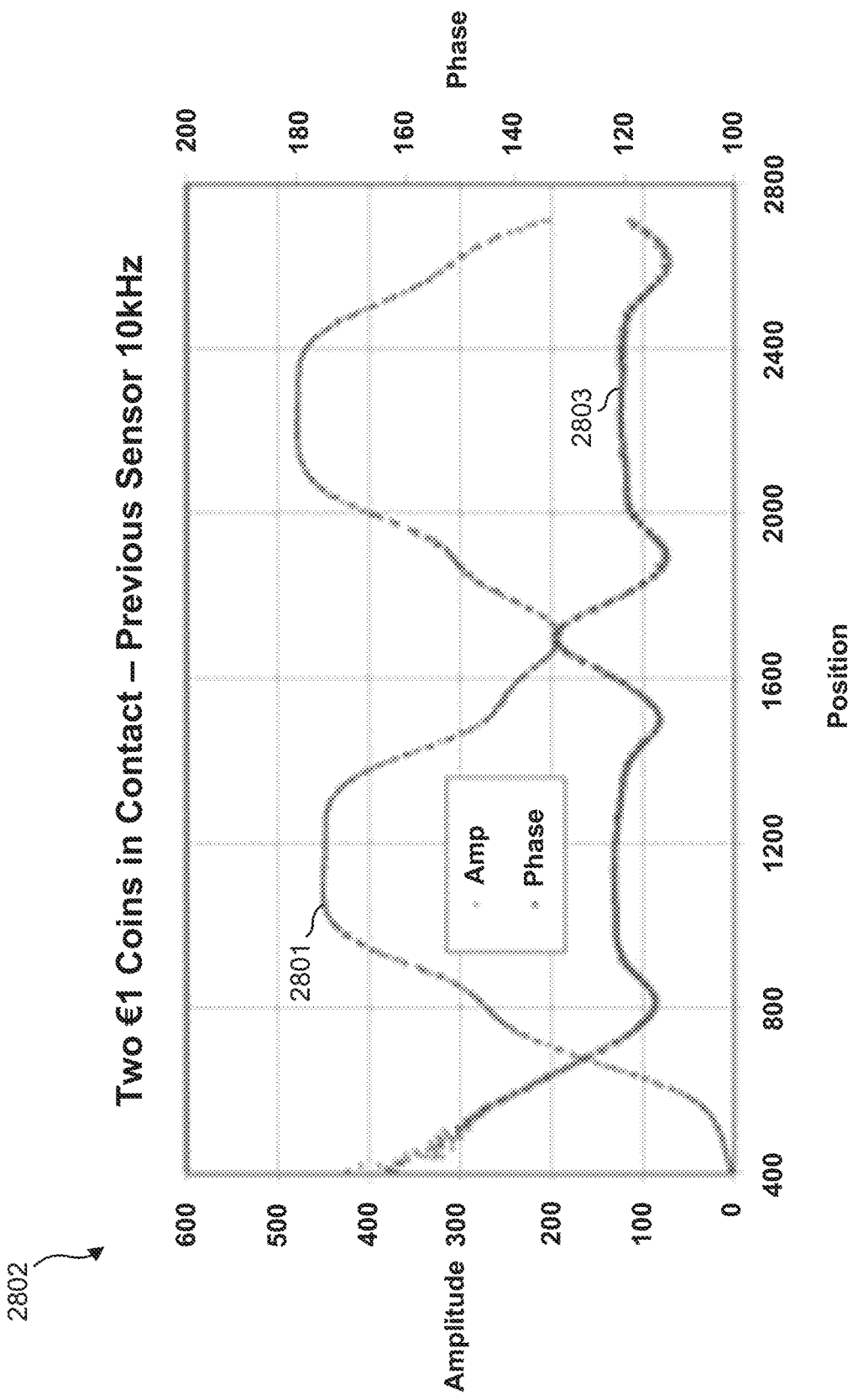
FIGS. 28A and 28B illustrate example dynamic data charts showing readings when two coins are in contact with each other in accordance with various embodiments of this disclosure.
Figure 28B:
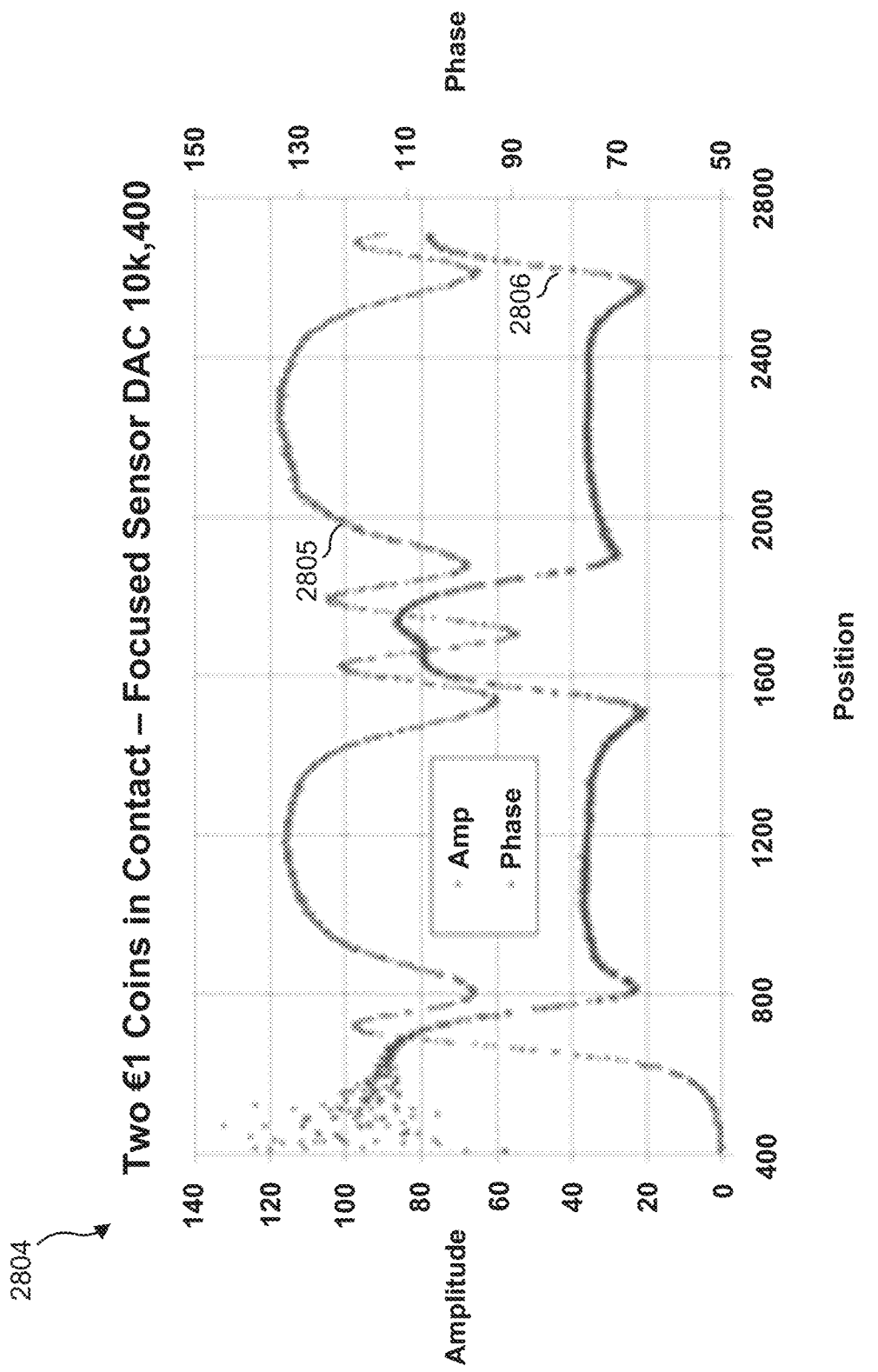

FIGS. 28A and 28B illustrate example dynamic data charts showing readings when two coins are in contact with each other in accordance with various embodiments of this disclosure. FIG. 28A illustrates an example previous eddy current sensor dynamic data chart 2802. FIG. 28B illustrates an example focused eddy current sensor dynamic data chart 2804. The example previous eddy current sensor dynamic data chart 2802 includes an amplitude line 2801 and a phase line 2803. The example focused eddy current sensor dynamic data chart 2804 includes an amplitude line 2805 and a phase line 2806. As shown in FIGS. 28A and 28B, the amplitude and phase data provided by the focused eddy current sensor shown in FIG. 28B provides for a more obvious distinction between the two coins, as evidence by the two spikes after position 1600, whereas the data provided by the previous eddy current sensor shows a more gradual slope due to more special averaging.

Figure 29A:
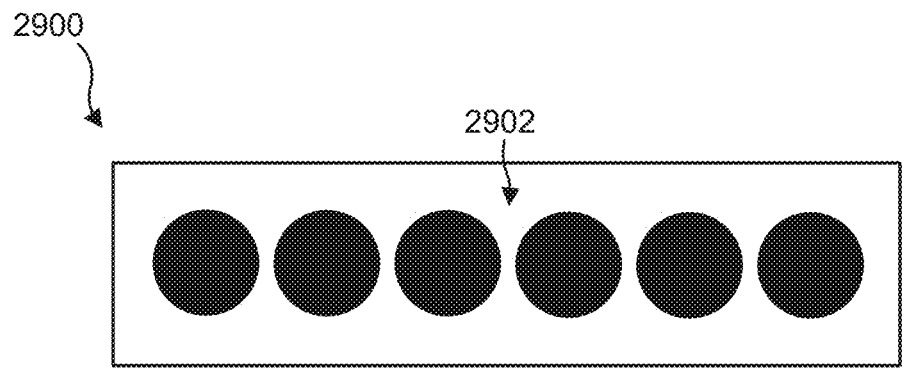
FIGS. 29A and 29B illustrate an example one-dimensional eddy current sensor array in accordance with various embodiments of this disclosure.
Figure 29B:
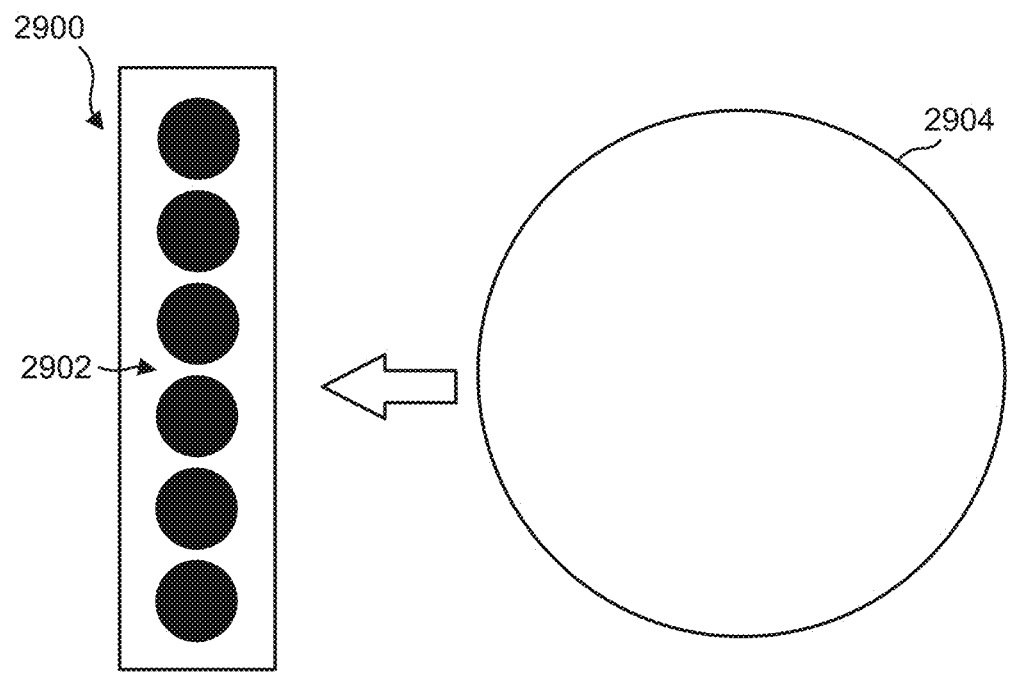

FIGS. 29A and 29B illustrate an example one-dimensional eddy current sensor array 2900 in accordance with various embodiments of this disclosure. Like the linear sensor arrays 1850 of FIG. 18, 2050 of FIG. 20, and 2350 of FIG. 23, the sensor array 2900 of FIGS. 29A and 29B includes a one-dimensional (1D) array of non-optical sensors that is operable to examine or otherwise sense coins seated on an adjacent rotatable disk (or other coin transport mechanism) and output a signal indicative of coin image information for processing each of the coins. In the same vein, the sensor array 2900 of FIGS. 29A and 29B can include any of the options and alternatives described above with respect to the sensor arrays 1850, 2050, and 2350. It will be understood that the various non-optical sensor types can be used in combination, such as an array that includes multiple non-optical sensor types, or using separate arrays for each sensor type that each provide non-optical imaging data with respect to coins provided to the sensors via the coin transport mechanism. It will also be understood that optical imaging sensors and sensor arrays can be used in conjunction with non-optical imaging sensors and sensor arrays to provide both optical imaging data and non-optical imaging data for use in coin detection and authentication.

The 1D eddy current sensor array 2900 includes, for example, a plurality of eddy current sensors 2902, such as multiple ones of the focused eddy current sensor 2500 described with respect to FIG. 25. In this example, the plurality of eddy current sensors 2902 includes six eddy current sensors disposed linearly, but other numbers of eddy current sensors can be used depending on the needs of the coin processing apparatus, types of coins to be detected, etc. FIG. 29B illustrates a direction and orientation in which a coin 2904 passes the 1D eddy current sensor array 2900, such that separate portions of the width of the coin 2904 passes by the separate ones of the plurality of eddy current sensors 2902. For example, linear array of sensors is arranged transverse to a path of travel of passing coins. In various embodiments of this disclosure, a width of the linear array of sensors is approximately equal to or greater than a diameter of a largest coin the currency processing system is configured to process. It will be understood that other embodiments of linear sensor arrays can be configured in a similar manner with respect to the orientation and size of coins.

Figure 30:
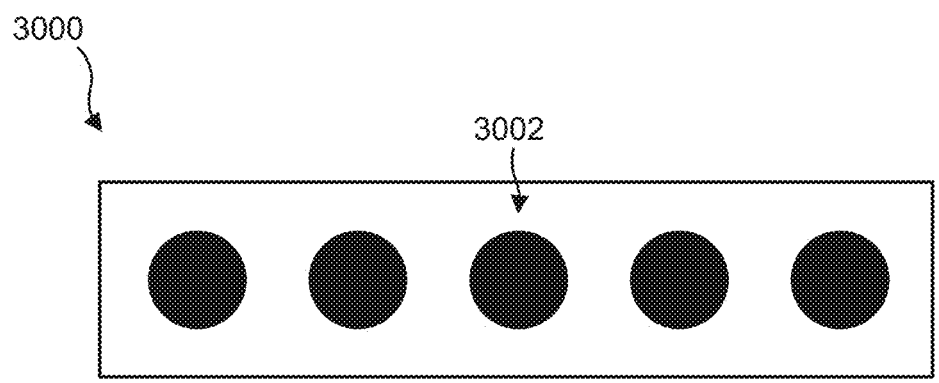
FIG. 30 illustrates another example of a one-dimensional eddy current sensor array in accordance with various embodiments of this disclosure.

FIG. 30 illustrates another example of a 1D eddy current sensor array 3000 in accordance with various embodiments of this disclosure. The 1D eddy current sensor array 3000 is similar to the 1D eddy current sensor array 2900 described with respect to FIGS. 29A and 29B, except that the 1D eddy current sensor array 3000 includes five eddy current sensors disposed linearly. Like the 1D eddy current sensor array 2900, and also like the linear sensor arrays 1850 of FIG. 18, 2050 of FIG. 20, and 2350 of FIG. 23, the sensor array 3000 of FIG. 30 includes a one-dimensional (1D) array of non-optical sensors that is operable to examine or otherwise sense coins seated on an adjacent rotatable disk (or other coin transport mechanism) and output a signal indicative of coin image information for processing each of the coins. In the same vein, the sensor array 3000 of FIG. 30 can include any of the options and alternatives described above with respect to the sensor arrays 1850, 2050, and 2350. It will be understood that the various non-optical sensor types can be used in combination, such as an array that includes multiple non-optical sensor types, or using separate arrays for each sensor type that each provide non-optical imaging data with respect to coins provided to the sensors via the coin transport mechanism. It will also be understood that optical imaging sensors and sensor arrays can be used in conjunction with non-optical imaging sensors and sensor arrays to provide both optical imaging data and non-optical imaging data for use in coin detection and authentication.

The 1D eddy current sensor array 3000 includes, for example, a plurality of eddy current sensors 3002, such as multiples ones of the focused eddy current sensor 2500 described with respect to FIG. 25. In this example, the plurality of eddy current sensors 3002 includes five eddy current sensors disposed linearly, but other numbers of eddy current sensors can be used depending on the needs of the coin processing apparatus, types of coins to be detected, etc.

Figure 31:
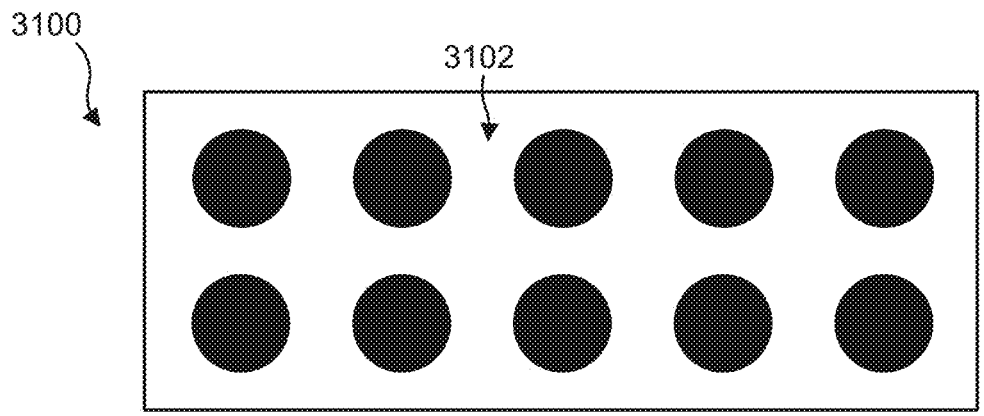
FIG. 31 illustrates an example two-dimensional eddy current sensor array including linear symmetrical rows of eddy current sensors in accordance with various embodiments of this disclosure.
Figure 32:
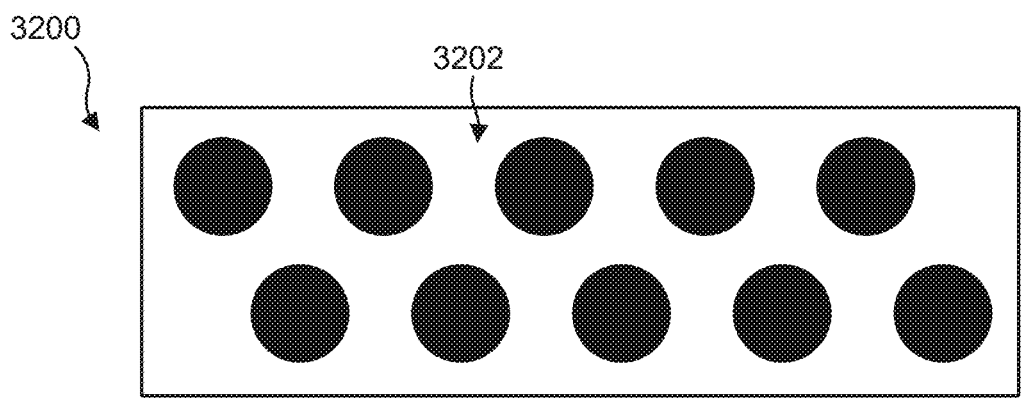
FIG. 32 illustrates an example two-dimensional eddy current sensor array including two linear asymmetrical rows of eddy current sensors in accordance with various embodiments of this disclosure.
Figure 33A:
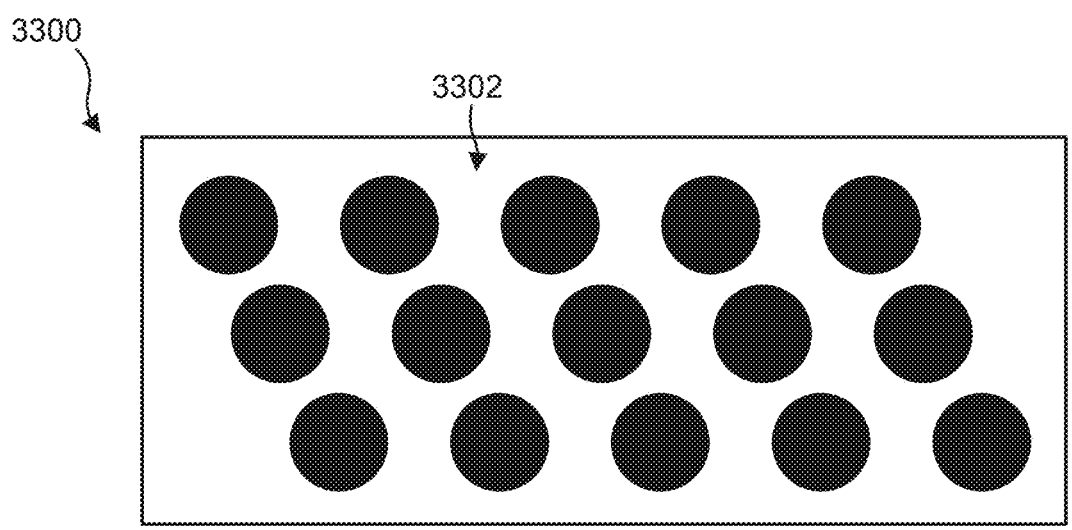
FIGS. 33A and 33B illustrate an example two-dimensional eddy current sensor array including three linear asymmetrical rows of eddy current sensors in accordance with various embodiments of this disclosure.
Figure 33B:
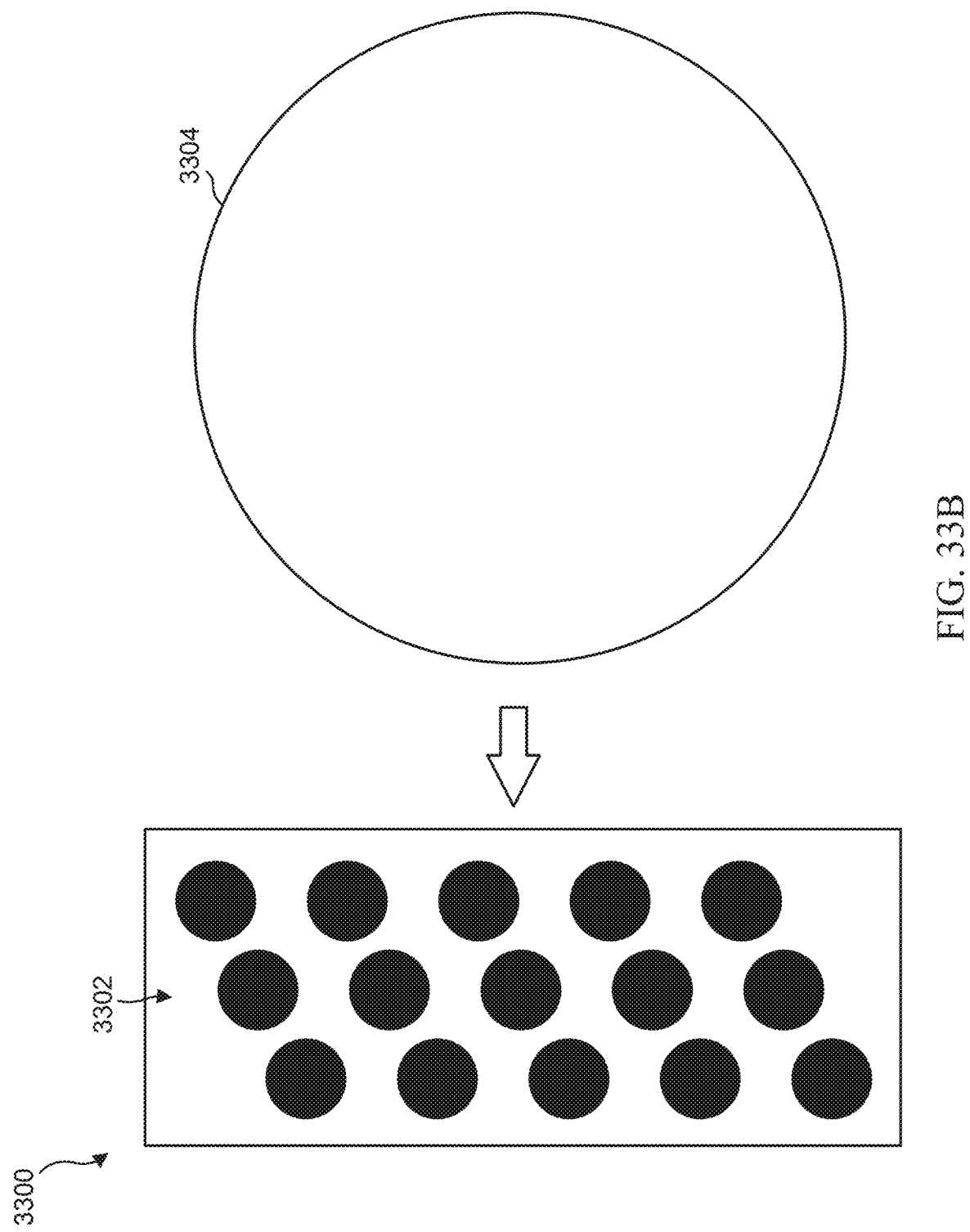

FIGS. 31-33B illustrate various examples of two-dimensional (2D) eddy current sensor arrays in accordance with various embodiments of the present disclosure. FIG. 31 illustrates a 2D eddy current sensor array 3100 including two linear symmetrical or parallel rows of eddy current sensors. FIG. 32 illustrates a 2D eddy current sensor array 3200 including two linear asymmetrical or interlaced rows of eddy current sensors. FIGS. 33A and 33B illustrate a 2D eddy current sensor array 3300 including three linear asymmetrical or interlaced rows of eddy current sensors. In some of the embodiments of the sensor arrays 3200 or 3300 the positions of the sensors in the second array are shifted in respect of the positions of sensors in the first array by the distance equal to the half of the spacing between the centers of sensors in the first array, such as illustrated with respect to FIG. 32. In some embodiments of the sensor array 3200 or 3300, the positions of the sensors in the second array are shifted in respect to the positions of sensors in the first array by the ⅓ of the spacing between the centers of the sensors in the first array and the sensors in the third array are shifted by ⅔ of the spacing between the centers of the sensors in the first array, such as illustrated with respect to FIG. 33A. The 2D eddy current sensor arrays 3100, 3200, and 3300, like the 1D eddy current sensor arrays 2900, 3000, and also like the linear sensor arrays 1850 of FIG. 18, 2050 of FIG. 20, and 2350 of FIG. 23, are operable to examine or otherwise sense coins seated on an adjacent rotatable disk (or other coin transport mechanism) and output a signal indicative of coin image information for processing each of the coins. In the same vein, the sensor arrays 3100, 3200, and 3300 can include any of the options and alternatives described above with respect to the sensor arrays 1850, 2050, and 2350. It will be understood that the various non-optical sensor types can be used in combination, such as an array that includes multiple non-optical sensor types, or using separate arrays for each sensor type that each provide non-optical imaging data with respect to coins provided to the sensors via the coin transport mechanism. It will also be understood that optical imaging sensors and sensor arrays can be used in conjunction with non-optical imaging sensors and sensor arrays to provide both optical imaging data and non-optical imaging data for use in coin detection and authentication.

While various applications can be served by using a 1D sensor array, due to sensor to sensor interactions there are limitations on how closely the sensors could be disposed in the array, such as a minimum spacing related to design, excitation parameters, etc. A 1D array will also allow for low-resolution EMS imaging. To provide a higher resolution, or if larger spacing between sensors is appropriate, a 2D array can be used. In some embodiments, interlaced sensors in a second or more rows of a 2D sensor array allow for the gathering of information from the areas between the sensors in the first row. The 2D eddy current sensor array 3100 illustrated in FIG. 31 includes a plurality of eddy current sensors 3102, such as multiples ones of the focused eddy current sensor 2500 described with respect to FIG. 25. In this example, the plurality of eddy current sensors 3102 includes two symmetrical rows each having five eddy current sensors disposed linearly.

The 2D eddy current sensor array 3200 illustrated in FIG. 32 includes a plurality of eddy current sensors 3202, such as multiples ones of the focused eddy current sensor 2500 described with respect to FIG. 25. In this example, the plurality of eddy current sensors 3202 includes two asymmetrical rows each having five eddy current sensors disposed linearly, such that the second row of sensors is shifted in alignment from the first row. The 2D eddy current sensor array 3300 illustrated in FIGS. 33A and 33B includes a plurality of eddy current sensors 3302, such as multiples ones of the focused eddy current sensor 2500 described with respect to FIG. 25. In this example, the plurality of eddy current sensors 3302 includes three asymmetrical rows each having five eddy current sensors disposed linearly, such that the second row of sensors is shifted in alignment from the first row, and the third row is shifted in alignment from the second row. FIG. 33B illustrates a direction and orientation in which a coin 3304 passes the 2D eddy current sensor array 3300, such that separate portions of the width of the coin 3304 passes by the separate ones of the plurality of eddy current sensors 3302. It will be understood that coins can pass the sensor arrays 3102 and 3202 in a similar manner.

It will be understood that the various embodiments of 2D eddy current sensors disclosed herein can include any number of eddy current sensors disposed in any number of rows, with the alignment of the rows altered as needed for proper coin detection. In some embodiments, when using a 2D eddy current sensor array such as the 2D arrays 3100, 3200, and 3300, the array can be configured to operate in a multi-frequency mode, such that sensors in each of the rows operate at different frequencies or different groups of frequencies.

Figure 34:
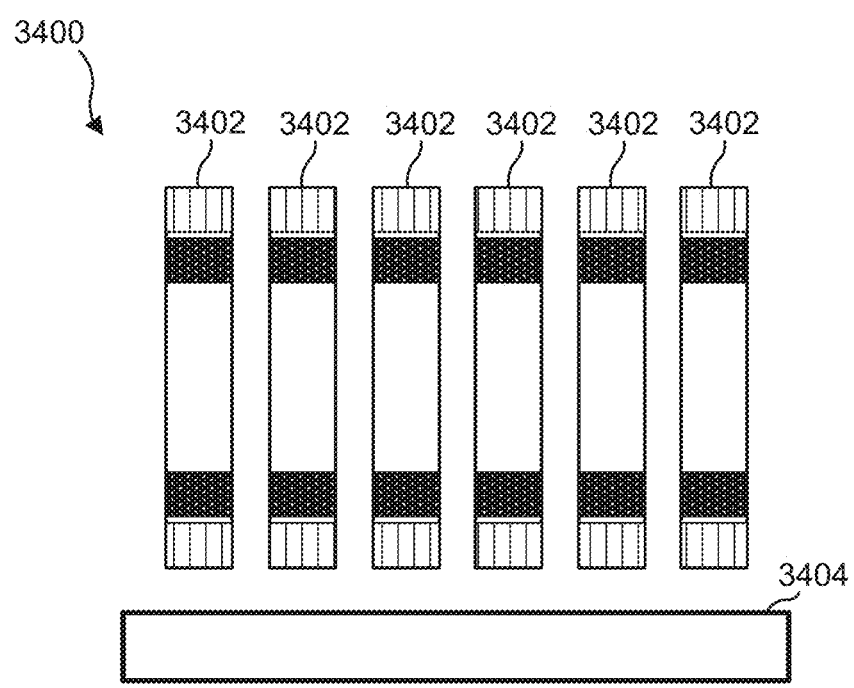
FIG. 34 illustrates an example eddy current sensor array system in accordance with various embodiments of this disclosure.

FIG. 34 illustrates an example eddy current sensor array system 3400 in accordance with various embodiments of this disclosure. The eddy current sensor array system 3400 includes a plurality of eddy current sensors 3402 disposed at a location in a coin processing machine such that a coin 3404 passes a first end where the pickup coil and front driving coil are located of all of the plurality of eddy current sensors 3402. As also described with respect to FIG. 25, each of the eddy current sensors 3402 can be a focused eddy current sensor of a smaller diameter, with a pickup coil and a front driving coil disposed at the first end, and a backup coil and a back driving coil disposed at a second end of each of the plurality of eddy current sensors 3402. Each of the eddy current sensors of the plurality of eddy current sensors 3402 can excite the coin 3404 using electromagnetic or alternating magnetic energy provided by the front driving coil, and can capture the electromagnetic or magnetic response from the coin by capturing eddy current imaging type information using the pickup coil. In some embodiments, all the driving coils can be essentially identical and generate the same field. For each of the plurality of eddy current sensors 3402, the signal from the backup coil can be subtracted from the signal provided by the respective pickup coil, to calculate differences in signals provided by each pickup coil and backup coil.

Figure 35:
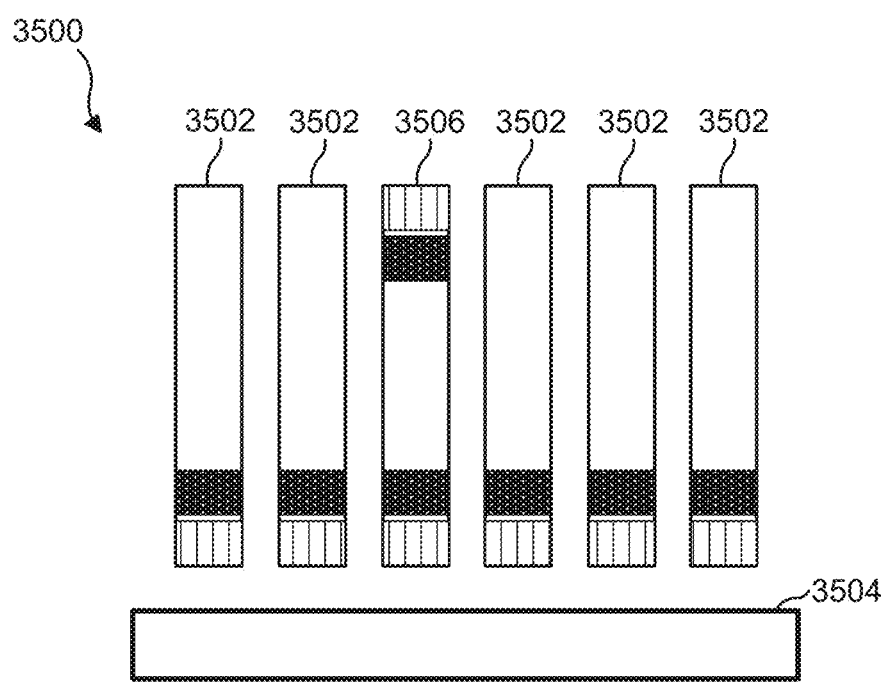
FIG. 35 illustrates another example eddy current sensor array system in accordance with various embodiments of this disclosure.

FIG. 35 illustrates another example eddy current sensor array system 3500 in accordance with various embodiments of this disclosure. The eddy current sensor array system 3500 includes a plurality of eddy current sensors 3502 disposed at a location in a coin processing machine such that a coin 3504 passes a first end where the pickup coil and front driving coil are located of all of the plurality of eddy current sensors 3502. As also described with respect to FIG. 25, each of the eddy current sensors 3402 can be a focused eddy current sensor of a smaller diameter, with a pickup coil and a front driving coil disposed at the first end. In this example, the plurality of eddy current sensors 3502 do not include a backup coil or a back driving coil. Rather, the system 3500 includes another single eddy current sensor 3506 in the array that includes, in addition to a pickup coil and front driving coil, a backup coil and a back driving or reference coil disposed at a second end of the other single eddy current sensor 3506. Each of the eddy current sensors of the plurality of eddy current sensors 3502 and the other single eddy current sensor 3506 can excite the coin 3504 using electromagnetic or alternating magnetic energy provided by the front driving coil, and can capture the electromagnetic or magnetic response from the coin by capturing eddy current imaging type information using the pickup coil. In some embodiments, all the driving coils can be essentially identical and generate the same field. The signal from the backup coil of the other single eddy current sensor 3506 in the array is subtracted from the signal provided by the single eddy current sensor 3506 and subtracted from each of the signals provided by each one of the plurality of eddy current sensors 3502. In some embodiments, the back driving or reference coil and backup coil could be eliminated and the signal from the pickup coils when no coin is present would be collected and stored in memory and subtracted from the pickup coil signal when a coin is present.

The sensors of the eddy current sensors described herein, such as the focused eddy current sensor described with respect to FIG. 25, can excite the coin and allow for the reading of a coin electromagnetic response as a single trace. Depending on the coin size, the trace could be measured along the diameter of the coin or its cord. For detection of certain nonsymmetrical coins, particularly counterfeits and coins unfit for circulation, that cannot be properly identified using a single sensor, an array of eddy current sensors can be used, as described in the various embodiments herein, such as with respect to FIGS. 29A-35. Information received from coins using the various eddy current sensor arrays described with respect to FIGS. 29A-35, depending on the type of sensor array, can be processed as single factor EMS, two factors EMS, or as a pulsed response if continuous excitation or pulse excitation are used. In various embodiments, the sensors of the sensor arrays can carry a single excitation frequency (1F) or multiple excitation frequencies (4F or Multi-Frequency or Pulse). Using an array of eddy current sensors allows for the scanning of each coin along multiple cords and effectively creating an image of the coin. The image will allow not only detecting if the coin belongs to specific group of coins, or is no longer part of the specific class, but also allows for identifying locations of a flaw, defect, or imperfection. Information detected using the eddy current sensor arrays described in the various embodiments herein can be processed by imaging electronics and imaging software to classify coins as, for example, unknown, unfit, or counterfeit. The use of the focused eddy current imaging arrays alleviates problems with spatial averaging as observed in wider diameter sensors, and also addresses the shortcomings of using a single sensor, as a single sensor may not be able to provide imaging of a whole coin.

Figure 36A:
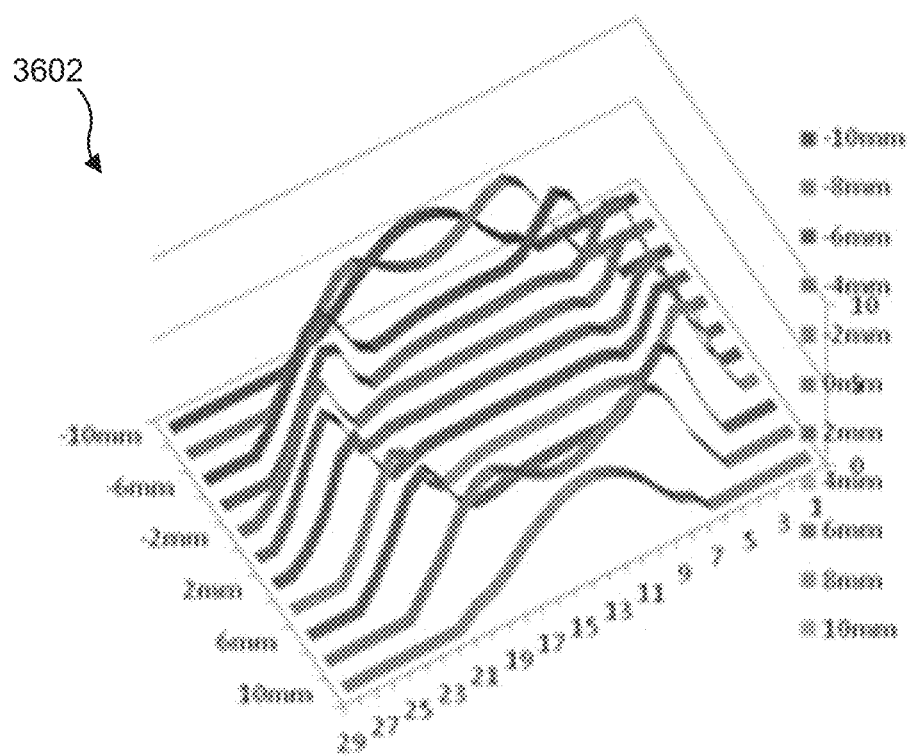
FIGS. 36A-36C illustrate examples of eddy current sensor array EMS imaging data in accordance with various embodiments of this disclosure.
Figure 36B:
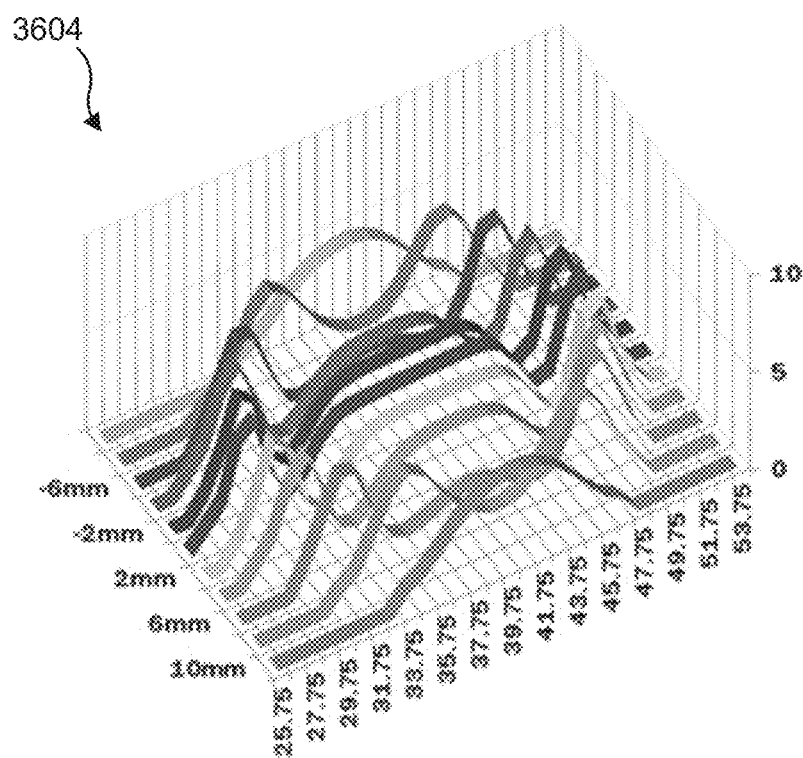
Figure 36C:
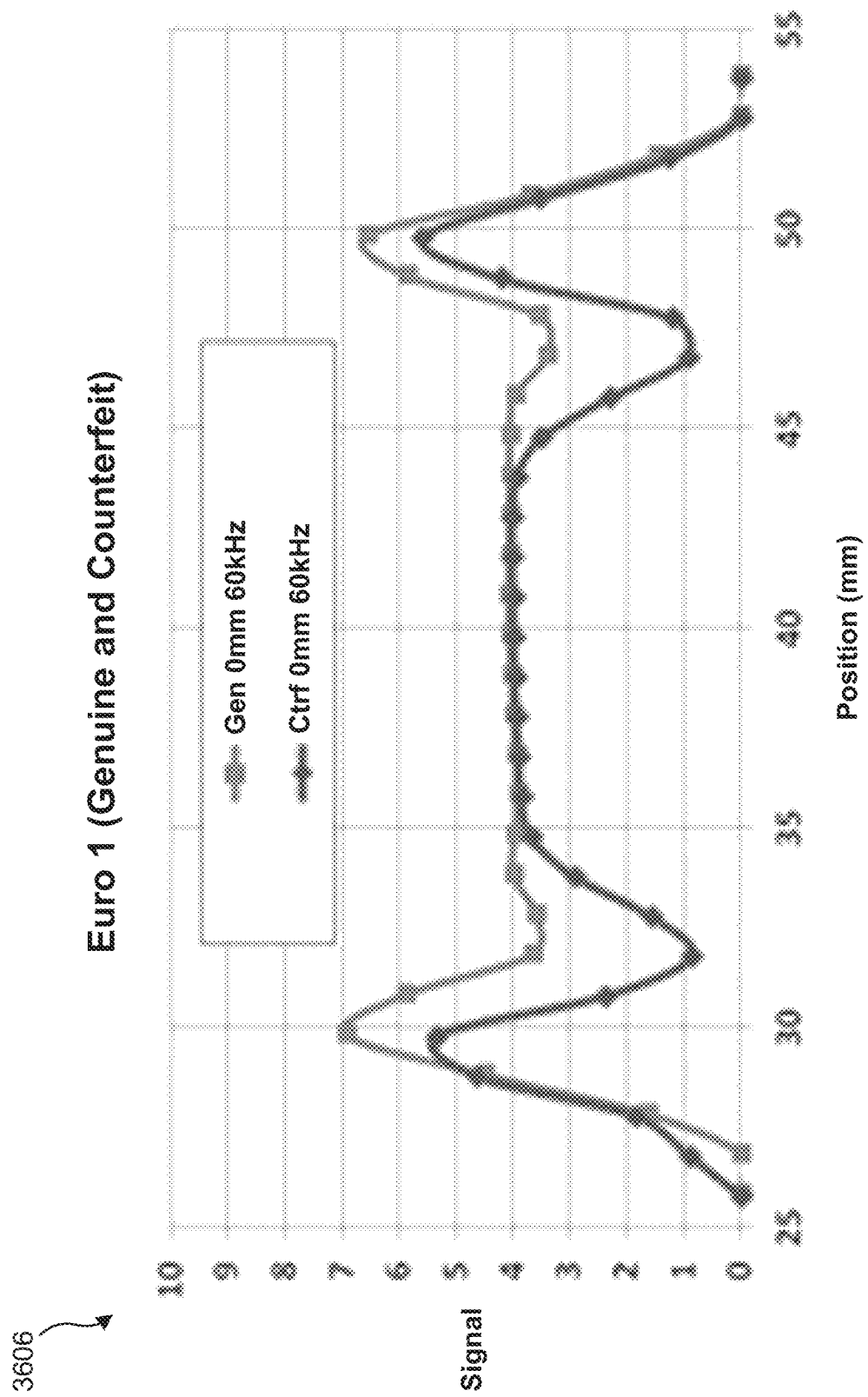

FIGS. 36A-36C illustrate examples of eddy current sensor array EMS imaging data in accordance with various embodiments of this disclosure. FIG. 36A illustrates an EMS image 3602 of a genuine coin. FIG. 36B illustrates an EMS image 3604 of a counterfeit coin. FIG. 36C illustrates an EMS characteristics chart 3606. As shown in FIGS. 36A and 36B, coins can be scanned using an eddy current sensor array along multiple cords to create a non-optical image of a coin. Certain characteristics of the cords of the non-optical image can alert a system to a counterfeit coin, such as particular values for the cords at different positions, or the general shape of the non-optical image. For example, as shown in FIGS. 36A and 36B, the counterfeit coin portrayed in FIG. 36B has higher values in a center area of the cords, created an elevated or bulged area, which can alert the system to a possible counterfeit coin. The EMS characteristics chart 3606 of FIG. 36C illustrates the difference in signal characteristics between a genuine one Euro coin and a counterfeit one Euro coin with respect to the centers of both coins. It will be understood that the EMS data illustrated in the examples of FIGS. 36A-36C are merely examples, and EMS data may be different depending on coin type, sensor array configuration, or other factors.

Figure 37:
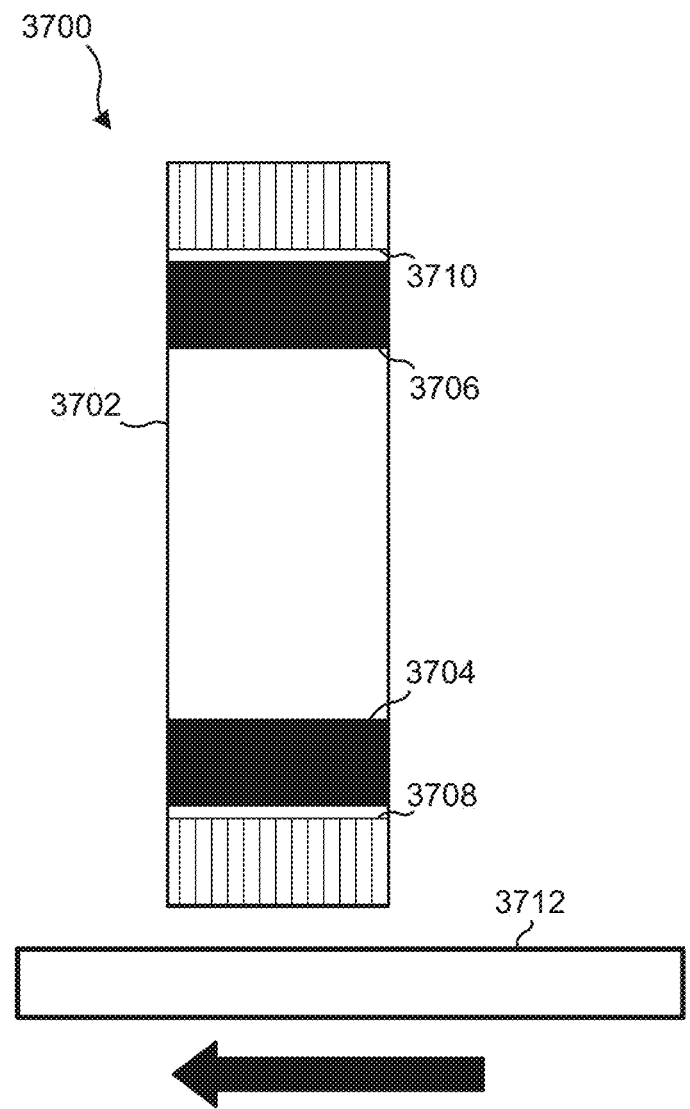
FIG. 37 illustrates a solid-state magnetic field sensor in accordance with various embodiments of this disclosure.

FIG. 37 illustrates a solid-state sensor 3700 in accordance with various embodiments of this disclosure. The solid-state sensor, like the eddy current sensor 2500 described with respect to FIG. 25, has a body 3702 that includes spaced apart sensing elements. The body 3702 of the solid-state sensor 3700 includes a front solid-state magnetic field sensor 3704, and a back solid-state magnetic field sensor 3706. A front driving coil 3708 is disposed near or adjacent to the front solid-state magnetic field sensor 3704, and a back driving or reference coil 3710 is disposed near or adjacent to the back solid-state magnetic field sensor 3706. As a coin 3712 passes into an alternating magnetic field generated by the front driving coil 3708, which in turn generate eddy currents in the coins which generate magnetic field which can be detected by the front solid-state magnetic field sensor 3704, and the front solid-state magnetic field sensor 3704 can provide signals indicative of the detected coin. The back solid-state magnetic field sensor 3706 provides signals for a baseline magnetic field created by the back driving coil 3710 that is similar to the magnetic field generated by the front driving coil 3708 when a coin is not present. The solid-state sensor of the illustrated in FIG. 37 is a dual detection sensor. The solid-state sensor will detect the eddy current EMS characteristic of the coin and at the same time can detect the magnetic signature of the pre-magnetized coin made with or containing magnetic material. The signal from the sensor is filtered through two electronic channels; one tuned to the frequency or frequencies of the excitation signal and the second one filters out the ac signals and detects only the magnetic signal associated with the magnetic properties of the coin.

It will be understood that the solid-state sensor 3700 can be a Hall sensor or a magneto-resistive (MR) sensor such as an anisotropic magneto-resistive (AMR) sensor, a giant magneto-resistive (GMR) sensor, or a tunnel magneto-resistive (TMR) sensor. In some embodiments, the output vs magnetic field characteristic of the sensor must show substantially linear characteristic over a wide field range. As shown as a nonlimiting example in the FIG. 38A, a TMR sensor can offer these characteristics. Like the focused eddy current sensor described with respect to FIG. 25, the solid-state sensor 3700 can be used in a sensor array of multiple sensors, or combined with other non-optical sensor types or optical sensor types to provide a wide range of data. A sensor array of solid-state magnetic sensors can be configured in a similar manner to the eddy current sensor arrays described in the various embodiments herein, such as the example configuration illustrated in FIGS. 29A-35.

Figure 38A:
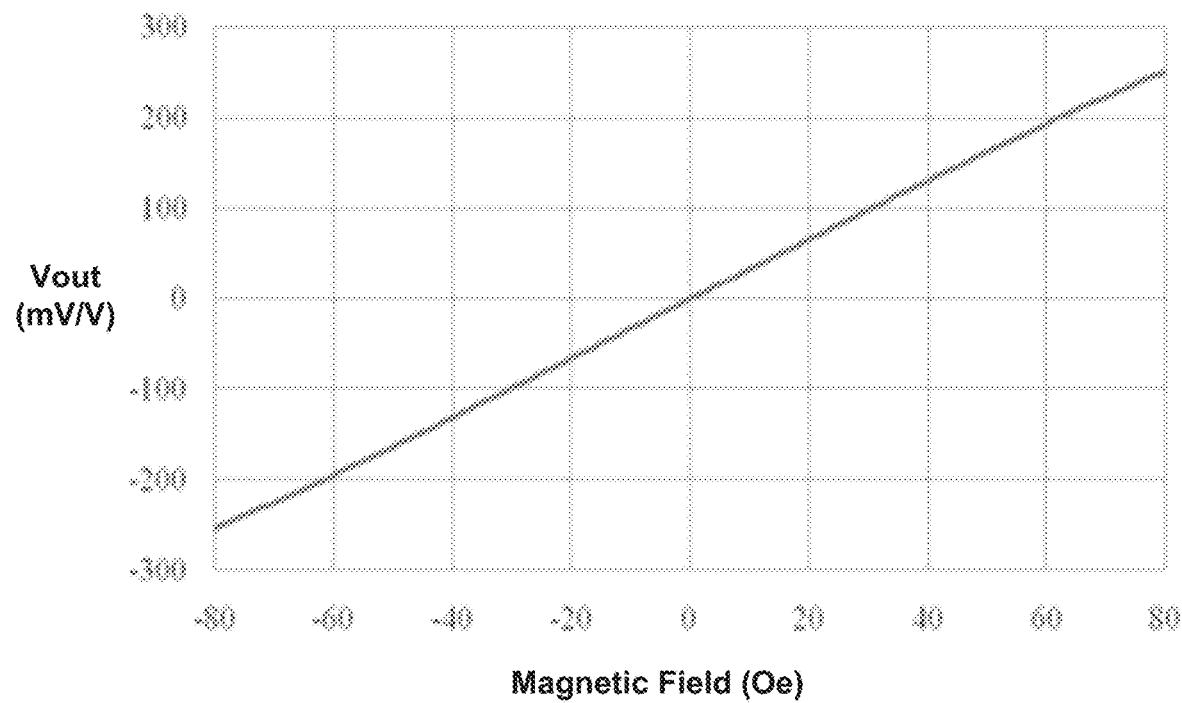
FIGS. 38A and 38B illustrate example signal data of a solid-state magnetic field sensor in accordance with various embodiments of this disclosure.
Figure 38B:
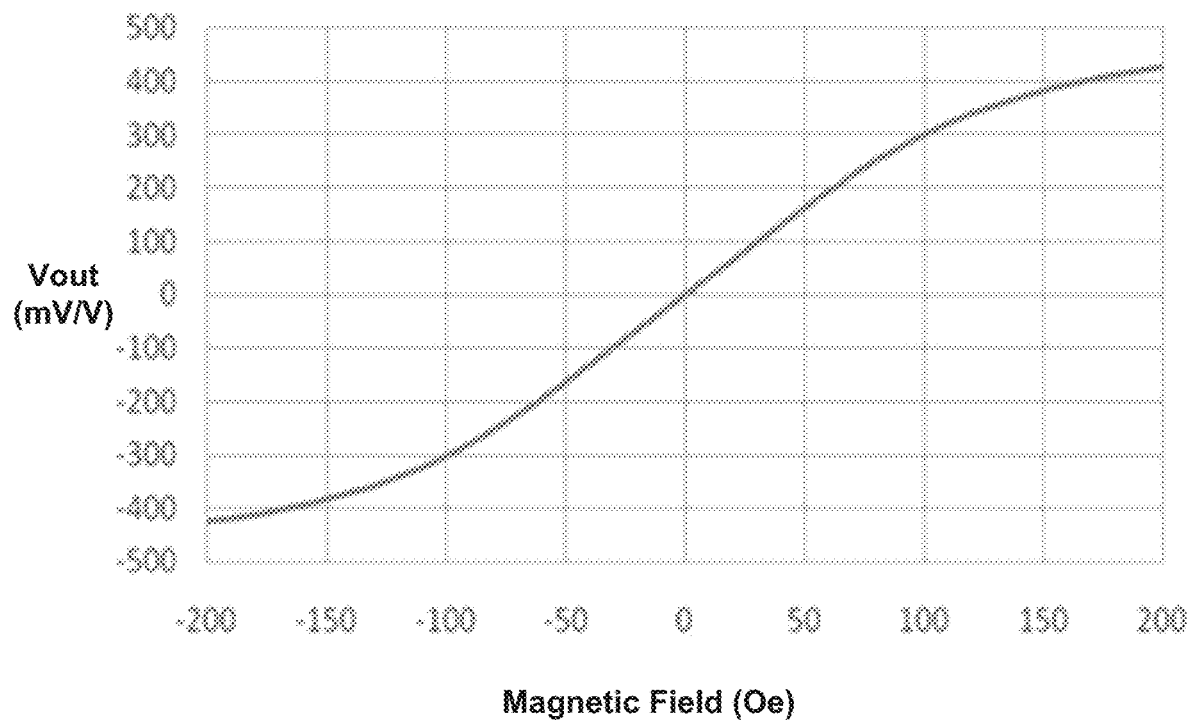

FIGS. 38A and 38B illustrate example signal data of a solid-state magnetic field sensor in accordance with various embodiments of this disclosure. FIG. 38A illustrates magnetic field signal data provided by a solid-state magnetic field sensor when a coin is not present, such as by the front solid-state magnetic field sensor 3704 when a coin is not present, or by the back solid-state magnetic field sensor 3706, as described with respect to FIG. 37. In some embodiments, in order to address the issue of a strong magnetic field generated by the coins with magnetic elements in the coin structure, the solid-state sensor can have a linear characteristic over a range of DC magnetic fields. For example, as shown in FIG. 38A, the sensor has a broad linear characteristic (−80 Oe-+80 Oe) and required sensitivity. FIG. 38B illustrates magnetic field signal data provided by the solid-state magnetic field sensor when a coin is present, such as by the front solid-state magnetic field sensor 3704 described with respect to FIG. 37. In some embodiments, the solid-state sensor can operate in a dual mode to detect magnetic properties of the coin and at the same time perform as an eddy current sensor (EMS). This is accomplished by separating the signal into a DC component (magnetic information) and AC component (EMS information).

ALTERNATIVE EMBODIMENTS

Embodiment 1

A high-speed currency processing system comprising:

a housing with a coin input area configured to receive a batch of coins;

one or more coin receptacles operatively coupled to the housing;

a coin processing unit operatively coupled to the coin input area and the one or more coin receptacles, the coin processing unit being configured to process a plurality of the coins and discharge the processed coins to the one or more coin receptacles; and a sensor arrangement operatively coupled to the coin processing unit, the sensor arrangement including a photodetector and first and second light emitting devices, the first light emitting device being configured to emit light onto a surface of a passing coin at normal or near-normal incidence, the second light emitting device being configured to emit light onto the surface of the passing coin at high-angle incidence, and the photodetector being configured to sense light reflected off the surface of the passing coin and output a signal indicative of coin image information for processing the coin;

wherein the coins pass the sensor arrangement and the sensor arrangement outputs a signal indicative of coin image information at a rate of at least 2000 coins per minute.

Embodiment 2

The currency processing system of Embodiment 1, wherein the photodetector includes a linear array of photosensors with a normal incidence with the surface of the passing coin.

Embodiment 3

The currency processing system of Embodiment 1, further comprising a lens array between the photodetector and the passing coin.

Embodiment 4

The currency processing system of Embodiment 3, wherein the lens array includes a gradient-index (GRIN) lens array or a SELFOC lens array.

Embodiment 5

The currency processing system of Embodiment 1, wherein the first light emitting device comprises light sources configured to emit light onto the surface of the passing coin at a first near-normal incidence and a first high-angle of incidence, and the second light emitting device comprises light sources configured to emit light onto the surface of the passing coin at a second near-normal incidence and a second high-angle of incidence Embodiment 6

The currency processing system of Embodiment 5, wherein the light sources of the first light emitting device include first and second rows of light emitting diodes (LED), and the light sources of the second light emitting device include third and fourth rows of LEDs.

Embodiment 7

The currency processing system of Embodiment 1, further comprising a processor operatively coupled to the sensor arrangement and operable to selectively simultaneously activate both the first and second light emitting devices to thereby provide both high-angle and near-normal illumination of the surface of the passing coin.

Embodiment 8

The currency processing system of Embodiment 7, wherein the processor is further operable to selectively activate the second light emitting device and thereby provide only high-angle illumination of the surface of the passing coin.

Embodiment 9

The currency processing system of Embodiment 1, further comprising a light diffusing element operable to diffuse high-angle incidence light emitted by the second light emitting device.

Embodiment 10

The currency processing system of Embodiment 1, further comprising a cylindrical lens and a light scattering element operable to scatter high-angle incidence light emitted by the second light emitting device.

Embodiment 11

The currency processing system of Embodiment 1, further comprising a processor operatively coupled to the sensor arrangement to receive the coin image information signals and determine therefrom whether the passing coin is valid or invalid.

Embodiment 12

The currency processing system of Embodiment 1, further comprising a processor operatively coupled to the sensor arrangement to receive the coin image information signals and determine therefrom a country, a denomination, a fitness, or an authenticity, or any combination thereof, of the passing coin.

Embodiment 13

The currency processing system of Embodiment 1, wherein the sensor arrangement is configured to sense all or substantially all of a top surface of the passing coin.

Embodiment 14

A high-speed coin processing machine comprising:
a housing with an input area configured to receive therethrough a batch of coins;
a plurality of coin receptacles stowed inside the housing;
a processor stored inside the housing; and
a disk-type coin processing unit disposed at least partially inside the housing and operatively coupled to the coin input area and the plurality of coin receptacles to transfer coins therebetween, the coin processing unit including:
 a rotatable disk configured to support on an upper surface thereof and impart motion to a plurality of coins received from the coin input area,
 a stationary sorting head having a lower surface generally parallel to and spaced slightly apart from the rotatable disk, the lower surface forming a plurality of exit channels configured to guide the coins, under the motion imparted by the rotatable disk, to a plurality of exit stations through which the coins are discharged from the coin processing unit to the plurality of coin receptacles, and
 a sensor arrangement mounted to the sorting head facing the rotatable disk, the sensor arrangement including a linear array of photosensors and first and second rows of LEDs, the first row of LEDs being configured to emit light onto respective surfaces of passing coins at near-normal incidence, the second row of LEDs being configured to emit light onto the respective surfaces of the passing coins at high-angle incidence, and the linear array of photosensors having a normal incidence with the surfaces of the passing coins and being configured to sense light reflected off the respective surfaces of the passing coins and output signals indicative thereof,
wherein the processor is configured to receive the coin image signals from the sensor arrangement and generate therefrom multiple images of the respective surfaces of each of the passing coins for processing the coins with the rotatable disk turning at a rate of at least 120 rpm.

Embodiment 15

A high-speed coin imaging sensor system for a coin processing apparatus, the coin processing apparatus including a housing with an input area for receiving coins, a coin receptacle for stowing processed coins, a coin sorting device for separating coins by denomination, and a coin transport mechanism for transferring coins from the input area, through the coin sorting device, to the coin receptacle, the coin imaging sensor system comprising:
a sensor arrangement configured to mount inside the housing adjacent the coin transport mechanism upstream of the coin receptacle and downstream from the coin input area, the sensor arrangement including a photodetector and first and second light emitting devices, the first light emitting device being configured to emit light onto a surface of a passing coin at near-normal incidence, the second light emitting device being configured to emit light onto the surface of the passing coin at high-angle incidence, and the photodetector being configured to sense light reflected off the surface of the passing coin and output a signal indicative of coin image information;
an image processing circuit operatively coupled to the sensor arrangement and configured to process the coin image information signal output therefrom; and
a processor operatively coupled to the image processing circuit and configured to analyze the processed signals and generate therefrom an image for the passing coin
wherein the coins pass the sensor arrangement, the sensor arrangement outputs a signal indicative of coin image information, and the processor generates an image of each passing coin at a rate of at least 2000 coins per minute.

Embodiment 16

The coin imaging sensor system of Embodiment 15, wherein the photodetector includes a linear array of photosensors with a normal incidence with the surface of the passing coin.

Embodiment 17

The coin imaging sensor system of Embodiment 15, further comprising a lens or a lens array between the photodetector and the passing coin.

Embodiment 18

The coin imaging sensor system of Embodiment 15, wherein the first light emitting device comprises light sources configured to emit light onto the surface of the passing coin at a first near-normal incidence and a first high-angle of incidence, and the second light emitting device comprises light sources configured to emit light onto the surface of the passing coin at a second near-normal incidence and a second high-angle of incidence.

Embodiment 19

The coin imaging sensor system of Embodiment 18, wherein the light sources of the first light emitting device include first and second rows of light emitting diodes (LED), and the light sources of the second light emitting device include third and fourth rows of LEDs.

Embodiment 20

The coin imaging sensor system of Embodiment 15, wherein the processor is further operable to selectively simultaneously activate both the first and second light emitting devices to thereby provide both high-angle and near-normal illumination of the surface of the passing coin.

Embodiment 21

The currency processing system of Embodiment 1, wherein a coin processing unit comprises a rotatable disk configured to support on an upper surface thereof and impart motion to a plurality of coins received from the coin input area, and a stationary sorting head having an eleven inch diameter having a lower surface generally parallel to and spaced slightly apart from the rotatable disk, the lower surface forming a plurality of exit channels configured to guide the coins, under the motion imparted by the rotatable disk, to a plurality of exit stations through which the coins are discharged from the coin processing unit to a plurality of coin receptacles.

Embodiment 22

The currency processing system of Embodiment 1, wherein the rotatable disk rotates at a rate of at least 300 rpm.

Embodiment 23

The currency processing system of Embodiment 1, wherein the coins pass the sensor arrangement and the sensor arrangement outputs a signal indicative of coin image information at a rate of at least 3000 coins per minute.

Embodiment 24

The currency processing system of Embodiment 23, wherein a coin processing unit comprises a rotatable disk configured to support on an upper surface thereof and impart motion to a plurality of coins received from the coin input area, and a stationary sorting head having an eleven inch diameter having a lower surface generally parallel to and spaced slightly apart from the rotatable disk, the lower surface forming a plurality of exit channels configured to guide the coins, under the motion imparted by the rotatable disk, to a plurality of exit stations through which the coins are discharged from the coin processing unit to a plurality of coin receptacles.

Embodiment 25

The currency processing system of Embodiment 24, wherein the rotatable disk rotates at a rate of at least 300 rpm.

Embodiment 26

The high-speed coin processing machine of Embodiment 14, wherein the processor is configured to receive the coin image signals from the sensor arrangement and generate therefrom multiple images of the respective surfaces of each of the passing coins at a rate of at least 2000 coins per minute.

Embodiment 27

The high-speed coin processing machine of Embodiment 14, wherein the stationary sorting head has a diameter of eleven (11) inches.

Embodiment 28

The high-speed coin processing machine of Embodiment 14, wherein the processor is configured to receive the coin image signals from the sensor arrangement and generate therefrom multiple images of the respective surfaces of each of the passing coins at a rate of at least 3000 coins per minute.

Embodiment 29

The high-speed coin processing machine of Embodiment 28, wherein the stationary sorting head has a diameter of eleven (11) inches.

Embodiment 30

The coin imaging sensor system of Embodiment 15, wherein the coins pass the sensor arrangement, the sensor arrangement outputs a signal indicative of coin image information, and the processor generates an image of each passing coin at a rate of at least 3000 coins per minute.

Embodiment 31

A currency processing system comprising:
a housing with a coin input area configured to receive a batch of coins;
one or more coin receptacles operatively coupled to the housing;
a coin processing unit operatively coupled to the coin input area and the one or more coin receptacles, the coin processing unit being configured to process a plurality of the coins and discharge the processed coins to the one or more coin receptacles; and
a sensor arrangement operatively coupled to the coin processing unit, the sensor arrangement including a photodetector and a first light emitting device, the first light emitting device being configured to emit light in a generally horizontal direction onto a surface of a half-mirror, the half-mirror being oriented at about 45° to the horizontal direction, the half-mirror being configured to re-direct at least some of the light in a generally vertical direction and onto a passing coin at normal or near-normal angle of incidence and the photodetector being configured to sense light reflected off the surface of the passing coin and passed through the half-mirror and output a signal indicative of coin image information for processing the coin.

Embodiment 32

The currency processing system of Embodiment 31 further comprising of a second light emitting device being configured to emit light onto the surface of the passing coin at high-angle incidence.

Embodiment 33

The currency processing system of Embodiment 31 further comprising a processor configured to receive the signal indicative of coin image information and generate an image of the passing coin at a rate of at least 1,000 coins per minute.

Embodiment 34

The currency processing system of Embodiment 31 further comprising a processor configured to receive the signal indicative of coin image information and generate an image of the passing coin at a rate of at least 2,000 coins per minute.

Embodiment 35

The currency processing system of Embodiment 31 further comprising a processor configured to receive the signal indicative of coin image information and generate an image of the passing coin at a rate of at least 3,000 coins per minute.

Embodiment 36

The currency processing system of Embodiment 31, further comprising a light diffusing element positioned between the first light emitting device and the half-mirror.

Embodiment 37

A coin processing machine comprising:
a housing with an input area configured to receive therethrough a batch of coins;
a plurality of coin receptacles stowed inside the housing;
a processor stored inside the housing; and
a disk-type coin processing unit disposed at least partially inside the housing and operatively coupled to the coin input area and the plurality of coin receptacles to transfer coins therebetween, the coin processing unit including:
a rotatable disk configured to support on an upper surface thereof and impart motion to a plurality of coins received from the coin input area,
a stationary sorting head having a lower surface generally parallel to and spaced slightly apart from the rotatable disk, the lower surface forming a plurality of exit channels configured to guide the coins, under the motion imparted by the rotatable disk, to a plurality of exit stations through which the coins are discharged from the coin processing unit to the plurality of coin receptacles, and
a sensor arrangement mounted to the sorting head facing the rotatable disk, the sensor arrangement including a linear array of photosensors and a first light source being configured to emit light in a generally horizontal direction onto a surface of a half-mirror, the half-mirror being oriented at about 45° to the horizontal direction, the half-mirror being configured to re-direct at least some of the light in a generally vertical direction and onto respective surfaces of passing coins at normal or near-normal angle of incidence and the linear array of photosensors having a normal incidence with the surfaces of the passing coins and being configured to sense light reflected off the respective surfaces of the passing coins and passed through the half-mirror and output signals indicative thereof,
wherein the processor is configured to receive the coin image signals from the sensor arrangement and generate therefrom multiple images of the respective surfaces of each of the passing coins.

Embodiment 38

The coin processing machine of Embodiment 37 further comprising a second light source configured to emit light onto the respective surfaces of the passing coins at high-angle incidence.

Embodiment 39

The coin processing machine of Embodiment 37 wherein the rotatable disk rotates at a rate of at least 120 rpm.

Embodiment 40

The coin processing machine of Embodiment 37 wherein the first light source comprises one or more light sources, collectively, generating light of a plurality of wavelengths.

Embodiment 41

The coin processing machine of Embodiment 40 wherein the plurality of wavelengths comprise visible light and infrared light.

Embodiment 42

The coin processing machine of Embodiment 40 wherein the plurality of wavelengths comprise visible light and ultraviolet light.

Embodiment 43

The coin processing machine of Embodiment 40 wherein the plurality of wavelengths comprise ultraviolet light and infrared light.

Embodiment 44

The coin processing machine of Embodiment 40 wherein the plurality of wavelengths comprise visible light, ultraviolet light and infrared light.

Embodiment 45

The coin processing machine of Embodiment 40 further comprising one or more light filters positioned in front of the one or more of the photosensors.

Embodiment 46

The coin processing machine of Embodiment 45 wherein the one or more light filters permit only visible light to reach the one or more of the photosensors.

Embodiment 47

The coin processing machine of Embodiment 45 wherein the one or more light filters permit only infrared light to reach the one or more of the photosensors.

Embodiment 48

The coin processing machine of Embodiment 45 wherein the one or more light filters permit only ultraviolet light to reach the one or more of the photosensors.

Embodiment 49

The coin processing machine of Embodiment 45 wherein the one or more light filters permit only visible light to reach a first group of the one or more of the photosensors and permit only infrared light to reach a second group of the one or more of the photosensors.

Embodiment 50

The coin processing machine of Embodiment 45 wherein the one or more light filters permit only visible light to reach a first group of the one or more of the photosensors and permit only ultraviolet light to reach a second group of the one or more of the photosensors.

Embodiment 51

The coin processing machine of Embodiment 45 wherein the one or more light filters permit only visible light to reach a first group of the one or more of the photosensors, permit only ultraviolet light to reach a second group of the one or more of the photosensors, and permit only infrared light to reach a third group of the one or more of the photosensors.

Embodiment 52

A coin imaging sensor system for a coin processing apparatus, the coin processing apparatus including a housing with an input area for receiving coins, a coin receptacle for stowing processed coins, a coin sorting device for separating coins by denomination, and a coin transport mechanism for transferring coins from the input area, through the coin sorting device, to the coin receptacle, the coin imaging sensor system comprising:
a sensor arrangement configured to mount inside the housing adjacent the coin transport mechanism upstream of the coin receptacle and downstream from the coin input area, the sensor arrangement including a photodetector and a first light source, the first light source being configured to emit light in a generally horizontal direction onto a surface of a half-mirror, the half-mirror being oriented at about 45° to the horizontal direction, the half-mirror being configured to re-direct at least some of the light in a generally vertical direction and onto a surface of a passing coin at a normal or near-normal angle of incidence, and the photodetector being configured to sense light reflected off the surface of the passing coin and passed through the half-mirror and output a signal indicative of coin image information;
an image processing circuit operatively coupled to the sensor arrangement and configured to process the coin image information signal output therefrom; and
a processor operatively coupled to the image processing circuit and configured to analyze the processed signals and generate therefrom an image for the passing coin.

Embodiment 53

The coin imaging sensor system of Embodiment 52 further comprising a second light source being configured to emit light onto the surface of the passing coin at high-angle incidence.

Embodiment 54

The coin imaging sensor system of Embodiment 53 wherein the coins pass the sensor arrangement, the sensor arrangement outputs a signal indicative of coin image information, and the processor generates an image of each passing coin at a rate of at least 2000 coins per minute.

Embodiment 55

The coin imaging sensor system of Embodiment 52 wherein the coins pass the sensor arrangement, the sensor arrangement outputs a signal indicative of coin image information, and the processor generates an image of each passing coin at a rate of at least 2000 coins per minute.

Embodiment 56

The coin imaging sensor system of Embodiment 52 wherein the first light source comprises one or more light sources, collectively, generating light of a plurality of wavelengths.

Embodiment 57

The coin imaging sensor system of Embodiment 56 wherein the plurality of wavelengths comprise visible light and infrared light.

Embodiment 58

The coin imaging sensor system of Embodiment 56 wherein the plurality of wavelengths comprise visible light and ultraviolet light.

Embodiment 59

The coin imaging sensor system of Embodiment 56 wherein the plurality of wavelengths comprise ultraviolet light and infrared light.

Embodiment 60

The coin imaging sensor system of Embodiment 56 wherein the plurality of wavelengths comprise visible light, ultraviolet light and infrared light.

Embodiment 61

The coin imaging sensor system of Embodiment 56 wherein the photodetector comprises a plurality of photosensors and further comprising one or more light filters positioned in front of the one or more of the photosensors.

Embodiment 62

The coin imaging sensor system of Embodiment 61 wherein the one or more light filters permit only visible light to reach the one or more of the photosensors.

Embodiment 63

The coin imaging sensor system of Embodiment 61 wherein the one or more light filters permit only infrared light to reach the one or more of the photosensors.

Embodiment 64

The coin imaging sensor system of Embodiment 61 wherein the one or more light filters permit only ultraviolet light to reach the one or more of the photosensors.

Embodiment 65

The coin imaging sensor system of Embodiment 61 wherein the one or more light filters permit only visible light to reach a first group of the one or more of the photosensors and permit only infrared light to reach a second group of the one or more of the photosensors.

Embodiment 66

The coin imaging sensor system of Embodiment 61 wherein the one or more light filters permit only visible light to reach a first group of the one or more of the photosensors and permit only ultraviolet light to reach a second group of the one or more of the photosensors.

Embodiment 67

The coin imaging sensor system of Embodiment 61 wherein the one or more light filters permit only infrared light to reach a first group of the one or more of the photosensors and permit only ultraviolet light to reach a second group of the one or more of the photosensors.

Embodiment 68

The coin imaging sensor system of Embodiment 61 wherein the one or more light filters permit only visible light to reach a first group of the one or more of the photosensors, permit only ultraviolet light to reach a second group of the one or more of the photosensors, and permit only infrared light to reach a third group of the one or more of the photosensors.

Embodiment 69

A high-speed currency processing system comprising:
a housing with a coin input area configured to receive a batch of coins;
one or more coin receptacles operatively coupled to the housing;
a coin processing unit operatively coupled to the coin input area and the one or more coin receptacles, the coin processing unit being configured to process a plurality of the coins and discharge the processed coins to the one or more coin receptacles; and
a sensor arrangement operatively coupled to the coin processing unit, the sensor arrangement including a photodetector and at least one light emitting device, the light emitting device being configured to emit light onto a surface of a passing coin, and the photodetector being configured to sense light reflected off the surface of the passing coin and output a signal indicative of coin image information for processing the coin;
wherein the coins pass the sensor arrangement and the sensor arrangement outputs a signal indicative of coin image information at a rate of at least 2000 coins per minute.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims. Moreover, this disclosure expressly includes any and all combinations and subcombinations of the preceding elements and aspects.

What is claimed is:
1. A currency processing system comprising:
a housing with a coin input area configured to receive a batch of coins;

one or more coin receptacles operatively coupled to the housing; and a disk-type coin processing unit operatively coupled to the coin input area and the one or more coin receptacles to transfer coins therebetween, the disk-type coin processing unit including:

a rotatable disk configured to impart motion to a plurality of the coins, a sorting head having a lower surface generally parallel to and adjacent the rotatable disk, the lower surface forming a plurality of shaped regions configured to guide the coins, responsive to motion imparted by the rotatable disk, to a plurality of exit stations through which the coins are discharged from the disk-type coin processing unit to the one or more coin receptacles, and a sensor assembly including a linear array of sensors configured to sense coins processed by the disk-type coin processing unit, and to output a signal indicative of coin image information for processing the coins, wherein the linear array of sensors is mounted to or within the sorting head, and wherein the linear array of sensors includes a plurality of non-optical sensors, the plurality of non-optical sensor includes a plurality of eddy current sensors, and each one of the plurality of eddy current sensors includes:

a body;

a front driving coil positioned at a first end of the body and configured to generate a first alternating magnetic field; and a pickup coil disposed on the body adjacent the front driving coil, wherein the pickup coil is configured to provide a first signal associated with a coin response to the first alternating magnetic field.

2. The currency processing system of claim 1, wherein each one of the plurality of eddy current sensors includes:

a back driving coil configured to generate a second alternating magnetic field; and a backup coil disposed adjacent the back driving coil, wherein the backup coil is configured to provide a second signal associated with the coin response to the second alternating magnetic field.

3. The currency processing system of claim 2, wherein each one of the plurality of eddy current sensors includes:

a plurality of differential signals providing information on one or more coin properties is generated based upon the first signal and the second signal provided by each of the plurality of eddy current sensors.

4. The currency processing system of claim 1, wherein:

a select one of the plurality of eddy current sensors includes:

a back driving coil configured to generate a second alternating magnetic field; and a backup coil disposed adjacent the back driving coil, wherein the backup coil is configured to provide a second signal associated with the coin response to the second alternating magnetic field, and a plurality of differential signals providing information on one or more coin properties is generated based upon the first signal provided by each of the plurality of eddy current sensors and the second signal.

5. The currency processing system of claim 1, wherein the sensor assembly further includes an optical sensor assembly, the optical sensor assembly including:

a sensor circuit board with one or more photodetector elements;

a gradient-index (GRIN) lens array;

one or more light emitting devices;

an illumination control device communicatively coupled to and operable for controlling the one or more light emitting devices; and a photodetector control device communicatively coupled to and operable for controlling the one or more photodetector elements.

6. The currency processing system of claim 5, wherein the one or more photodetector elements includes a linear array of photosensors with a normal incidence with a surface of a passing coin.

7. The currency processing system of claim 5, wherein the sensor assembly is configured to provide signals indicative of both optical image information and non-optical image information.

8. The currency processing system of claim 5, wherein images of the coins having a resolution of at least 50 dots per inch (dpi) are generated from the signal indicative of coin image information.

9. The currency processing system of claim 5, wherein the photodetector control device comprises a differential-to-single-ended transceiver and a start pulse and enable timing control module.

10. The currency processing system of claim 1, wherein the plurality of non-optical sensors of the linear array of sensors further includes at least one other type of magnetic or electromagnetic sensor.

11. The currency processing system of claim 1, wherein the plurality of non-optical sensors of the linear array of sensors includes one or more solid-state magnetic field sensors.

12. The currency processing system of claim 1, wherein the linear array of sensors is arranged transverse to a path of travel of passing coins and wherein a width of the linear array of sensors is approximately equal to or greater than a diameter of a largest coin the currency processing system is configured to process.

13. The currency processing system of claim 12, wherein the linear array of sensors comprises at least two linear arrays of sensors.

14. The currency processing system of claim 13, wherein the at least two linear arrays of sensors are positioned generally parallel to and adjacent each other.

15. The currency processing system of claim 13, wherein the at least two linear arrays of sensors are interlaced with one another.

16. The currency processing system of claim 13, further comprising a processor operatively coupled to the linear array of sensors, wherein the processor is configured to:

receive the signal indicative of coin image information and determine therefrom a denomination, a fitness, or an authenticity, or any combination thereof, of each of the coins; and analyze the signal indicative of coin image information and generate therefrom a coin image.

17. The currency processing system of claim 1, further comprising a processor operatively coupled to the linear array of sensors, wherein the processor is configured to:

receive the signal indicative of coin image information and determine therefrom a denomination, a fitness, or an authenticity, or any combination thereof, of each of the coins; and analyze the signal indicative of coin image information and generate therefrom a coin image.

18. The currency processing system of claim 1, wherein the signal indicative of coin image information output by the linear array of sensors is sufficient to generate a coin image with a resolution of at least two (2) dots per inch (dpi).

19. The currency processing system of claim 1, wherein the linear array of sensors includes a plurality of electromagnetic imaging sensors aligned rectilinearly adjacent one another.

* * * * *